(12) United States Patent
Mohamed et al.

(10) Patent No.: US 11,019,221 B2
(45) Date of Patent: May 25, 2021

(54) CHARGING IN THE INTEGRATED SMALL CELL/WI-FI NETWORKS (ISWN)

(71) Applicant: Convida Wireless, LLC, Wilmington, DE (US)

(72) Inventors: Ahmed Mohamed, Pembroke Pines, FL (US); Michael F. Starsinic, Newtown, PA (US); Qing Li, Princeton Junction, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/534,060

(22) PCT Filed: Dec. 11, 2015

(86) PCT No.: PCT/US2015/065262
§ 371 (c)(1),
(2) Date: Jun. 8, 2017

(87) PCT Pub. No.: WO2016/094805
PCT Pub. Date: Jun. 16, 2016

(65) Prior Publication Data
US 2017/0366679 A1 Dec. 21, 2017

Related U.S. Application Data

(60) Provisional application No. 62/091,111, filed on Dec. 12, 2014.

(51) Int. Cl.
*H04M 15/00* (2006.01)
*H04W 4/24* (2018.01)
(Continued)

(52) U.S. Cl.
CPC ........ *H04M 15/62* (2013.01); *H04L 12/1407* (2013.01); *H04L 12/1467* (2013.01);
(Continued)

(58) Field of Classification Search
CPC .. H04M 15/62; H04M 15/66; H04M 15/8228; H04M 15/43; H04M 15/8214;
(Continued)

(56) References Cited

U.S. PATENT DOCUMENTS

| 2005/0089020 A1* | 4/2005 | Ahlback | H04L 69/16 370/352 |
| 2005/0175019 A1* | 8/2005 | Kalavade | H04W 12/06 370/400 |

(Continued)

FOREIGN PATENT DOCUMENTS

| CN | 102769933 A | 11/2012 |
| CN | 103581865 A | 2/2014 |

(Continued)

OTHER PUBLICATIONS

Tomici et al., "Integrated Small Cell and Wi-Fi networks", 2015 IEEE Wireless Communications and Networking Conference (WCNC), IEEE, Mar. 9, 2015, pp. 1261-1266.

(Continued)

*Primary Examiner* — Mehmood B. Khan
(74) *Attorney, Agent, or Firm* — BakerHostetler

(57) ABSTRACT

A Policy and Charging Enforcement Function (PCEF) can be aware of whether a UE connects through a cellular or WIFI connection through a gateway. Management messages can be modified to allow the PCEF volume based online charging functionality to remain in the core network (i.e. in the P-GW/PCEF). Session management messaging between the ISWN (ISW-GW) and the core network (P-GW/PCEF) may be modified so that the core network may be notified when the ISWN moves a bearer, or flow, from one RAT to another. Alternately, PCEF volume based online charging functionality can be added to the ISWN. The PCEF of the (Continued)

ISWN can be tasked with performing volume based online charging while the UE is in the ISWN.

19 Claims, 33 Drawing Sheets

(51) Int. Cl.
    *H04L 12/14*         (2006.01)
    *H04W 16/14*       (2009.01)
    *H04W 84/12*       (2009.01)

(52) U.S. Cl.
    CPC .......... *H04M 15/43* (2013.01); *H04M 15/66* (2013.01); *H04M 15/8214* (2013.01); *H04M 15/8228* (2013.01); *H04W 4/24* (2013.01); *H04W 16/14* (2013.01); *H04W 84/12* (2013.01)

(58) Field of Classification Search
    CPC ....... H04W 16/14; H04W 84/12; H04W 4/24; H04L 12/1407; H04L 12/1467
    See application file for complete search history.

(56) References Cited

U.S. PATENT DOCUMENTS

| | | | |
|---|---|---|---|
| 2006/0045069 A1* | 3/2006 | Zehavi | H04L 12/5692 370/352 |
| 2007/0049276 A1* | 3/2007 | Rimoni | H04W 36/30 455/436 |
| 2008/0229088 A1 | 9/2008 | Barth et al. | |
| 2009/0254494 A1 | 10/2009 | Li et al. | |
| 2009/0264097 A1* | 10/2009 | Cai | H04M 15/64 455/406 |
| 2010/0150046 A1* | 6/2010 | Li | H04M 15/55 370/311 |
| 2012/0144049 A1* | 6/2012 | Lopez Nieto | H04M 15/64 709/228 |
| 2012/0210003 A1* | 8/2012 | Castro | H04W 4/24 709/225 |
| 2012/0233323 A1* | 9/2012 | Conte | H04L 12/1425 709/224 |
| 2012/0250658 A1* | 10/2012 | Eisl | H04L 63/20 370/331 |
| 2012/0278464 A1* | 11/2012 | Lehane | H04W 4/20 709/223 |
| 2012/0327816 A1* | 12/2012 | Morrill | H04M 15/8016 370/259 |
| 2013/0058260 A1* | 3/2013 | Dahl | H04L 12/1403 370/259 |
| 2013/0065585 A1* | 3/2013 | Pelletier | H04W 12/001 455/435.1 |
| 2013/0070596 A1 | 3/2013 | Yeh et al. | |
| 2013/0078998 A1 | 3/2013 | Rui et al. | |
| 2013/0279521 A1* | 10/2013 | Perez Martinez | H04L 41/5029 370/468 |
| 2013/0322347 A1* | 12/2013 | Alex | H04L 61/2007 370/329 |
| 2014/0079022 A1* | 3/2014 | Wang | H04W 36/22 370/331 |
| 2014/0235200 A1 | 8/2014 | Cai et al. | |
| 2014/0348030 A1* | 11/2014 | Tornkvist | H04M 15/66 370/259 |
| 2014/0376511 A1* | 12/2014 | Kalapatapu | H04L 65/1016 370/331 |
| 2014/0378094 A1* | 12/2014 | Gillick | H04M 15/765 455/406 |
| 2015/0109930 A1* | 4/2015 | Duan | H04L 47/2441 370/235 |
| 2015/0109967 A1* | 4/2015 | Hogan | H04M 15/44 370/259 |
| 2015/0133081 A1* | 5/2015 | Griot | H04M 15/00 455/407 |
| 2015/0172471 A1* | 6/2015 | Castro Castro | H04L 65/1006 370/329 |
| 2015/0215832 A1* | 7/2015 | Fitzpatrick | H04W 36/04 455/426.1 |
| 2015/0282026 A1* | 10/2015 | Gupta | H04W 48/16 370/331 |
| 2015/0341851 A1* | 11/2015 | Cai | H04M 15/66 455/434 |
| 2015/0350598 A1* | 12/2015 | Yang | H04W 72/085 348/14.02 |
| 2015/0358240 A1* | 12/2015 | Hong | H04L 69/22 370/410 |
| 2016/0037340 A1* | 2/2016 | Rayment | H04W 12/06 370/338 |
| 2016/0330328 A1* | 11/2016 | Garg | H04M 15/7652 |
| 2017/0264606 A1* | 9/2017 | Forssell | H04L 63/0815 |
| 2020/0045513 A1* | 2/2020 | Wang | H04W 4/24 |

FOREIGN PATENT DOCUMENTS

| | | | | |
|---|---|---|---|---|
| EP | 2217018 A1 | 8/2010 | | |
| EP | 2642690 A1 | 9/2013 | | |
| EP | 2709418 A2 | 3/2014 | | |
| JP | 2014-526210 A | 10/2014 | | |
| KR | 10-1303949 B1 | 9/2013 | | |
| WO | 2014/012380 A1 | 1/2014 | | |
| WO | 2014/043494 A1 | 3/2014 | | |
| WO | 2014/112638 A1 | 7/2014 | | |
| WO | 2014/130446 A1 | 8/2014 | | |
| WO | 2015/073130 A1 | 5/2015 | | |
| WO | WO-2015073130 A1 * | 5/2015 | ............. | H04W 4/24 |
| WO | 2015/127241 A1 | 8/2015 | | |

OTHER PUBLICATIONS

3rd Generation Partnership Project; (3GPP) TS 36.413 V12.1.0, Technical Specification Group Radio Access Network; Evolved Universal Terrestrial Radio Access Network (E-UTRAN); S1 Application Protocol (S1AP) (Release 12), Mar. 2014, 285 pages.

3rd Generation Partnership Project; (3GPP) TS 32.299 V12.4.0, Technical Specification Group Services and System Aspects; Telecommunication Management; Charging Management; Diameter Charging Applications (Release 12), Mar. 2014, 159 pages.

3rd Generation Partnership Project; (3GPP) TS 32.252 V11.1.0, Technical Specification Group Services and System Aspects; Telecommunication Management; Charging Management; Wireless Local Area Network (WLAN) Charging (Release 11), Jun. 2013, 49 pages.

3rd Generation Partnership Project; (3GPP) TS 32.251 V12.5.0, Technical Specification Group Services and System Aspects; Telecommunication Management; Charging Management; Packet Switched (PS) Domain Charging (Release 12), Mar. 2014, 128 pages.

3rd Generation Partnership Project; (3GPP) TS 32.240 V12.3.0, Technical Specification Group Services and System Aspects; Telecommunication Management; Charging Management; Charging Architecture and Principles (Release 12), Dec. 2013, 51 pages.

3rd Generation Partnership Project; (3GPP) TS 29.274 V12.4.0, Technical Specification Group Core Network and Terminals; 3GPP Evolved Packet System (EPS); Evolved General Packet Radio Service (GPRS) Tunneling Protocol for Control Plane (GTPv2-C); Stage 3 (Release 12), Mar. 2014, 245 pages.

3rd Generation Partnership Project; (3GPP) TS 29.213 V12.3.0, Technical Specification Group Core Network and Terminals; Policy and Charging Control Signaling Flows and Quality of Service (QoS) Parameter Mapping (Release 12), Mar. 2014, 204 pages.

3rd Generation Partnership Project; (3GPP) TS 29.212 V12.4.0, Technical Specification Group Core Network and Terminals; Policy and Charging Control (PCC); Reference Points (Release 12), Mar. 2014, 220 pages.

3rd Generation Partnership Project; (3GPP) TS 24.301 V12.5.0, Technical Specification Group Core Network and Terminals; Non-Access-Stratum (NAS) Protocol for Evolved Packet System (EPS); Stage 3 (Release 12), Jun. 2014, 367 pages.

(56) References Cited

OTHER PUBLICATIONS

3rd Generation Partnership Project; (3GPP) TS 24.244 V1.1.0,Technical Specification Group Core Network and Terminals; Wireless LAN Control Plane Protocol for Trusted WLAN Access to EPC; Stage 3 (Release 12), Apr. 2014, 32 pages.

3rd Generation Partnership Project; (3GPP) TS 24.008 V12.6.0, Technical Specification Group Core Network and Terminals; Mobile Radio Interface Layer 3 Specification; Core Network Protocols; Stage 3 (Release 12), Jun. 2014, 698 pages.

3rd Generation Partnership Project; (3GPP) TS 23.402 V12.4.0, Technical Specification Group Services and System Aspects; Architecture Enhancements for non-3GPP Accesses (Release 12), Mar. 2014, 288 pages.

3rd Generation Partnership Project; (3GPP) TS 23.401 V12.4.0, Technical Specification Group Services and System Aspects; General Packet Radio Service (GPRS) Enhancements for Evolved Universal Terrestrial Radio Access Network (E-UTRAN) Access (Release 12), Mar. 2014, 302 pages.

3rd Generation Partnership Project; (3GPP) TS 23.203 V12.4.0, Technical Specification Group Services and System Aspects; Policy and Charging Control Architecture (Release 12), Mar. 2014, 218 pages.

\* cited by examiner

| Octets | Bits | | | | | | | |
|---|---|---|---|---|---|---|---|---|
| | 8 | 7 | 6 | 5 | 4 | 3 | 2 | 1 |
| 1 | Type = 85 (Decimal) | | | | | | | |
| 2 to 3 | Length = n | | | | | | | |
| 4 | Spare | | | | Instance | | | |
| 5 to (n+4) | Traffic Aggregate Description | | | | | | | |

FIG. 11A

| 8 | 7 | 6 5 | 4 3 2 1 | |
|---|---|---|---|---|
| 3GPP | NI | Packet filter direction 1 | Packet filter identifier 1 | Octet 4 |
| Packet filter evaluation precedence 1 |||| Octet 5 |
| Length of Packet filter contents 1 |||| Octet 6 |
| Packet filter contents 1 |||| Octet 7 Octet m |
| 3GPP | NI | Packet filter direction 2 | Packet filter identifier 2 | Octet m+1 |
| Packet filter evaluation precedence 2 |||| Octet m+2 |
| Length of Packet filter contents 2 |||| Octet m+3 |
| Packet filter contents 2 |||| Octet m+4 Octet n |
| ... |||| Octet n+1 Octet y |
| 3GPP | NI | Packet filter direction N | Packet filter identifier N | Octet y+1 |
| Packet filter evaluation precedence N |||| Octet y+2 |
| Length of Packet filter contents N |||| Octet y+3 |
| Packet filter contents N |||| Octet y+4 Octet z |

FIG. 11C

| Octets | Bits | | | | | | | |
|---|---|---|---|---|---|---|---|---|
| | 8 | 7 | 6 | 5 | 4 | 3 | 2 | 1 |
| 1 | Type = 77 (decimal) | | | | | | | |
| 2 to 3 | Length = n | | | | | | | |
| 4 | Spare | | | | Instance | | | |
| 5 | DAF | DTF | HI | DFI | OI | ISRSI | ISRAI | SGWCI |
| 6 | SQCI | UIMSI | CFSI | CRSI | P | PT | SI | MSV |
| 7 | RetLoc | PBIC | SRNI | S6AF | S4AF | MBMDT | ISRAU | CCRSI |
| 8 | CPRAI | ARRL | PPOF | PPON/PPEI | PPSI | CSFBI | CLII | CPSR |
| 9 | Spare | Spare | Spare | Spare | NI | IRC | AOSI | AOPI |
| 10 to (n+4) | These octet(s) is/are present only if explicitly specified | | | | | | | |

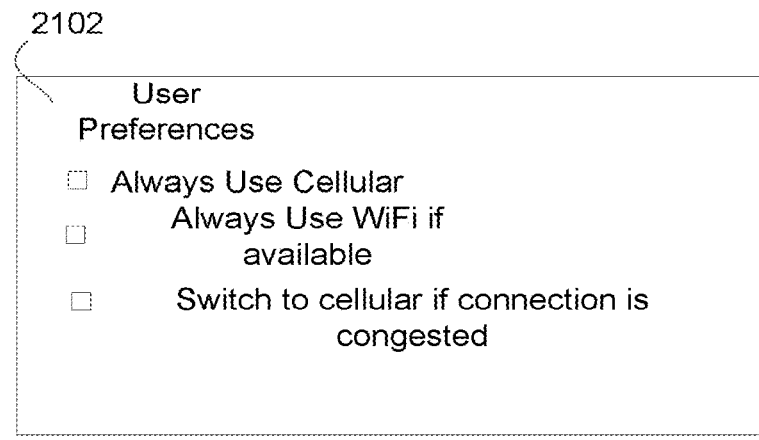
FIG. 21A
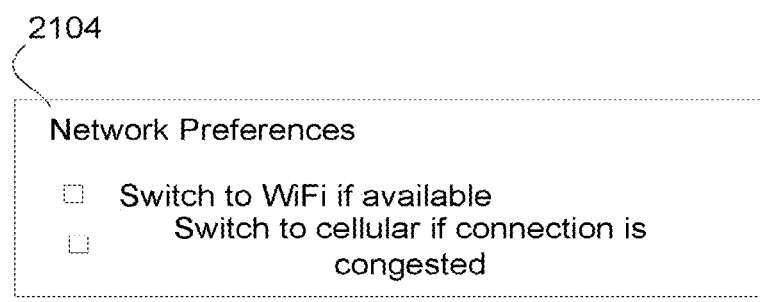
FIG. 21B
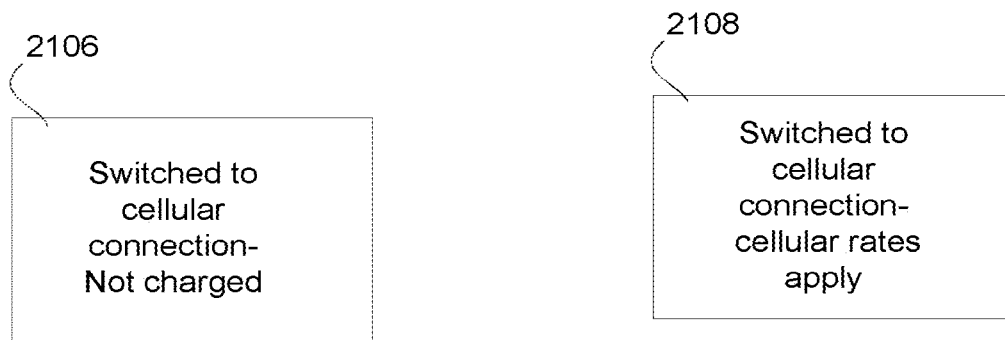
FIG. 21C                    FIG. 21D

CHARGING IN THE INTEGRATED SMALL CELL/WI-FI NETWORKS (ISWN)

CROSS-REFERENCE TO RELATED APPLICATIONS

This application is a National Stage Application filed under 35 U.S.C. § 371 of International Application No. PCT/US2015/065262, filed Dec. 11, 2015, which claims priority to U.S. Provisional Patent Application No. 62/091,111, filed Dec. 12, 2014, the disclosures of which is incorporated herein by reference in its entirety.

BACKGROUND

The 3rd Generation Partnership Project (3GPP) covers cellular telecommunications network technologies, including radio access, the core transport network, and service capabilities. The latest version of the 3GPP mobile core network (MCN) architecture for wireless communications is referred to as the Evolved Packet Core (EPC). The Evolved Packet Core (EPC) has a "flat architecture" to handle the data traffic efficiently from performance and cost perspective. EPC also separates the user data (also known as the user plane) and the signaling (also known as the control plane) to make the EPC scale independent.

The 3GPP network Policy and Charging Control (PCC) system provides dynamic control of policy and charging per subscriber and per IP data flow. It supports finer QoS control to enable application servers to dynamically control the Quality of Service (QoS) and charging policies for the services delivered.

FIG. 1 is a diagram of a Policy and Charging Control (PCC) architecture adapted from clause 5.1 of 3GPP TS 23.203 "Policy and charging control architecture," V12.4.0, March 2014 (hereafter "Policy and charging control architecture"). As shown, the PCC functionality is comprised by the functions of the Policy and Charging Enforcement Function (PCEF) 102, the Bearer Binding and Event Reporting Function (BBERF) 104, the Policy and Charging Rules Function (PCRF) 118, the Application Function (AF) 108, the Traffic Detection Function (TDF) 110, the Online Charging System (OCS) 112, the Offline Charging System (OFCS) 114 and the Subscription Profile Repository (SPR) 116.

The PCRF 118 (described in clause 6.2.1 of "Policy and charging control architecture") provides the PCC rules concerning service data flow detection, gating, QoS and flow based charging to the PCEF 102. The PCEF 102 (clause 6.2.2 of "Policy and charging control architecture") is usually located in the P-GW 120 and it is responsible for enforcing the policies that are indicated by the PCRF 118. Particularly, it uses either gate enforcement approach (allowing service flow to pass only if the corresponding gate is open) or QoS enforcement approach (enforcing a specific QoS class on a particular service flow). Furthermore, the PCEF 102 is responsible for charging control. More specifically, the PCEF 102 allows a service data flow to pass if it has an associated PCC rule and if it has been granted credit for the charging key by the OCS 112.

Of special interest in FIG. 1 is the Gx reference point, which resides between the PCEF 102 and the PCRF 118. It enables the signaling of PCC decision, which governs the PCC behavior. For example, the Gx reference point supports the request for PCC decision from the PCEF 102 to the PCRF 118 and the provision of PCC decision from the PCRF 118 to the PCEF 102. The Gy (a.k.a. Ro) reference point resides between the OCS 112 and the PCEF 102 and it allows credit control for online charging. The Gz (a.k.a. Rf) reference point resides between the PCEF 102 and the OFCS 114 and it enables transport of offline charging information.

FIG. 2 is a diagram that illustrates a high level common architecture for online and offline charging (adapted from clause 4.2 of 3GPP TS 32.240, "Charging architecture and principles," V12.3.0, December 2013 hereafter "Charging architecture and principles".)

FIG. 2 depicts the reference points (e.g., Rf and Ro) between the network entities of interest along with the information flows over these reference points. The charging architecture includes both online and offline charging processes. In order to support charging process, the network performs real-time monitoring of resource usage. In the offline charging process, the network provides the offline charging system (OFCS) 114 with the resource usage after it has occurred. Such notification is used to create a Charging Data Record (CDR), which is afterwards sent to the billing domain. As for the online charging process, the network contacts the online charging system (OCS) 112 to grant permission for the resource usage prior to using it. Therefore, the collected charging information in the offline mechanism does not affect, in real time, the requested services. On the contrary, the charging information in the online mechanism affects, in real time, the requested services (Clause 4.1 of "Charging architecture and principles")

FIG. 3 is a diagram that illustrates an offline charging architecture, which consists of multiple logical entities. The Charging Trigger Function (CTF) 302 generates charging events based on the observation of network resource usage. It is responsible for "Accounting Metrics Collection" and "Accounting Data Forwarding" towards the Charging Data Function (CDF) 304 via the Rf reference point. The CDF 304 then uses the information contained in the charging events to construct CDRs. The CDRs produced by the CDF 304 are transferred immediately to the Charging Gateway Function (CGF) 306 via the Ga reference point. The CGF 306 uses the Bx reference point for the transfer of CDR files to the BD.

FIG. 4 is a diagram that illustrates an architecture of an Online Charging System (OCS). Similar to the Offline Charging System (OFCS), the CTF 302 creates the charging events and collects the "Accounting Metrics." The charging events are forwarded to the Online Charging Function (OCF) over the Ro reference point, in order to obtain authorization for the network resource usage requested by the user. The Rating Function (RF) determines the value of the network resource usage and the Account Balance Management Function (ABMF) 408 is the location of the subscriber's account balance within the OCS.

Online charging mechanisms can be event-based or session-based, as described in clause 5.2.2 of "Charging architecture and principles". In event-based charging, a network/user event corresponds to a single chargeable event. In session-based charging, at least two chargeable events are needed. Of special interest in this disclosure is the Session Charging with Unit Reservation (SCUR) mechanism (clause 6.3.5 of 3GPP TS 32.299, "Diameter charging applications," V12.4.0, March 2014, hereafter "TS 32.299") In the SCUR, the CTF 302 of a particular network entity will forward the charging event to the OCS. In response, the OCS 112 determines the usage cost of the needed resources and reserves the needed charge from the user's account. The RF in the OCS is responsible for deciding the value of the utilized resources. Alternatively, "Decentralized Unit Determination and Centralized Rating" SCUR, describes the CTF 302 calculating the required number of resources units and the corresponding monetary rate (clause 5.2.2 of TS 32.299) and sending these information to the OCS. In response, the OCS sends back to the CTF 302 authorizing the resources usage. As a result, the network entity executes the resource utilization. Once completed, the CTF 302 informs the OCS about its completion.

The PCEF 102 performs volume based online charging in the 3GPP network. When a data session begins, the PCEF 102 reserves some of the user's credit (i.e. money) from the OCS 112. As data volumes are delivered to/from the used, the PCEF 102 decrements the reserved credit. When all credit is spent, the PCEF 102 will attempt to reserve more credit from the user's account. If the OCS 112 indicates to the PCEF 102 that the user has no more credit in his account, then the data session will be terminated by the PCEF 102. The PCEF 102 is typically deployed in the P-GW 120.

FIG. 5 is a diagram that illustrates a charging architecture for the Interworking-WLAN (I-WLAN) architecture, which was presented in 3GPP TS 32.252, "Charging management; Wireless Local Area Network (WLAN) charging," V11.1.0, June 2013 hereafter "TS 32.252". As shown for the offline charging mechanism, the 3GPP AAA Server communicates with the CDF 304 over the Wf reference point (Rf interface). On the other hand, the online charging mechanism is implemented using the Wo reference point (Ro interface) between the 3GPP AAA Server and the OCS 112. The Wf and Wo reference points in FIG. 5 align with their roles in FIG. 2.

The current online charging protocols for I-WLAN do not allow volume based online charging (clause 5.3.1 of TS 32.252). Only time-based authorization and charging is possible. Short time reservation is recommended to reduce credit risk, as mentioned in TS 32.252.

The following describes the main GTPv2-C messages which can be used to create/update bearer or session with new charging rules.

The Bearer Resource Command message (described in clause 5.4.5 of 3GPP TS 23.401, "General Packet Radio Service (GPRS) enhancements for Evolved Universal Terrestrial Radio Access Network (E-UTRAN) access," V12.4.0, March 2014 hereafter "TS 23.401") is sent from the MME 718 to the S-GW 722, which is forwarded afterwards to the P-GW 120. It is used for bearer resource modifications (e.g. allocation or release of resources) for one traffic flow aggregate with a specific QoS demand. Furthermore, it can be used for QoS update using the "Flow Quality of Service (Flow QoS)" IE. The detailed Information Elements of the Bearer Resource Command message is tabulated in clause 7.2.5 of 3GPP TS 29.274, "Evolved Packet System (EPS); Evolved General Packet Radio Service (GPRS); Tunnelling Protocol for Control plane (GTPv2-C); Stage 3," V12.4.0, March 2014. (Hereafter TS 29.274)

The Modify Bearer Request message (described in Section 7.2.7 of TS 29.274.) can be used for handover procedure and initial attachment. It has multiple "Indication Flags" such as Handover Indication (for handover) and PDN Pause On/Off Indication (to pause the P-GW 120 charging).

Similar to the Modify Bearer Request message, the Create Session Request has Indication Flags (e.g. Handover Indication) as well as shown in Table 7.2.1-1 of TS 29.274 Similarly, the Create Session Response has Indication Flags as shown in Table 7.2.2-1 of TS 29.274.

FIG. 6 is a logical diagram illustrating the possible presence requirements for charging event/CDR parameters ("field categories").

As indicated in clause 5.4 of "Charging architecture and principles", the charging event and CDR description tables in the middle tier charging TSs specify the Mandatory (M), Conditional (C) and Operator provisionable (Oc or Om) designations and they can be described as follows.

M—This parameter is Mandatory and shall always be present in the event/CDR.

C—This parameter shall be present in the event/CDR only when certain Conditions are met. These Conditions are specified as part of the parameter definition.

Om—This is a parameter that, if provisioned by the operator to be present, shall always be included in the events/CDRs. In other words, an Om parameter that is provisioned to be present is a mandatory parameter.

Oc—This is a parameter that, if provisioned by the operator to be present, shall be included in the events/CDRs when the specified conditions are met. In other words, an Oc parameter that is configured to be present is a conditional parameter.

Section 6.3 of 3GPP TS 23.203 "Policy and charging control architecture," V12.4.0, March 2014 provides a description of PCC rules and Table 6.3 of 3GPP TS 23.203 "Policy and charging control architecture," V12.4.0, March 2014 summarizes the information that is included in a PCC rule message over Gx.

PCC rules are exchanged over Diameter based interfaces. Thus each piece of information that is part of rule is captured in a Diameter AVP. More detailed descriptions of the Diameter messages and AVPs are available in 3GPP TS 29.212, "Policy and Charging Control (PCC); Reference points," V12.4.0, March 2014 hereafter TS 29.212.

The Gx interface is the Diameter based interface that is used to exchange PCC rules between the P-GW 120 (PCEF 102) and PCRF 118. The Credit Control Request (CCR) and Credit Control Answer (CCA) messages are used to exchange PCC rules on the Gx reference point. These messages are described in clauses 5.6.2 and 5.6.3 of TS 29.212, respectively. The detailed AVPs of these messages are described in clause 5.3 of TS 29.212.

The P-GW 120 (PCEF 102) uses the CCR command to request PCC rules from the PCRF 118. The PCRF 118 uses the CCA command to send PCC rules to the P-GW 120 (PCEF 102).

TABLE 1

A Specific set of Credit Control Request AVPs over Gx.

| AVP | Description |
| --- | --- |
| CC-Request-Type | The type of the request (initial, update, termination) |
| CC-Request-Number | The number of the request for mapping requests and answers |
| RAT-Type | used to identify the radio access technology that is serving the UE. 0 value shall be used to indicate that the Radio Access Technology (RAT) is WLAN. 1004 value shall be used to indicate that the RAT is EUTRAN. |
| QoS-Information | QoS information for resources requested by the UE, an IP-CAN bearer, PCC rule, QCI or APN. |
| Online | Whether charging method for online pre-configured at the PCEF is applicable or not |
| Offline | Whether charging method for offline pre-configured at the PCEF is applicable or not |

The RAT-Type AVP can be either WLAN (0) or EUTRAN (1004) indicating that the RAT is WLAN or EUTRAN, respectively (clause 5.3.31 of TS 29.212).

Table 2 show some of the AVP's that are included in the Credit Control Answer (CCA) command over Gx. These AVP's are of particular interest in this paper.

Indentations in Table 2 are used to indicate how these AVP's are grouped. The Charging-Rule-Install AVP is a grouped AVP that includes the Charging-Rule-Definition AVP. The Charging-Rule-Definition AVP is a grouped AVP that includes the Charging-Rule-Name AVP, the Service-Identifier AVP, etc.

Multiple instances of the Charging-Rule-Install AVP can be included in the CCA. This is because a request to modify one bearer may result in the PCRF 118 deciding to modify multiple bearers.

TABLE 2

A Specific set of Credit Control Answer AVPs over Gx.

| AVP | Description |
|---|---|
| Charging-Rule-Install | used to activate, install or modify PCC rules as instructed from the PCRF to the PCEF |
| Charging-Rule-Definition | defines the PCC rule sent by the PCRF to the PCEF. |
| Charging-Rule-Name | uniquely identifies the PCC rule |
| Service-Identifier | The identity of the service or service component the service data flow in a PCC rule relates to. |
| Rating-Group | The charging key for the PCC rule used for rating purposes |
| QoS-Information | Authorised QoS for service data flow, an IP-CAN bearer, PCC rule, QCI or APN. |
| Online | defines whether the online charging interface from the PCEF for the associated PCC rule shall be enabled. |
| Offline | defines whether the offline charging interface from the PCEF for the associated PCC rule shall be enabled. |
| Metering-Method | defines what parameters shall be metered for offline charging. PCEF may use the AVP for unit request in online charging in case of decentralized unit determination |

Online charging is done via CCR and CCA messages over the Ro reference point.

The 3GPP CCR message (clause 6.4.2 of TS 32.299) has Diameter Header of 272 and has AVPs, which are described in details in Table 6.4.2 of TS 32.299. Table 3 shows a few relevant AVPs.

TABLE 3

A specific set of the Credit Control Request message AVPs over Ro.

| AVP | Category | Description |
|---|---|---|
| CC-Request-Type | M | This field defines the transfer type: event for event based charging and initial, update, terminate for session based charging. |
| Multiple-Services-Credit Control | $O_C$ | This field contains all parameters for the CTF quota management and defines the quotas to allow traffic to flow. |
| Requested-Service-Unit | $O_C$ | This field contains the amount of requested service units for a particular category or an indication that units are needed for a particular category, as defined in DCCA [402]. |
| Used-Service-Unit | $O_C$ | This field contains the amount of used non-monetary service units measured for a particular category to a particular quota type. |
| Service-Identifier | $O_C$ | This field contains identity of the used service. This ID with the Service-Context-ID together forms an unique identification of the service. |
| Service-Information | $O_M$ | This parameter holds the individual service specific parameters as defined in the corresponding 'middle tier' TS. |
| PS-Information | $O_C$ | The PS-Information AVP allows the transmission of additional PS service specific information elements. The format and the contents of the fields inside the WLAN-Information AVP is specified in clause 6.3.1.2. of 3GPP TS 32.251, "Charging management; packet Switched (PS) domain |
| WLAN-Information | $O_M$ | charging," V12.5.0, March 2014 hereafter "TS 32.251" The WLAN-Information AVP allows the transmission of additional WLAN service specific information elements. The format and the contents of the fields inside the WLAN-Information AVP is specified in clause 6.3.1.2. of TS 32.252 |

The Service-Identifier AVP identifies the service and it is obtained through the PCC rule information as was shown in Table 2 (also Table 6.3 of "Policy and charging control architecture"). It provides the most detailed identification, specified for flow based charging, of a service data flow (P. 77, "Policy and charging control architecture"). PCC rules may share the same service identifier value.

The Service-Information AVP contains information about both the packet-service (PS) and WLAN networks, which can be distinguished from each other using the Service-Context-Id AVP (clause 7.1.12 of TS 32.299). This Service-Context-Id AVP contains a unique identifier of the Diameter Credit Control service specific document that applies to the request. This is an identifier allocated by the service provider/operator, by the service element manufacturer or by a standardization body and uniquely identifies a given Diameter Credit Control service specific document. For offline charging, this identifies the service specific document ('middle tier' TS) on which associated CDRs should based. The format of the Service-Context-Id is: extensions".MNC.MCC."Release"."service-context" "@" "domain"

The 3GPP specific values for "service-context" "@" "domain" are:

For PS charging: 32251@3gpp.org
For WLAN charging: 32252@3gpp.org

The PS-Information AVP (described in clause 7.2.158 of TS 32.299) includes information such as 3GPP-Charging-Id, QoS-Information, 3GPP-Charging-Characteristics, Charging-Rule-Base-Name, and Offline-Charging. The contents of the PS-Information AVP are described in details in clause 6.3.1.2 (Table 6.3.1.2) of TS 32.251. The WLAN-Information AVP (clause 7.2.246 of TS 32.299) includes information about WLAN such as WLAN-Session-Id, PDG-Charging-Id, and WLAN-UE-Local-IPAddress. The contents of the WLAN-Information AVP are described in details in clause 6.3.1.2 (Table 6.3.1.2) of TS 32.252.

The 3GPP CCA message over Ro (clause 6.4.3 of TS 32.299), is sent by the OCF 404 to the CTF 302 in order to reply to the CCR. Table 4 shows a specific set of the CCA message AVPs, which are similar to CCR message AVPs.

TABLE 4

A specific set of the Credit Control Answer message AVPs over Ro.

| AVP | Category | Description |
| --- | --- | --- |
| CC-Request-Type | M | This field defines the transfer type: initial, update, terminate for session based charging and event for event based charging. |
| Multiple-Services-Credit-Control | $O_C$ | This field contains all parameters for the CTF quota management and defines the quotas to allow traffic to flow. |
| Granted-Service-Unit | $O_C$ | This field contains the amount of granted service units for a particular category. |
| Service-Identifier | $O_C$ | This field contains identity of the used service. This ID with the Service-Context-ID together forms an unique identification of the service. |
| Service-Information | $O_C$ | This parameter holds the individual service specific parameters as defined in the corresponding 'middle tier' TS. |
| PS-Information | $O_C$ | Clause 6.3.1.2. of TS 32.251. |
| WLAN-Information | $O_M$ | Clause 6.3.1.2. of TS 32.252. |

The offline charging messages over Rf adds the charging related information to CDR. The main request and answer messages are Accounting Request (ACR) and Accounting Answer (ACA). The message formats of these offline charging messages are described in details in Section 6.2 of TS 32.299. The main AVPs are listed in the following 2 subsections.

Table 5 shows a few AVPs of the Accounting Request (ACR) message over Rf. The complete list of AVPs is presented in Table 6.2.2 of TS 32.299.

TABLE 5

A Specific set of the Accounting Request AVPs over Rf.

| AVP | Category | Description |
| --- | --- | --- |
| Session-Id | M | This field identifies the operation session. |
| Accounting-Record-Type | M | This field defines the transfer type: start, interim, stop for session based charging. |
| Service-Context-Id | $O_M$ | This field indicates the service and the corresponding 'middle tier' TS. |
| Service-Information | $O_M$ | This parameter holds the individual service specific parameters as defined in the corresponding 'middle tier' TS. |

The Accounting-Record-Type will include start, interim, or stop AVP for initial open, update record, and close record actions to the CDR. The Service-Context-Id and Service Information AVPs were discussed above.

Table 6 shows a few AVPs of the Accounting Answer message over Rf. The complete list of AVPs is presented in Table 6.2.3 of TS 32.299.

TABLE 6

A Specific set of the Accounting Answer AVPs over Ro.

| AVP | Category | Description |
| --- | --- | --- |
| Session-Id | M | This field identifies the operation session. |
| Accounting-Record-Type | M | This field defines the transfer type: start, interim, stop for session based charging. |

SUMMARY

In one embodiment, the PCEF may be made aware of what Radio Access Technology (RAT) is used by each bearer, or flow, and whether the use of the RAT was initiated by the UE or ISWN. Embodiments concern making a PCEF aware of whether a UE connects through licensed spectrum or unlicensed spectrum. An example of a licensed spectrum connection is a cellular connection. An example of an unlicensed spectrum connection is a WIFI connection.

Existing session management messages can be modified to allow the PCEF volume based online charging functionality to remain in the core network (i.e. in the P-GW/PCEF). Session management messaging between the ISWN (ISW-GW) and the core network (P-GW/PCEF) may be modified so that the core network may be notified when the ISWN moves a bearer, or flow, from one RAT to another. When the core network (P-GW/PCEF) receives these updated session management notifications, it contacts the PCRF to fetch and apply new charging rules for the bearer, or flow.

Another solution is based on adding PCEF volume based online charging functionality to the ISWN. The PCEF of the ISWN can be tasked with performing volume based online charging while the UE is in the ISWN. In this solution, a new PCEF function is added at the ISW-GW, namely, ISWN-PCEF. The ISWN-PCEF can be responsible for all ISWN-related functionalities related to online and offline charging, done typically at the PCEF of the P-GW. The ISWN-PCEF can communicate with the PCRF, over a Gx reference point that has been enhanced to allow the ISWN to obtain multiple sets of PCC rules. The ISWN-PCEF can select the appropriate PCC rule to apply based on the utilized and RAT and whether use of the RAT was initiated by the ISWN or the UE. The session management messaging between the ISWN (ISW-GW) and the MNO's core network (P-GW/PCEF) can be updated so that the ISWN and MNO can coordinate which entity (ISW-GW or P-GW/PCEF) will perform volume based online charging. The ISW-GW can also communicate with the OCS and OFCS within the MNO's core network via an Ro and Rf reference point respectively.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 11A illustrates a Traffic Aggregate Description according to the application.

FIG. 11C illustrates a packet filter list according to the application.

FIG. 11D illustrates encoding of the indication information element according to the application.

FIG. 18 is a diagram that illustrates the Attribute Valve Pairs (AVPs) of the Credit Control Answer (CCA).

FIGS. 21A-D are diagrams that illustrates interfaces of one embodiment.

DETAILED DESCRIPTION OF ILLUSTRATIVE EMBODIMENTS

Small cells are Localized geographic areas providing wireless network access via operator-licensed spectrum using 3GPP-defined cellular Radio Access Technologies (RATs). An example small cell is the 4G LTE RAT providing access to the Evolved Packet Core (EPC) network.

Femtocells are Class of small cells designed as "plug-and-play" Customer Premises Equipment (CPE) that can be installed in residential and enterprise environments without the need for an experienced technician. Public femtocell "hotspot" deployments are also supported. 3GPP refers to UMTS femtocells as Home NodeBs (HNB) and LTE femtocells as Home eNodeBs (HeNB). H(e)NBs use a broadband Internet connection to access a remote H(e)NB Management System (H(e)MS) for automatic configuration, while also providing backhaul access to the Mobile Core Network (MCN) for cellular services.

Trusted WLAN use appropriate measure to safeguard the EPC from access via the WLAN. Such measures are left to the discretion of the mobile network operator (MNO) and may, for example, include establishment of a tamper-proof fiber connection between the WLAN and EPC, or establishment of an IPSec security association between the WLAN and a Security Gateway (SeGW) at the EPC edge.

Integrated Small Cell and WiFi Network (ISWN) is a joint access network deployed by mobile operators for both small cells and WLAN access. Such networks may include enhancements to multi-RAT terminal capabilities, small cell and WiFi access capabilities, EPC network elements, and configuration/policy/traffic management functions.

Offline charging refers to a charging model where services are provided and charging records are created without authorization. It is assumed that the user is authorized for the requested service. A Charging Data Record (CDR) is created after the service is provided.

Figure 7:
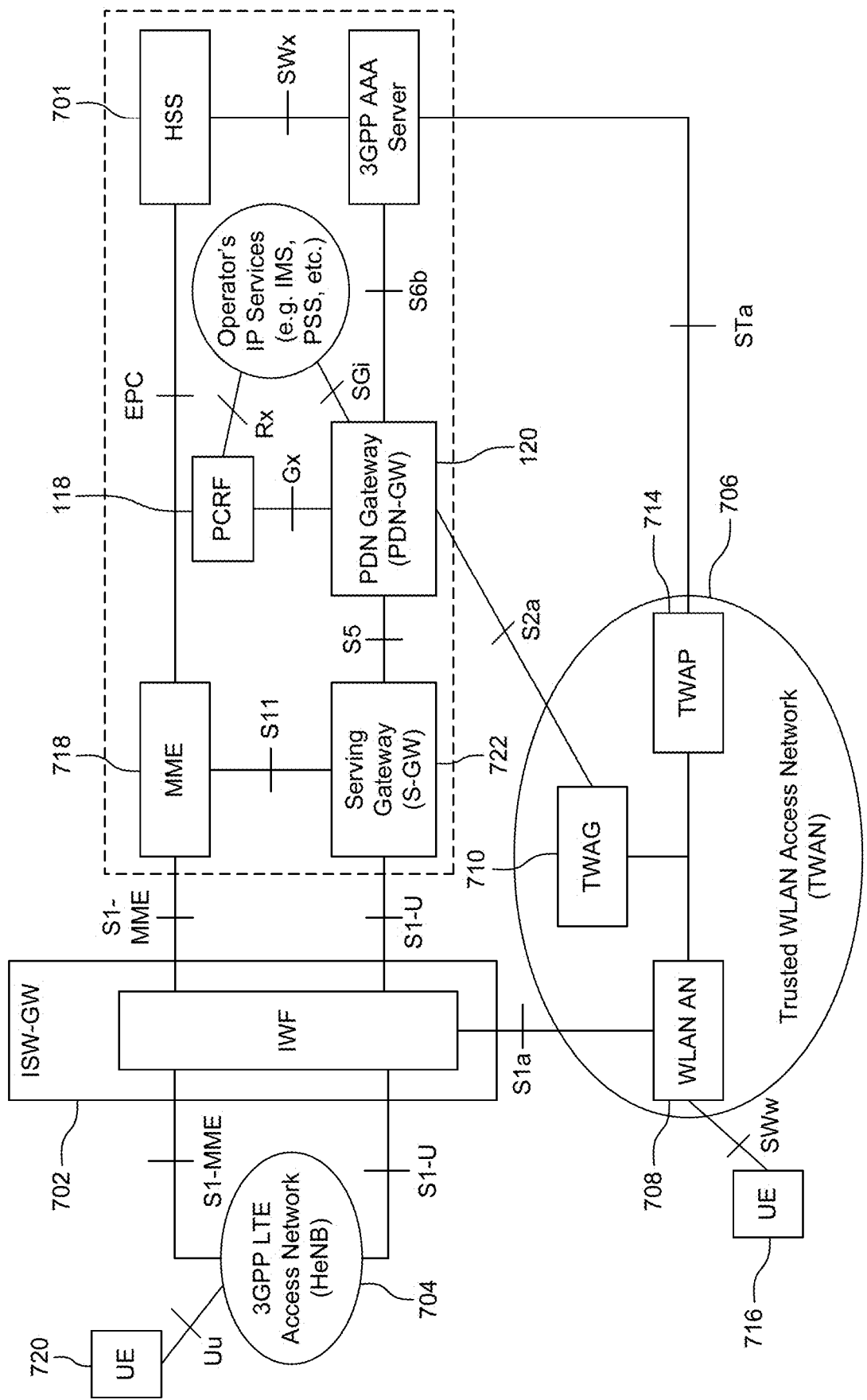
FIG. 7 is a diagram that illustrates an integrated Small Cell and Wi-Fi Gateway (ISW-GW).

FIG. 7 is a diagram that illustrates an integrated Small Cell and Wi-Fi Gateway (ISW-GW). The (ISW-GW) 702 communicates with both HeNB 704 and WLAN 706. As shown in 7, the ISW-GW 702 communicates with the HeNB 704 via the S1-MME and S1-U reference points for control and data planes, respectively. On the Trusted WLAN Access Network (TWAN) 706 side, S1a interface is defined between the WLAN AN and ISW-GW 702 for both control and data planes.

The Trusted WiFi Access Gateway (TWAG) 710 is used to tunnel the data plane traffic between the UE 716 and the P-GW 120 via the S2a.

The Trusted WiFi Access Point (TWAP) 714 is the logical entity in the trusted WiFi access network that authenticates and authorizes the UE's connection with the core network.

In this example, the TWAG/S2a is not deployed. Rather, all user plane traffic is routed through the ISW-GW 702.

Figure 8:
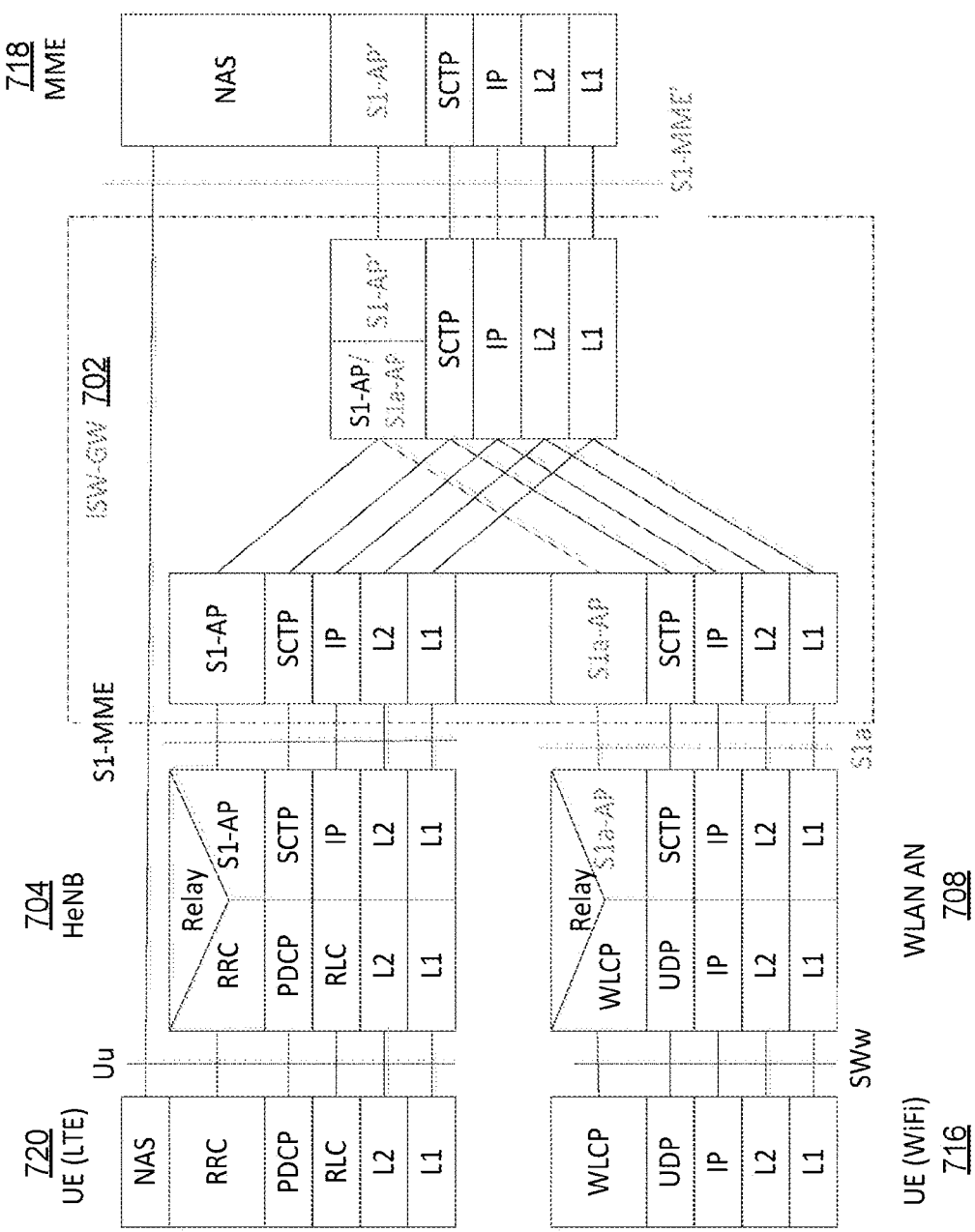
FIG. 8 is a diagram that illustrates protocol stacks of the ISW-GW 702 control plane.

FIG. 8 is a diagram that illustrates protocol stacks of the ISW-GW 702 control plane. As shown, SCTP/S1-AP protocol carries the control plane between the HeNB 704 and the ISW-GW 702, while the UDP/GTPv2-C protocol carries the control plane between the WLAN AN 708 and the ISW-GW 702. The main message carried over the S1a interface is the "Create Session Request," which is used to establish an initial connection, handover, or multi-PDN connection. The ISW-GW 702 uses an extended version of S1-AP protocol (Ex-S1-AP) to communicate the control planes of both the HeNB 704 and WLAN 706 to with the MME 718.

Figure 9:
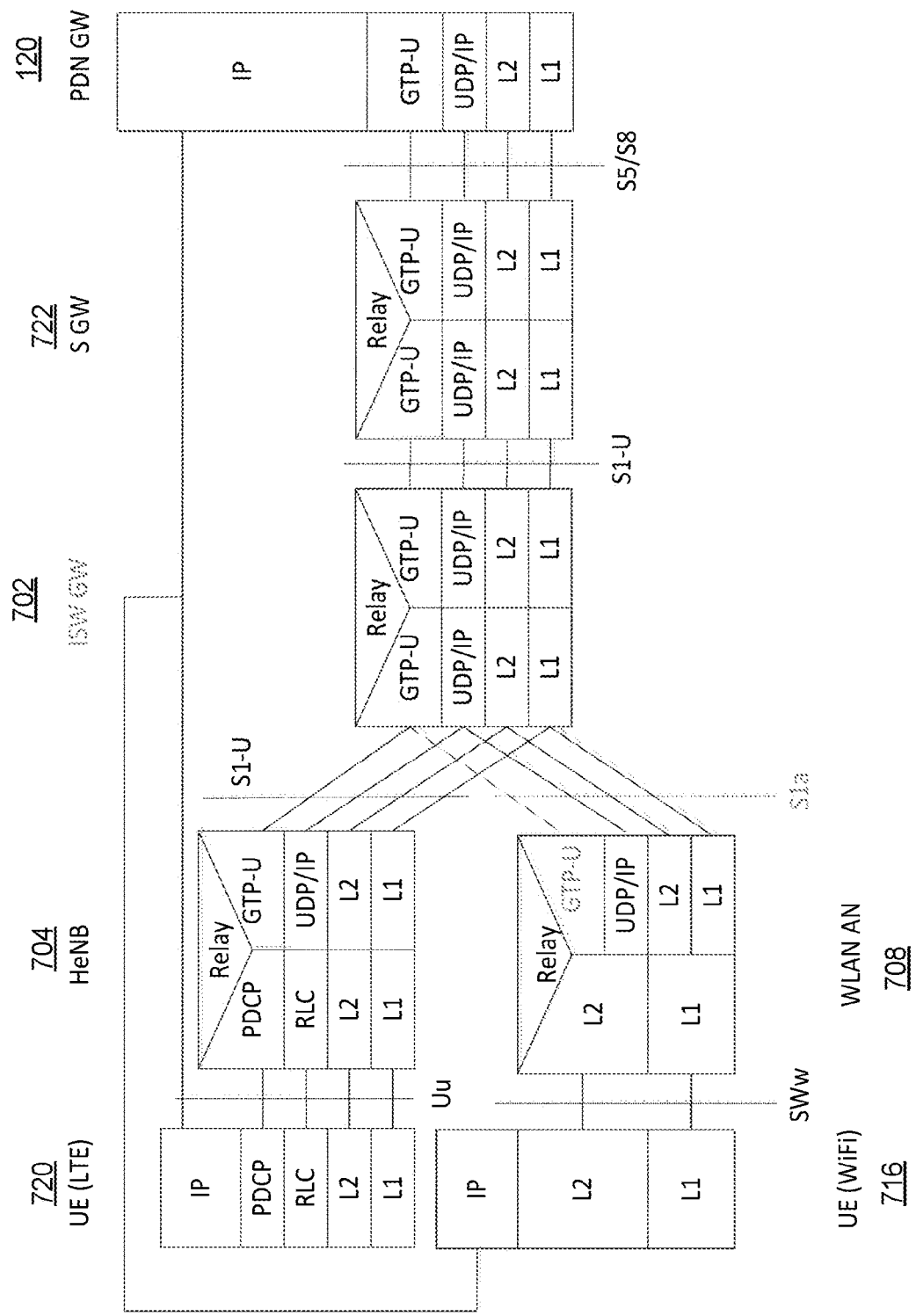
FIG. 9 is a diagram that illustrates a user plane of the ISW-GW 702.

FIG. 9 is a diagram that illustrates a user plane of the ISW-GW 702. As shown, the HeNB 704 and WLAN AN 708 use the GTP-U tunneling protocol to send/receive data to/from the ISW-GW 702. Similarly, the GTP-U protocol is used between the ISW-GW 702 and the S-GW 722.

The ISW-GW 702 hides the details of the underlying ISWN from the Evolved Packet Core (EPC). In other words, it handles the handover procedure from one air interface to another without requiring a high degree of coordination with any core network entity (e.g. MME 718, S-GW 722, or P-GW 120). More specifically, the ISW-GW 702 takes the handover decision based on inter-RAT measurements of both long Term Evolution (LTE) and Wi-Fi air interfaces. Then, it establishes the right user plan sub-tunnel between the ISW-GW 702 at one side and the HeNB 704 or WLAN AN 708 at the other side.

In an ISW network, data will be flowing from between the UE 716 or 720 and the P-GW 120 over either LTE or Wi-Fi air interfaces. As shown in FIG. 7, the LTE path will consist of the UE, HeNB 704, ISW-GW 702, S-GW 722, and P-GW 120 entities. On the other hand, the Wi-Fi path will consist of the UE 720, WLAN AN 708, ISW-GW 702, S-GW 722, and P-GW 120 entities. The ISW-GW 702 will act as the local anchor point and will steer the traffic between LTE and Wi-Fi air interfaces. As a result, the entities in the EPC, such as the MME 718, S-GW 722 and P-GW 120, will not know if a bearer, or flow, is using a cellular or WiFi RAT.

Figure 1:
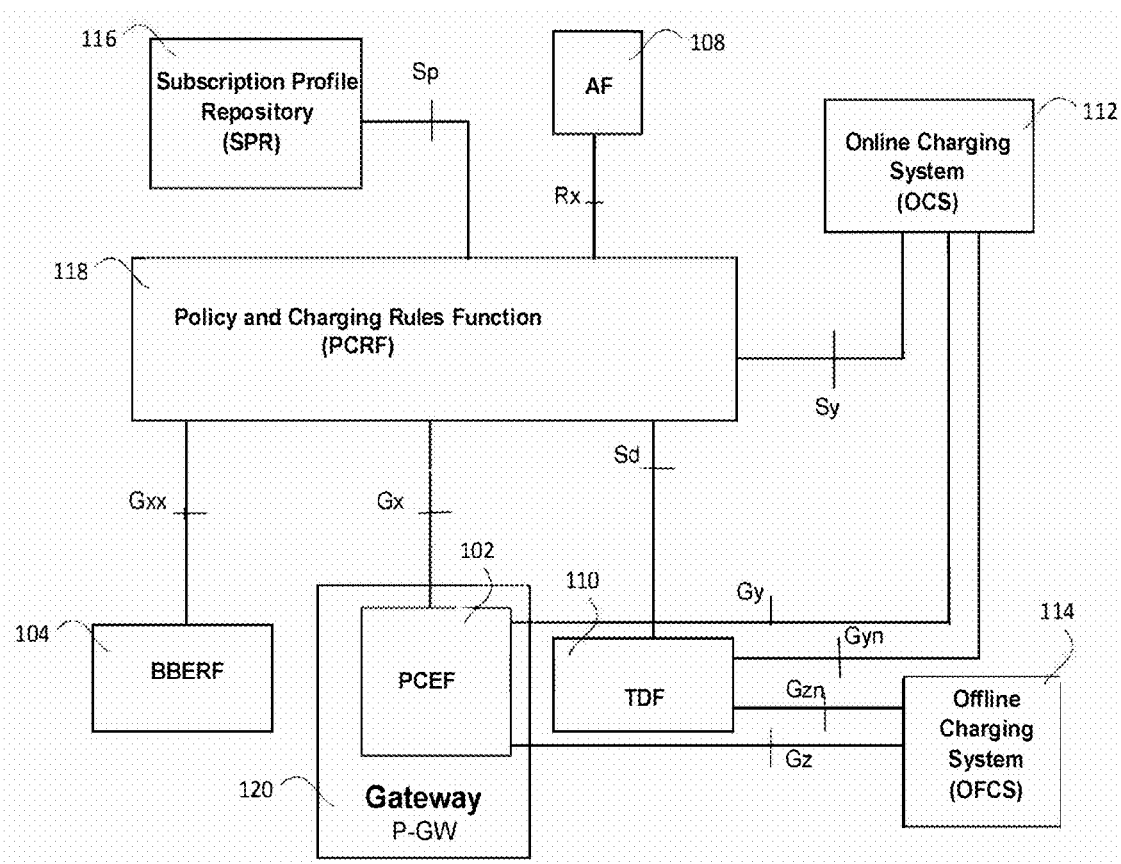
FIG. 1 is a diagram of a Policy and Charging Control (PCC) architecture
Figure 2:
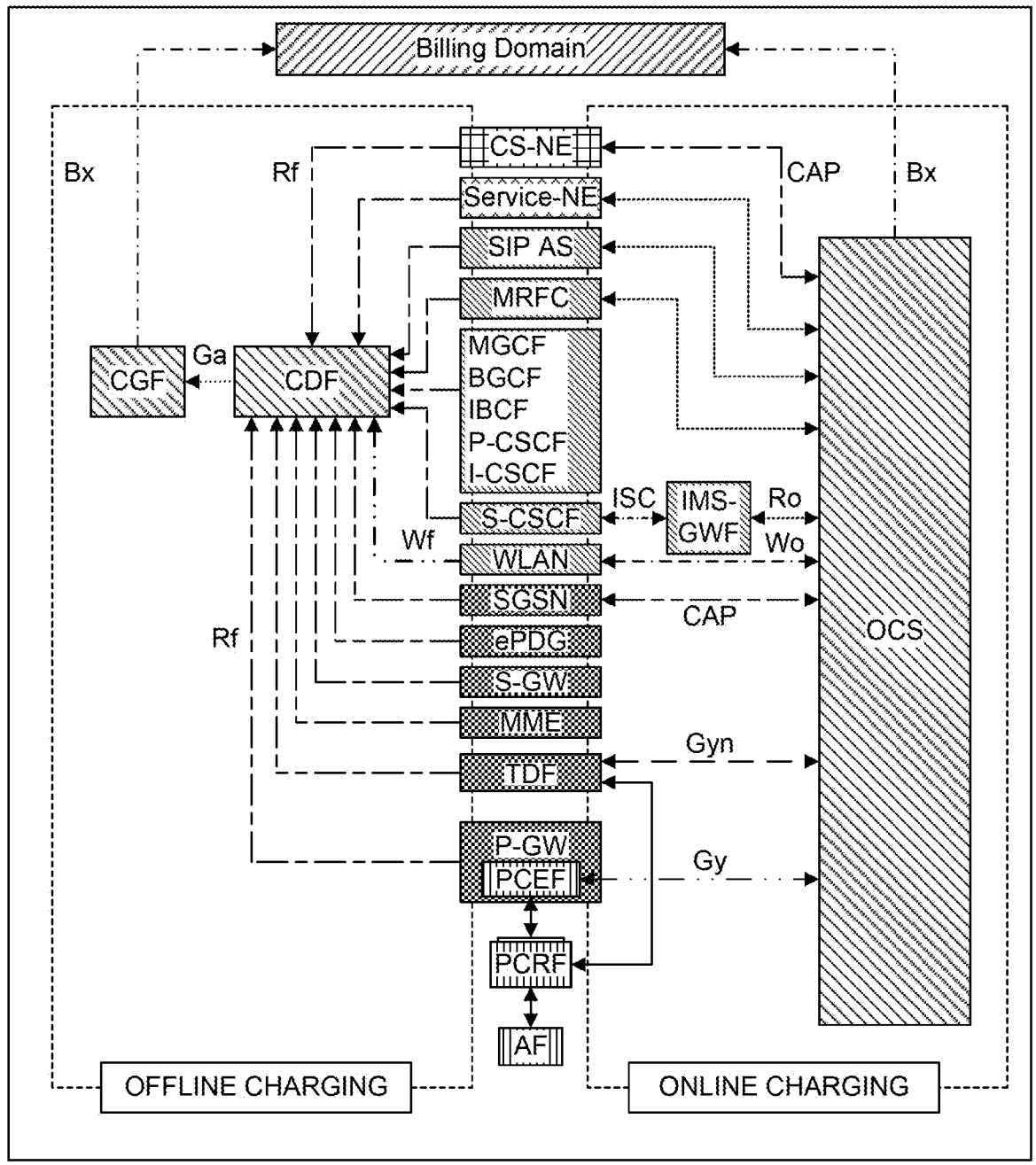
FIG. 2 is a diagram that illustrates a high level common architecture for online and offline charging
Figure 3:
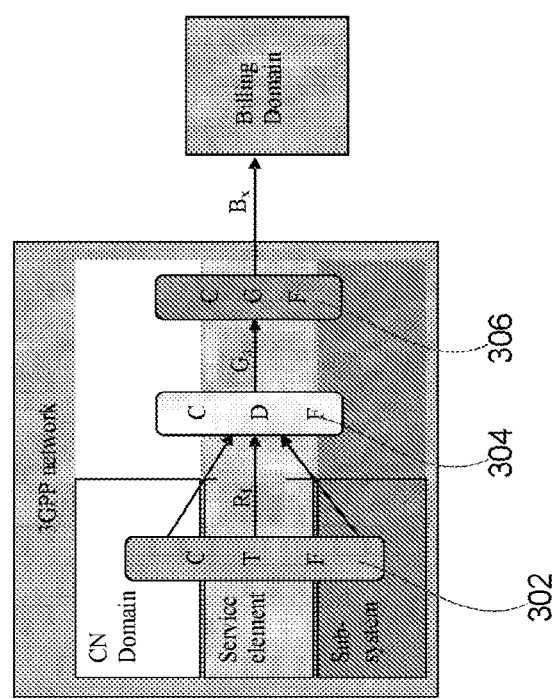
FIG. 3 is a diagram that illustrates an offline charging architecture, which consists of multiple logical entities.
Figure 4:
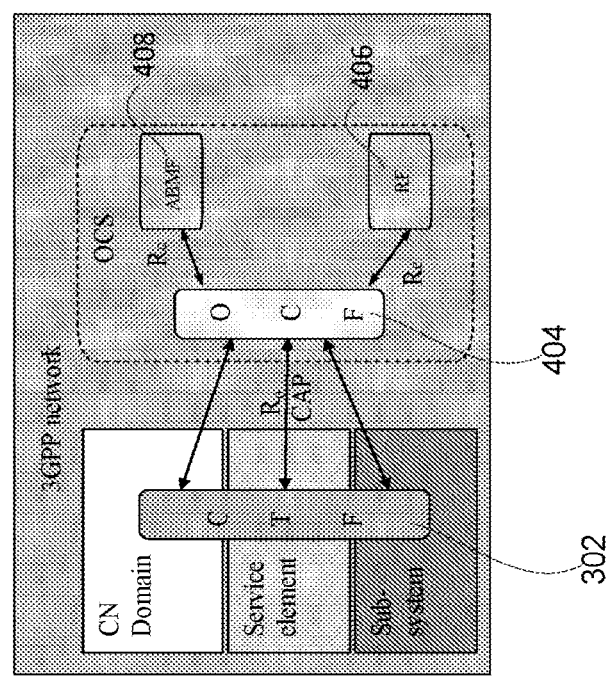
FIG. 4 is a diagram that illustrates an architecture of an Online Charging System (OCS).
Figure 5:
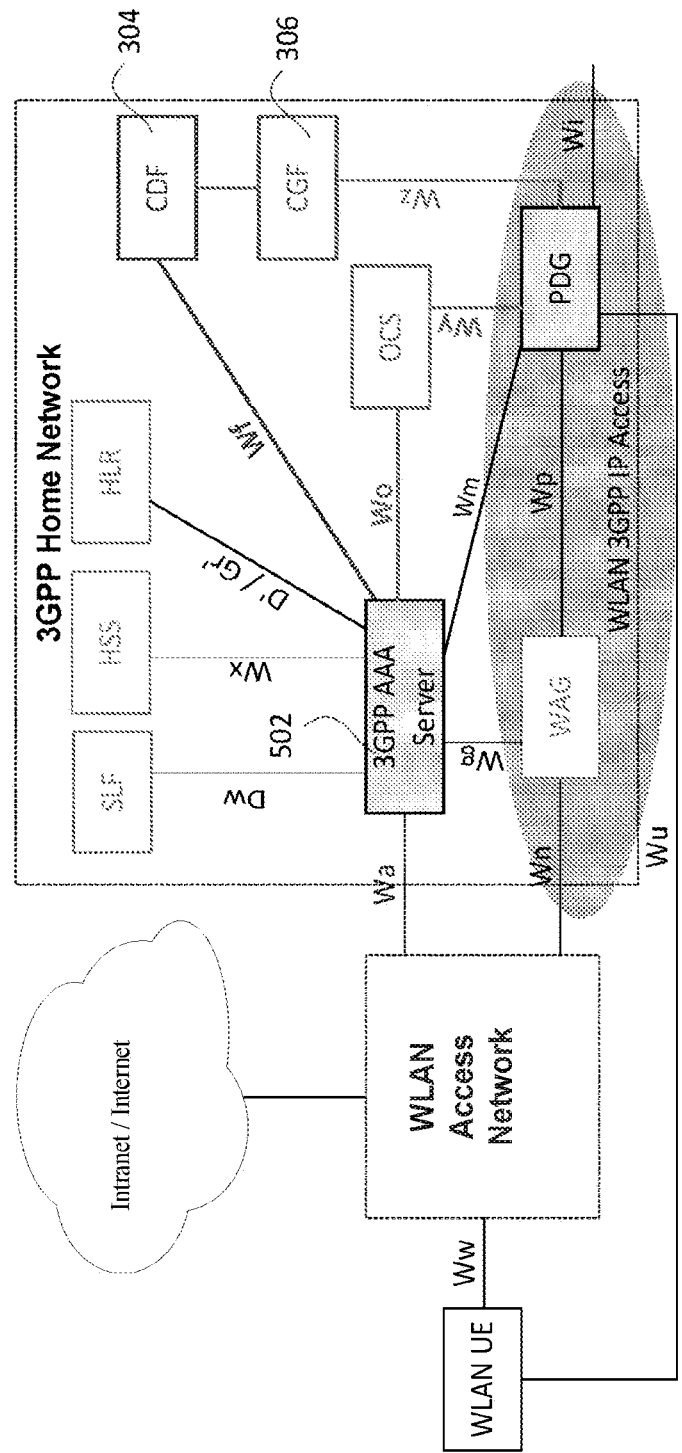
FIG. 5 is a diagram that illustrates a charging architecture for the Interworking-WLAN (I-WLAN) architecture
Figure 6:
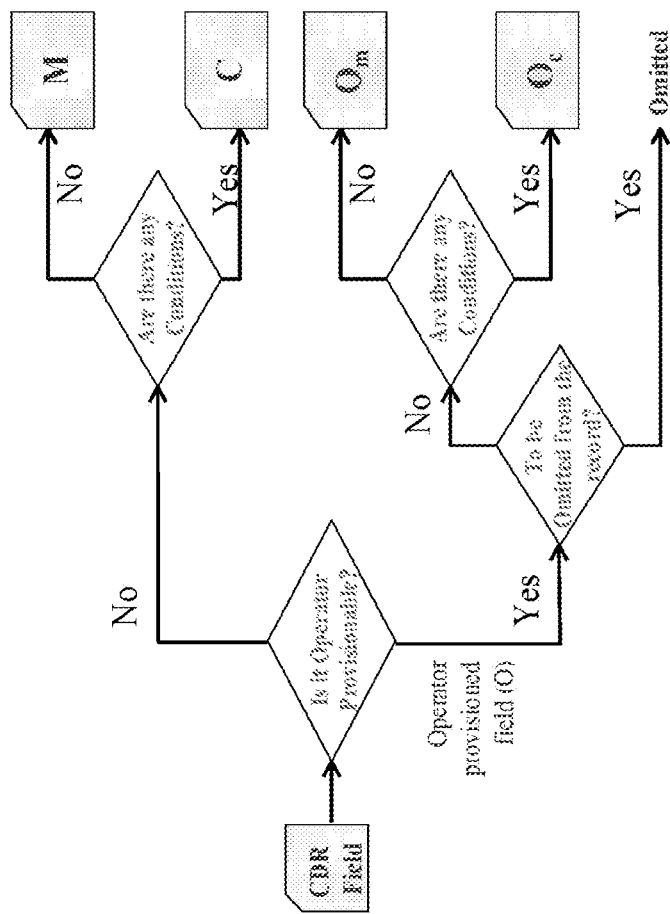
FIG. 6 is a logical diagram illustrating the possible presence requirements for charging event/CDR parameters ("field categories").

Currently, and as shown in FIG. 1 and FIG. 2, the volume-based online charging is performed by the P-GW 120 (PCEF 102). The PCEF 102 communicates with the OCS 112 over the Ro reference point. However, since Wi-Fi/LTE handover events are hidden from the P-GW 120, the P-GW 120 is not necessarily aware of which Radio Access Technology (RAT) is used for each data flow. Thus, the ISWN architecture needs to be enhanced to allow for the P-GW 120 to be provided with enough real time information to properly perform volume based online charging. In terms of offline charging, this is not as much of an issue; because the ISWN can simply create CDR's and deliver them to the core network or the billing system after data services are provided.

Currently, charging models do not account for why a UE 716 or 720 is using a specific RAT. In an ISW network, it is possible that a handover may be initiated by the UE 716 or 720 or by the ISWN (i.e. the ISW-GW 702 or alternatively the MME 718 or S-GW 722). The charging rules should depend on whether the UE 716 or 720 or a network node initiated the handover (i.e. UE-initiated or network-initiated). For example, if a user is commanded by the network to use a cellular RAT while he has a good quality Wi-Fi connection (e.g. due to network load balancing), then the UE 716 or 720 should not be charged a more expensive price for the cellular connection.

In Summary, the P-GW 120 (particularly, the PCEF 102) in the ISW-GW 702-based EPC-WLAN interworking architecture, is unaware of the initiator of the handover as well as the utilized air interface. Consequently, the volume based charging cannot be based on what RAT is utilized. Charging records should make it possible to identify if a flow from one network to another was network initiated or UE 716 or 720 initiated.

There are two main solutions to the charging problem that is described above.

One solution is based on modifying existing session management messages and allows the PCEF volume based online charging functionality to remain in the MNO's core network (i.e. in the P-GW 120/PCEF 102).

Another solution that is based on adding PCEF volume based online charging functionality to the ISWN. The PCEF 1402 of the ISWN will be tasking with performing volume based online charging while the UE 716 or 720 is in the ISWN.

Session Management Based Solution

The PCEF 102 is the logical function in the EPC that is tasked with monitoring data plane traffic through the network and interacting with the online charging system. The PCEF 102 will count the number of bytes sent to/from a UE 716 or 720 on a per flow or per bearer basis. The PCEF 102 functionality is usually placed inside of the P-GW 120.

This section presents an ISWN charging architecture that is based on the assumption that the PCEF functionality will remain in the P-GW 120. By keeping the PCEF 102 functionality with the P-GW 120, and not moving it to the ISWN, the MNO retains complete control over all volume based online charging. However, since Wi-Fi/LTE handover events are hidden from the P-GW 120, the P-GW 120 is not necessarily aware if RAT is used for each data flow. Thus, the ISWN architecture needs to be enhanced to allow for the P-GW 120/PCEF 102 to be provided with enough information to properly perform volume based online charging.

Figure 10:
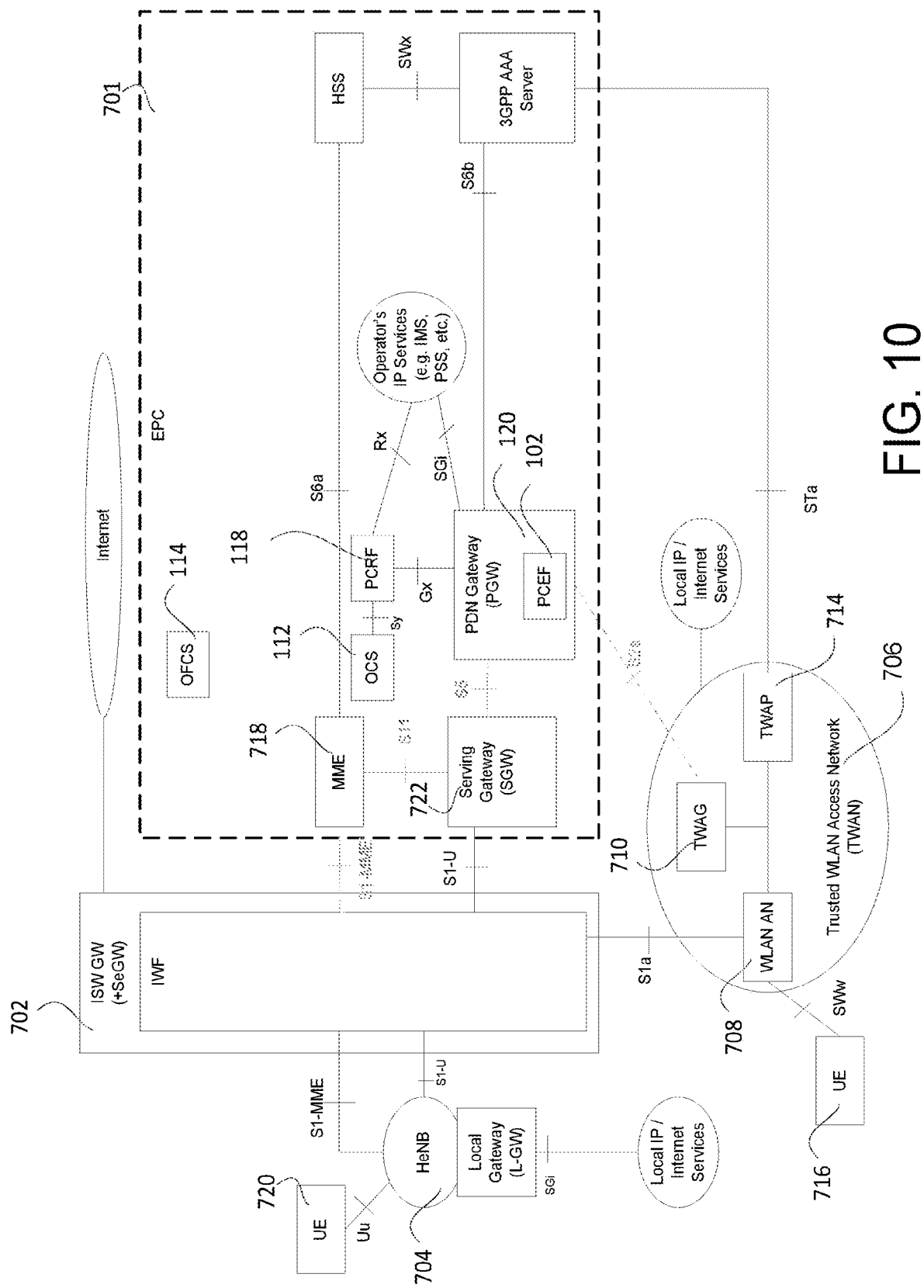
FIG. 10 is a diagram that illustrates an architecture of the ISWN.

FIG. 10 is a diagram that illustrates an architecture of the ISWN. As discussed above, the ISW-GW 702 hides the details of the underlying ISWN from the EPC. However, the PCEF 102 requires some knowledge of the underlying network state in order to provide differentiated charging based on what RAT(s) are being used by the UE 716 or 720. This section resolves this issue by updating the session management messaging between the ISW-GW 702, MME 718, S-GW 722, and P-GW 120.

The Session Management (SM) messaging in the architecture of FIG. 10 is updated so that the ISWN can inform the PCEF 102 what RAT(s) are being used and the PCEF 102 can adjust charging accordingly. The Session Management updates allows the ISWN to inform the EPC 701 of what RAT is used to send each data flow to the UE 716 or 720 and whether the UE 716 or 720 or ISWN selected the RAT. The updated session management messages will originate at the ISW-GW 702. Alternatively, if RAT selection is performed at the MME 718 or S-GW 722, then the messages may originate at the MME 718 or S-GW 722 respectively.

In an ISW-GW 702 deployment, a single bearer may exist between the P-GW 120 and ISW-GW-702 and the single bearer may map to as many as two radio bearers (3GPP or WLAN). At times, the ISW-GW 702 may decide to move a flow (or an entire bearer) from one RAT to another RAT. When this occurs, the change should be largely transparent to the core network. However, the P-GW 120/PCEF 102 should be notified so that each flow can be charged appropriately.

It is understood that the functionality illustrated in FIG. 10, may be implemented in the form of software (i.e., computer-executable instructions) stored in a memory of, and executing on a processor of, a node of a network (e.g., a server, gateway, device, or other computer system), such as one of those illustrated in FIG. 22C or 22D described below.

Figure 11:
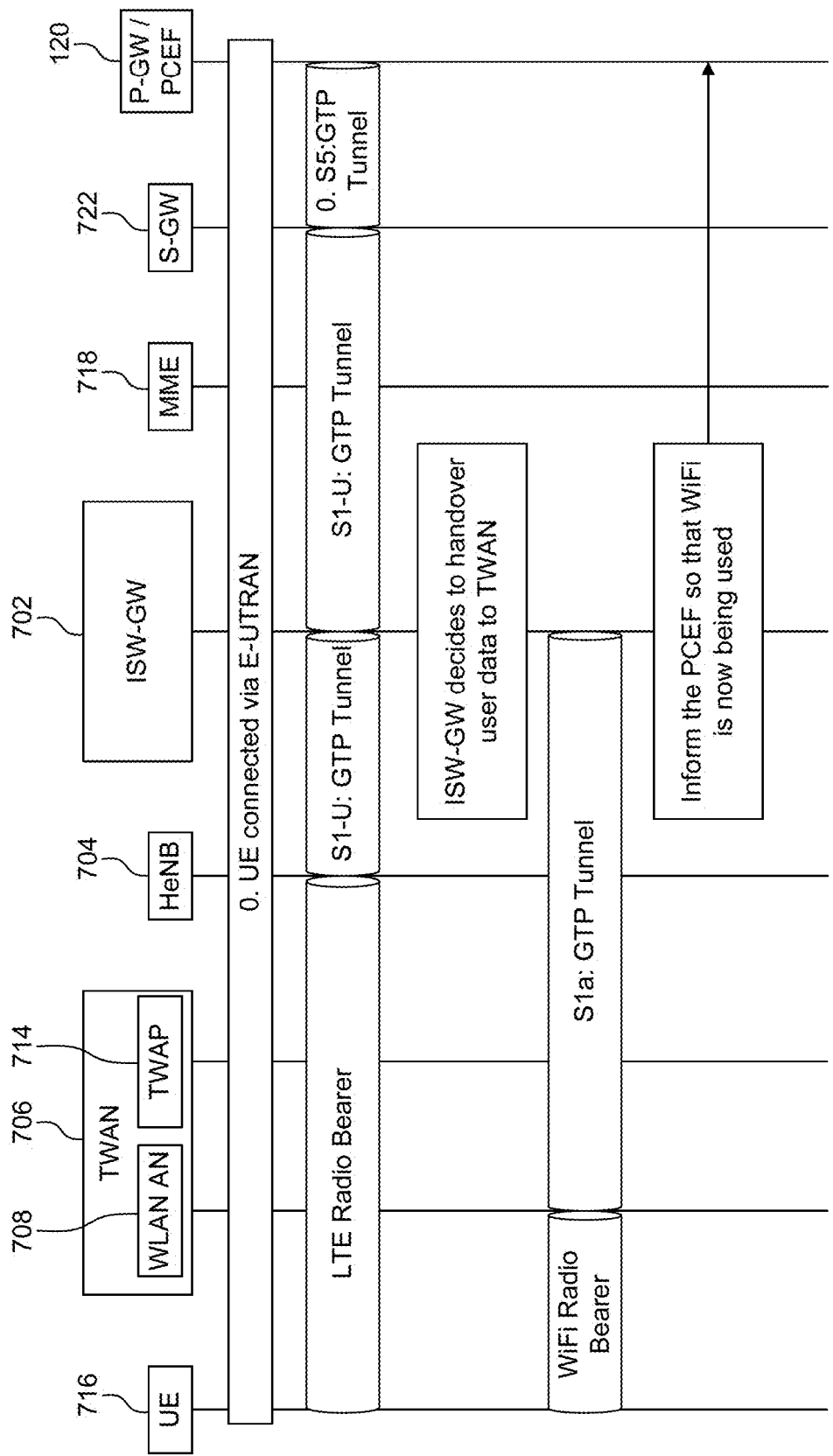
FIG. 11 is a diagram that illustrates an example case where the ISW-GW 702 moves a flow from LTE to WiFi.

FIG. 11 is a diagram that illustrates an example case where the ISW-GW 702 moves a flow from LTE to WiFi and needs to notify the P-GW 120/PCEF 102 that the flow has been moved so that the PCEF 102 can adjust what charging rules are applied. Currently, there is not a mechanism for sending the notification that is shaded in FIG. 11.

The following call flow shows how the ISW-GW 702 may notify the PCEF 102 when a flow or group of flows is moved from one RAT to another. The changes described in this section will result in updates on the S1-MME, S11, and S5 interfaces. These interfaces are in bold in FIG. 10.

Figure 12:
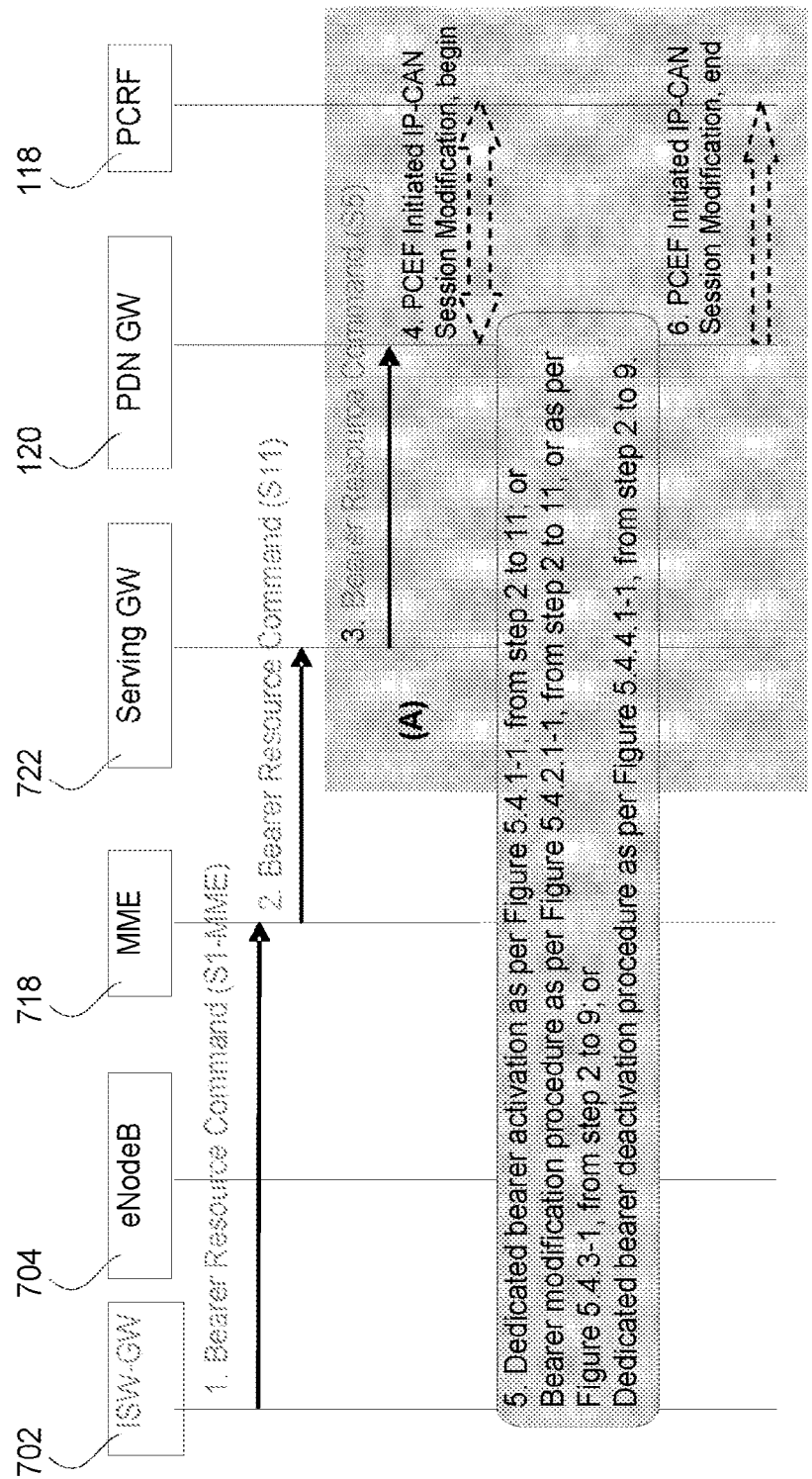
FIG. 12 is a diagram that illustrates a modified version of the UE initiated Bearer Resource Modification procedure

FIG. 12 is a diagram that illustrates a modified version of the UE initiated Bearer Resource Modification procedure that is described in section 5.4.5 of TS 23.401. Currently, only UE 716 or 720 can initiate the Bearer Resource Modification procedure. The UE 716 or 720 uses this procedure to release resource or modify resources (i.e. adjust QoS). FIG. 12 has been updated to show that the ISW-GW 702 may initiate the "bearer resource modification" procedure. This procedure can be used by the ISW-GW 702 to indicate to the P-GW 120 (PCEF 102) when flows or bearers are moved between Wi-Fi and Cellular.

Currently, UE 716 or 720 initiates the "bearer resource modification" procedure by sending the "Bearer Resource Modification" message to the MME 718 via NAS messaging. The "Bearer Resource Modification" message is defined in 3GPP TS 24.301, "Non-Access Stratum (NAS) Protocol for Evolved Packet System (EPS)," V12.5.0, June 2014, hereafter "TS 24.301".

In the call flow of FIG. 12, communication between the ISW-GW 702 and MME 718 may be GTPv2-C (not NAS based) via S1-MME as shown in FIG. 10. Thus, the ISW-GW 702 may use an enhanced version of the "Bearer Resource Command" message to inform the MME 718, S-GW 722, and P-GW 120 that the bearer's treatment is changing. The GTPv2-C "Bearer Resource Command" message is defined in section 7.2.5 of reference TS 29.274. The "Bearer Resource Command" message and the enhancements are shown in Table 7.

The "Bearer Resource Command" message includes a "RAT Type" information element which is defined in 3GPP TS 24.008, "Mobile radio interface Layer 3 specification; Core network protocols; Stage 3," V12.6.0, June 2014 hereafter TS 24.008 and is shown in FIG. 11A. Aspects of Tables 7-8 represents a change to how the "RAT Type" IE may be encoded. A value of 8, which is currently a spare value, may be used by the ISW-GW 702 to indicate to the MME 718, S-GW 722, and P-GW 120 that the S5/S1-U bearer will be sent to the UE 716 or 720 over multiple radio bearers, or multiple RAT's. For example, some flows of the S5/S1-U bearer may be sent to the UE 716 or 720 via a cellular radio bearer and other flows may be sent to the UE 716 or 720 via WLAN. Alternatively, a value of 8 could simply indicate that the ISW-GW 702 will dynamically adjust the RAT type.

The "traffic aggregate description" information element can be used to indicate what is RAT is used for each flow in the bearer. Setting the "RAT Type" to Virtual (7) could indicate to the MME 718, S-GW 722, and P-GW 120 that further inspection of the "traffic aggregate description" should be used to determine what is RAT is used for each flow in the bearer.

Figure 11B:
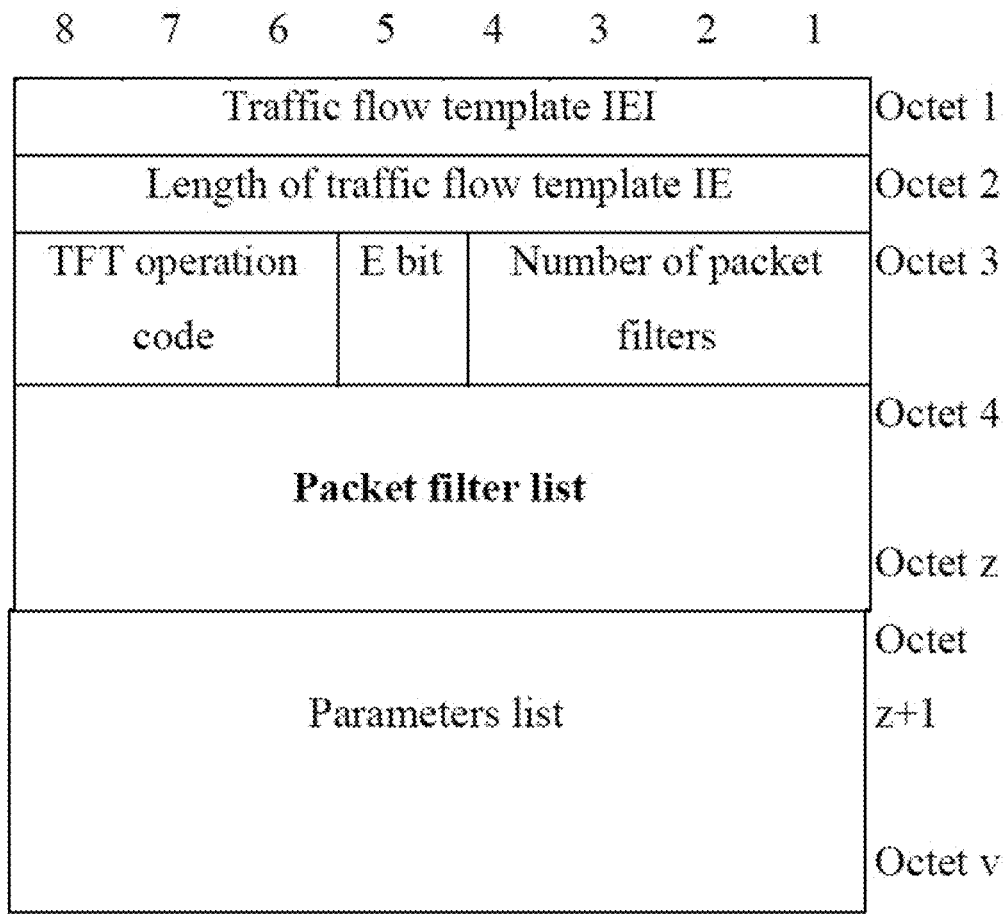
FIG. 11B illustrates a traffic flow template information element according to the application.

The "Bearer Resource Command" message includes a "traffic aggregate description" information element which is defined in TS 24.008 and is detailed in FIG. 11A, FIG. 11B, and FIG. 11C. The traffic flow aggregate includes a list of packet filters. The packet filter can be used to convey the MME 718, S-GW 722, and P-GW 120 what RAT is being used for each flow and whether the RAT choice was made by the UE 716 or 720 or ISW-GW 702. Aspects of Table 7, FIG. 11A, FIG. 11B, and FIG. 11C represent a change to how the packet filters IE may be encoded. An "ISW-GW 702 RAT Change" flag may be added to the Indications Flag field of the Bearer Resource Command" message as shown in Table 7 and FIG. 11D. This new flag may be used to indicate that the purpose of the command is to indicate that the ISW-GW 702 is changing the RAT of a bearer or flow.

The 8th bit of the first octet of each packet filter can be used to indicate whether the flow is routed over a cellular RAT by the ISW-GW 702. As shown in FIGS. 11B-11C, this bit may be named "3GPP" and may be used to indicate of the flow is routed over a 3GPP or a non-3GPP RAT. For example, the 3GPP bit may be set when the RAT Type is UTRAN, GERAN, HSPA-Evolution, or E-UTRAN and the 3GPP bit may be cleared when the RAT type is virtual, GAN, or WLAN. Currently, this bit is marked as an unused spare in TS 24.008. Alternately, a new RAT Type information element could be included associated with each packet filer so that the RAT type can be explicitly indicated for each packet filter.

The 7th bit of the first octet of each packet filter may be used to indicate whether the RAT that is currently used by the flow was selected by the ISW-GW 702 or the UE. As shown in FIG. 11C, this bit may be named "Network Initiated (NI)" and may be used to indicate of the flow was directed to the current RAT by the UE 716 or 720 or the ISW-GW 702. Currently, this bit is marked as an unused spare in TS 24.008. Alternatively, a "Network Initiated (NI)" flag may be added to the Indications Flag field of the Bearer Resource Command" message as shown in Table 7 and FIG. 11D.

The modified GTPv2-C messages provide the P-GW 120/PCEF 102 with information about what RAT is used for each flow within the bearer and indicate if the local ISW network (ISW-GW 702) selected the RAT or if the UE 716 or 720 selected the RAT. The PCEF 102 can use this information to adjust how the UE 716 or 720 is charged for each flow. For example, flows that use a cellular RAT may be charged differently than flows that use a WLAN RAT or flows may avoid certain charges if the RAT that is being used was selected by the ISW network (ISW-GW 702).

Note that this description assumed that the ISW-GW 702 uses GTPv2-C to communicate with the MME 718. However, NAS messaging or SCTP/S1-AP messaging may be alternatively used between ISW-GW 702 and MME 718. If the some other type of messaging is used between the ISW-GW 702 and MME 718, then similar information may be encoded in such messaging.

Figure 22A:
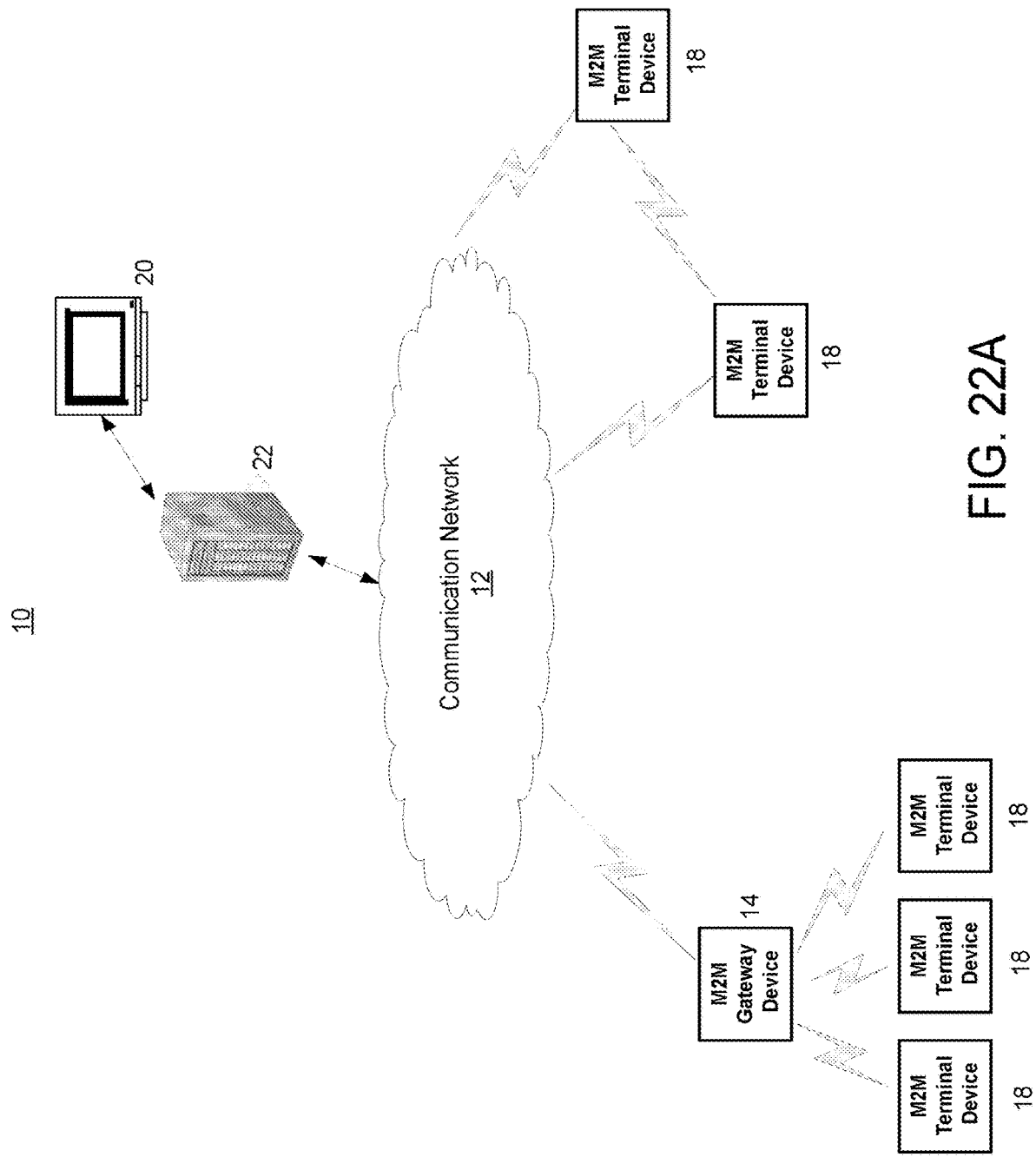
FIG. 22A is a diagram of an example machine-to machine (M2M) or Internet of Things (IoT) communication system in which one or more disclosed embodiments of IoT event management systems and methods may be implemented.
Figure 22B:
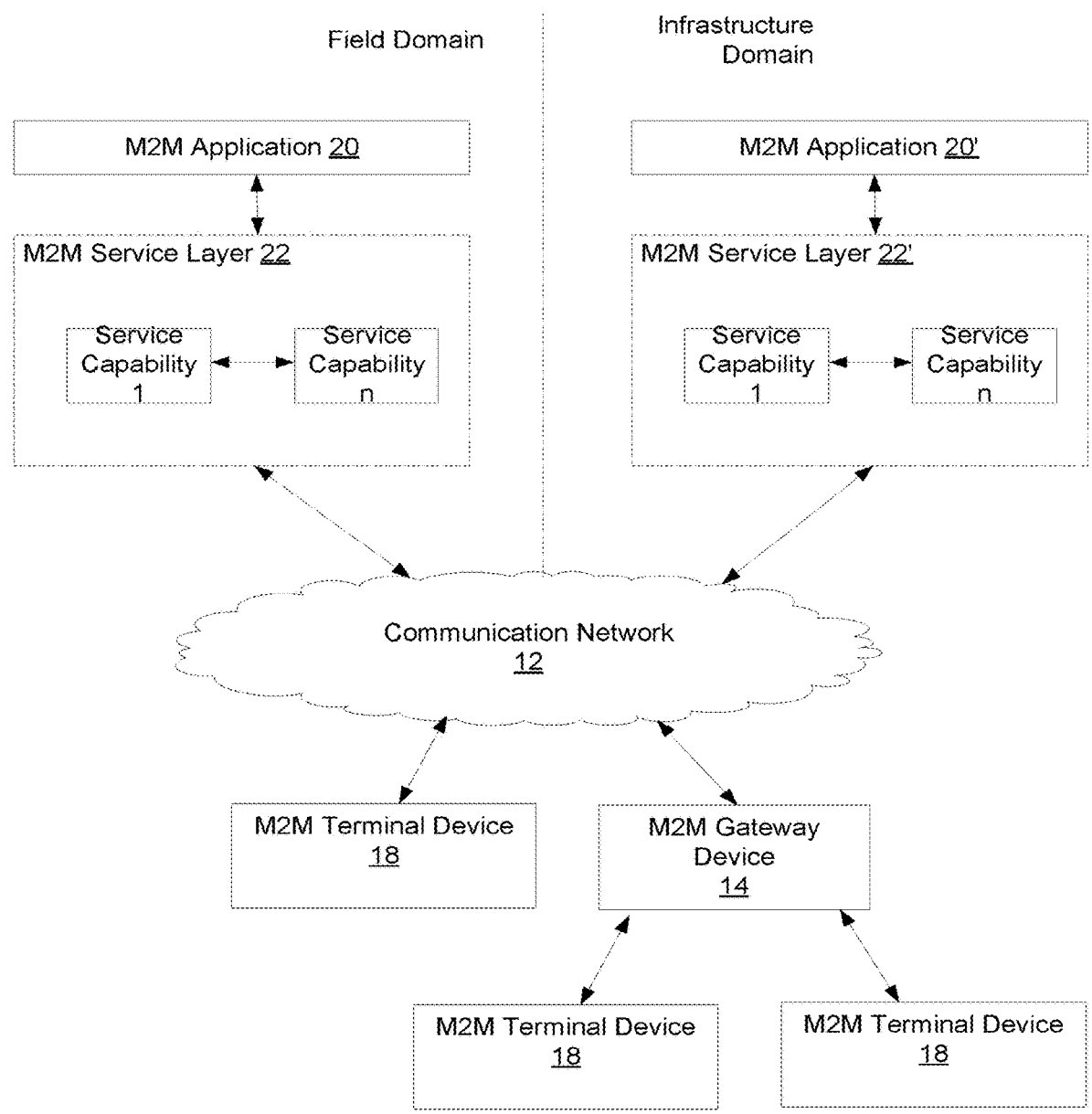
FIG. 22B is a system diagram of an example architecture that may be used within the M2M/IoT communications system illustrated in FIG. 22A.
Figure 22C:
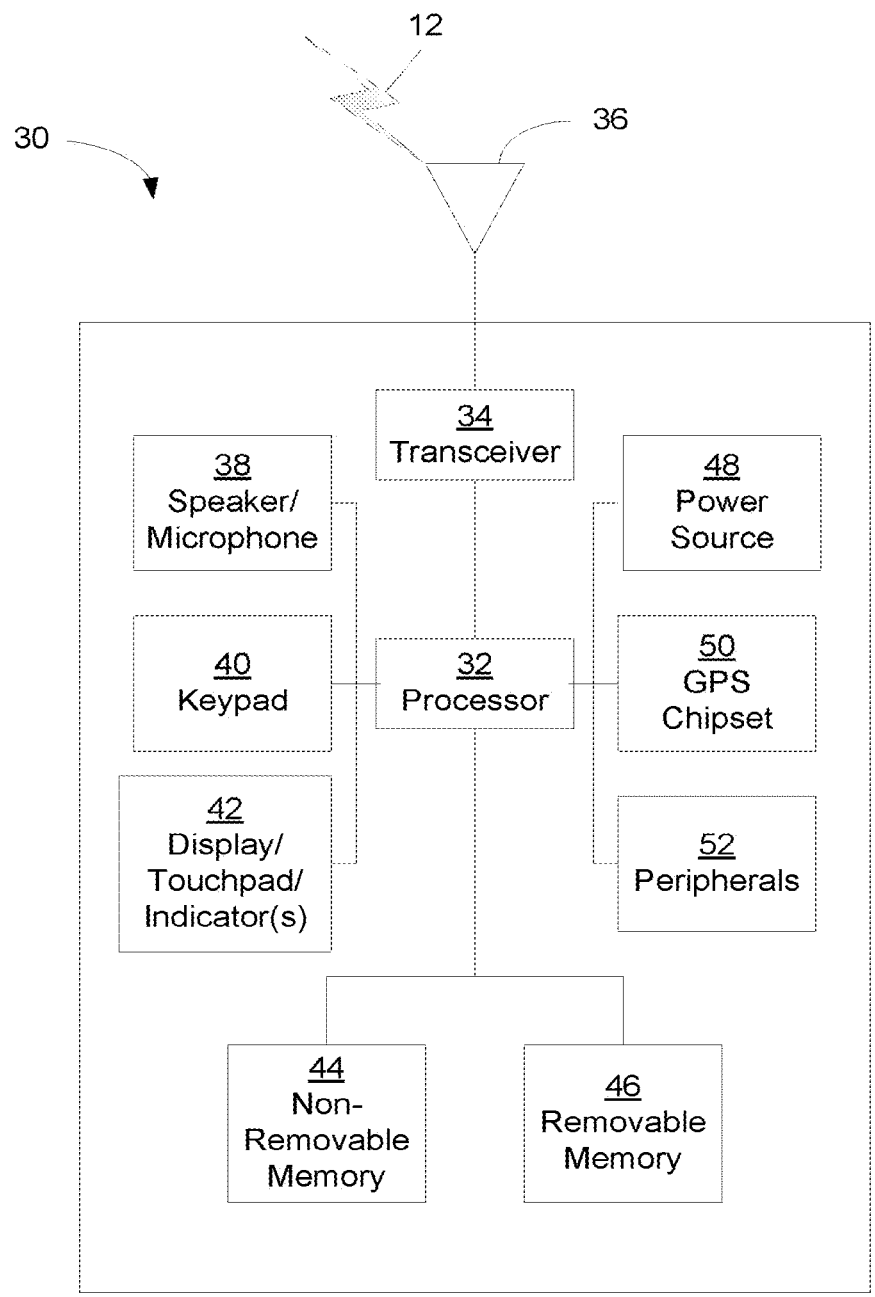
FIG. 22C is a system diagram of an example M2M/IoT terminal or gateway device that may be used within the communications system illustrated in FIG. 22A.
Figure 22D:
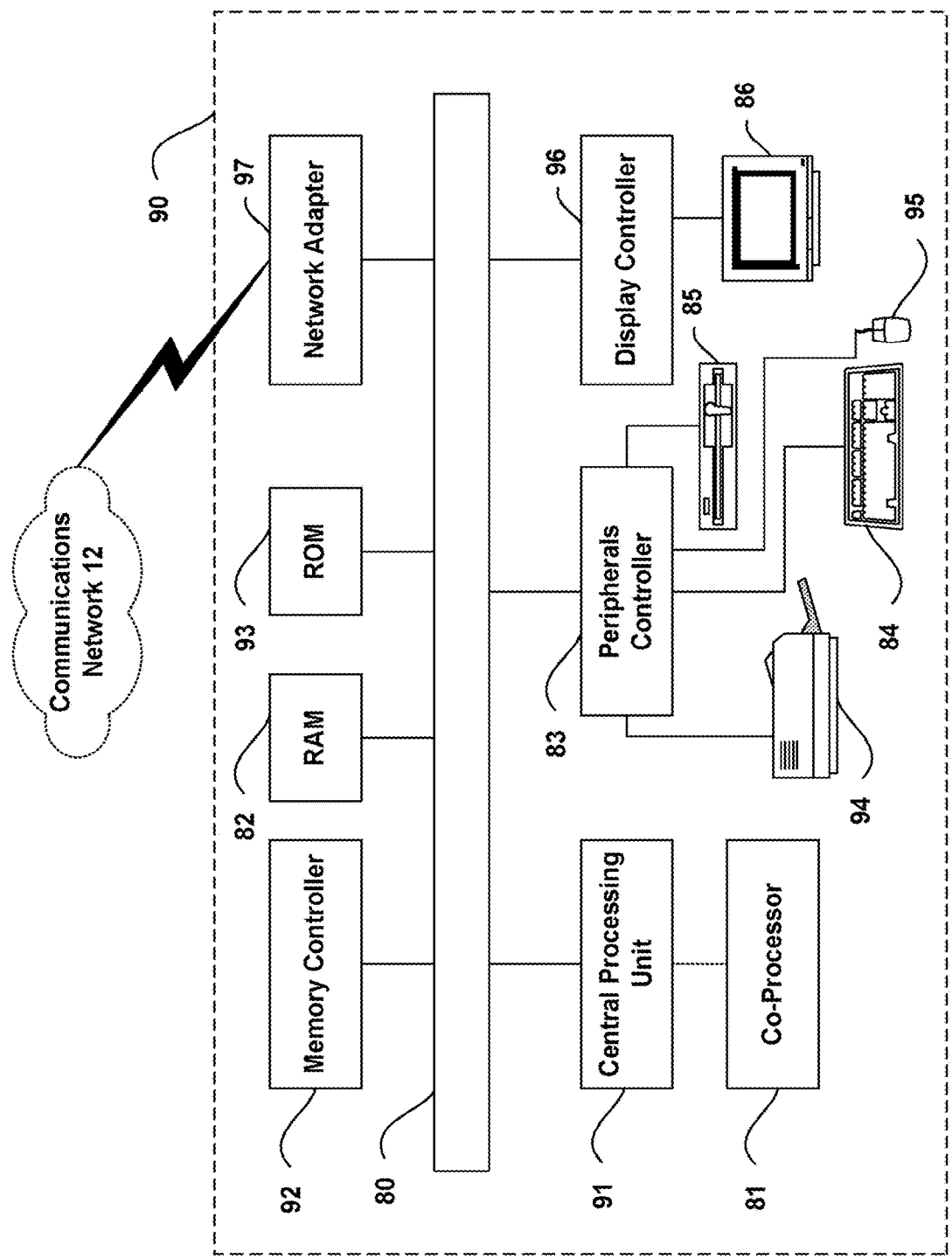
FIG. 22D is a block diagram of an example computing system in which aspects of the communication system of FIG. 22A may be embodied.

It is understood that the entities performing the steps illustrated in FIGS. 11 and 12 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIGS. 11 and 12 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIGS. 11 and 12. It is also understood that any transmitting and receiving steps illustrated in FIGS. 11 and 12 may be performed by communication circuitry of the node under control of the processor of the node and the computer-executable instructions (e.g., software) that it executes.

TABLE 7

Information Elements in a Bearer Resource Command

| Information elements | P | Condition/Comment | IE Type | Ins. |
|---|---|---|---|---|
| Linked EPS Bearer ID (LBI) | M | | EBI | 0 |
| Procedure Transaction Id (PTI) | M | | PTI | 0 |
| Flow Quality of Service (Flow QoS) | C | This IE shall be included on the S4/S11 interface if the "Requested New QoS"/"Required QoS" is included in the corresponding NAS message (see section 9.5.10 and section 9.5.4 in 3GPP TS 24.008) or the "Required traffic flow QoS" is included in the corresponding NAS message (see section 8.3.8 and section 8.3.10 in 3GPP TS 24.301). If SGW receives this IE, SGW shall forward it to PGW across S5/S8 interface. | Flow QoS | 0 |
| Traffic Aggregate Description (TAD) | M C O C O | The TAD consists of the description of the packet filter(s) for a traffic flow aggregate. MME shall include this IE over S11 interface. If S4-SGSN receives this IE from the UE, it shall include it over S4 interface. If SGW receives this IE, the SGW shall forward it to PGW over S5/S8 interface. See NOTE 2. | TAD | 0 |
| RAT Type | C | This IE shall be included for MS initiated PDP Context modification procedure and Secondary PDP context activation procedure. | RAT Type | 0 |
| Serving Network | O | This IE may be included in the MS initiated PDP Context modification procedure. See NOTE 3. | Serving Network | 0 |
| User Location Information (ULI) | O | This IE may be included in the MS initiated PDP Context modification procedure. See NOTE 3. | ULI | 0 |
| EPS Bearer ID | C | This IE indicates the EPS Bearer that needs to be modified. It shall be included for MS initiated PDP Context modification procedure. For EUTRAN this IE shall be present if it is triggered by the NAS Bearer Resource Modification Request message and its value shall be set to the value of the "EPS bearer identity for packet filter" IE received in that NAS message. | EBI | 1 |
| Indication Flags | C O | This IE shall be included if any one of the applicable flags is set to 1. Applicable flags: Change Reporting Support Indication: this flag may be set to 1 in the MS initiated PDP Context modification procedure if the SGSN/MME supports location Info Change Reporting and if the SGSN/MME's operator policy permits reporting of location change to the operator of the PGW with which the session is established. Direct Tunnel Flag: this flag shall be set to 1 on the S4 interface; if Direct Tunnel is used in the MS initiated PDP Context Modification procedure. ISW-GW RAT Change: this flag shall be set to 1 when the ISW-GW initiated the Bearer Resource Command and the command was caused by the ISW-GW changing the RAT of a bearer or flow. Network Initiated Flag: this flag shall be set to 1 when the ISW-GW sets the "ISW-GW RAT Change" flag and the change of RAT was initiated by the ISW-GW | Indication | 0 |
| S4-U SGSN F-TEID | C | This IE shall be included on the S4 interface when direct tunnel is not established in the MS initiated PDP Context modification procedure See NOTE 1 | F-TEID | 0 |
| S12 RNC F-TEID | C | This IE shall be included on the S4 interface when direct tunnel flag is set to 1 in the MS initiated PDP Context modification procedure. See NOTE 1 | F-TEID | 1 |

TABLE 7-continued

Information Elements in a Bearer Resource Command

| Information elements | P | Condition/Comment | IE Type | Ins. |
|---|---|---|---|---|
| Protocol Configuration Options (PCO) | O | | PCO | 0 |
| Signalling Priority Indication | C O | The SGSN/MME shall include this IE on the S4/S11 interface if the UE indicates low access priority during the procedure. The SGW shall forward this IE on the S5/S8 interfaces if received from the MME/SGSN. | Signalling Priority Indication | 0 |
| MME/S4-SGSN's Overload Control Information | O | During an overload condition, the MME/S4-SGSN may include this IE on the S11/S4 interface if the overload control feature is supported by the MME/S4-SGSN and is activated for the PLMN to which the PGW belongs (see clause 12.3.11). When present, the MME/S4-SGSN shall provide only one instance of this IE, representing its overload information. | Overload Control Information | 0 |
| | C O | If the SGW receives this IE and if it supports the overload control feature, it shall forward it to the PGW on the S5/S8 interface. | | |
| SGW's Overload Control Information | O | During an overload condition, the SGW may include this IE over the S5/S8 interface if the overload control feature is supported by the SGW and is activated for the PLMN to which the PGW belongs (see clause 12.3.11). When present, the SGW shall provide only one instance of this IE, representing its overload information. | Overload Control Information | 1 |
| Private Extension | O | | Private Extension | VS |

NOTE 1:
The conditional S4-U SGSN F-TEID and S12 RNC F-TEID IE are redundant (as the IEs will be included in Update Bearer Response message in the MS initiated PDP Context modification procedure). The receiver may ignore it.
NOTE 2:
In the secondary PDP context activation procedure, if the Bearer Resource Command message without TAD IE is received, the PGW shall reject the message with cause "UE context without TFT already activated".
NOTE 3:
In shared networks, when the message is sent from the VPLMN to the HPLMN, the PLMN ID that is communicated in this IE shall be that of the selected Core Network Operator for supporting UEs, or that of the allocated Core Network Operator for non-supporting UEs. As an exception, based on inter-operator roaming/sharing agreement, if the information on whether the UE is a supporting or non-supporting UE is available, the PLMN ID that is communicated to the HPLMN for non-supporting UEs shall be the Common PLMN ID. In shared networks, when the MME/S4-SGSN and PGW pertain to the same PLMN, the Primary PLMN ID shall be communicated in the ECGI to the PGW, and the Common PLMN ID shall be communicated in SAI/CGI to the PGW, for both supporting and non-supporting UEs. The Core Network Operator PLMN ID (selected by the UE for supporting UEs or allocated by the network for non-supporting UEs) shall be communicated in the TAI, RAI, UCI and the Serving Network. See subclause 4.4 of 3GPP TS 23.251.

The Traffic Aggregate Description IE that is reference in Table 7 is coded as depicted in FIG. 11A. The detailed coding and maximum length of Traffic Aggregate Description is specified in TS 24.008 and shown in FIG. 11B, beginning with octet 3. The RAT Type IE is encoded as shown in FIG. 11A.

The Packet Filter IE that is referenced in FIG. 11B is coded as depicted in FIG. 11C.

TABLE 8

RAT Type values

| RAT Types | Values (Decimal) |
|---|---|
| <reserved> | 0 |
| UTRAN | 1 |
| GERAN | 2 |
| WLAN | 3 |
| GAN | 4 |
| HSPA Evolution | 5 |
| EUTRAN | 6 |
| Virtual | 7 |
| Multi | 8 |
| <spare> | 9-255 |

The Indication information element is coded as depicted in FIG. 11D and described in Section 8.1.2 of TS 29.274. The detailed encoding of the existing flags within the information element is captured in TS 29.274. This section only describes the bits of the information element that are changed. Bits 3 and 4 of octet 9, which are currently spare, can be changed to "ISW-GW RAT Change" and "Network Initiated Flag" respectively.

The following bits within Octet 9 shall indicate:

Bit 3—ISW-GW RAT Change (IRC): this flag shall be set to 1 when the ISW-GW 702 initiated the Bearer Resource Command and the command was caused by the ISW-GW 702 changing the RAT of a bearer or flow.

Bit 4—Network Initiated (NI): this flag shall be set to 1 when the ISW-GW 702 sets the "ISW-GW RAT Change" flag and the change of RAT was initiated by the ISW-GW 702.

FIG. 12 is a diagram that illustrates Bearer Resource Modification. The updated "Bearer Resource Command" message informs the PCEF 102 that a bearer, or flow, has changed RATs. Upon receiving this information, the PCEF 102 may fetch new charging rules from the PCRF 118 and send an event notification to the OCS 112 in order to change rate at which the flow is charged. These steps are captured in step 4 of FIG. 12. Step 4 of FIG. 12 actually encompasses an entire procedure. The procedure is called "PCEF Initiated IP-CAN Session Modification".

Figure 13:
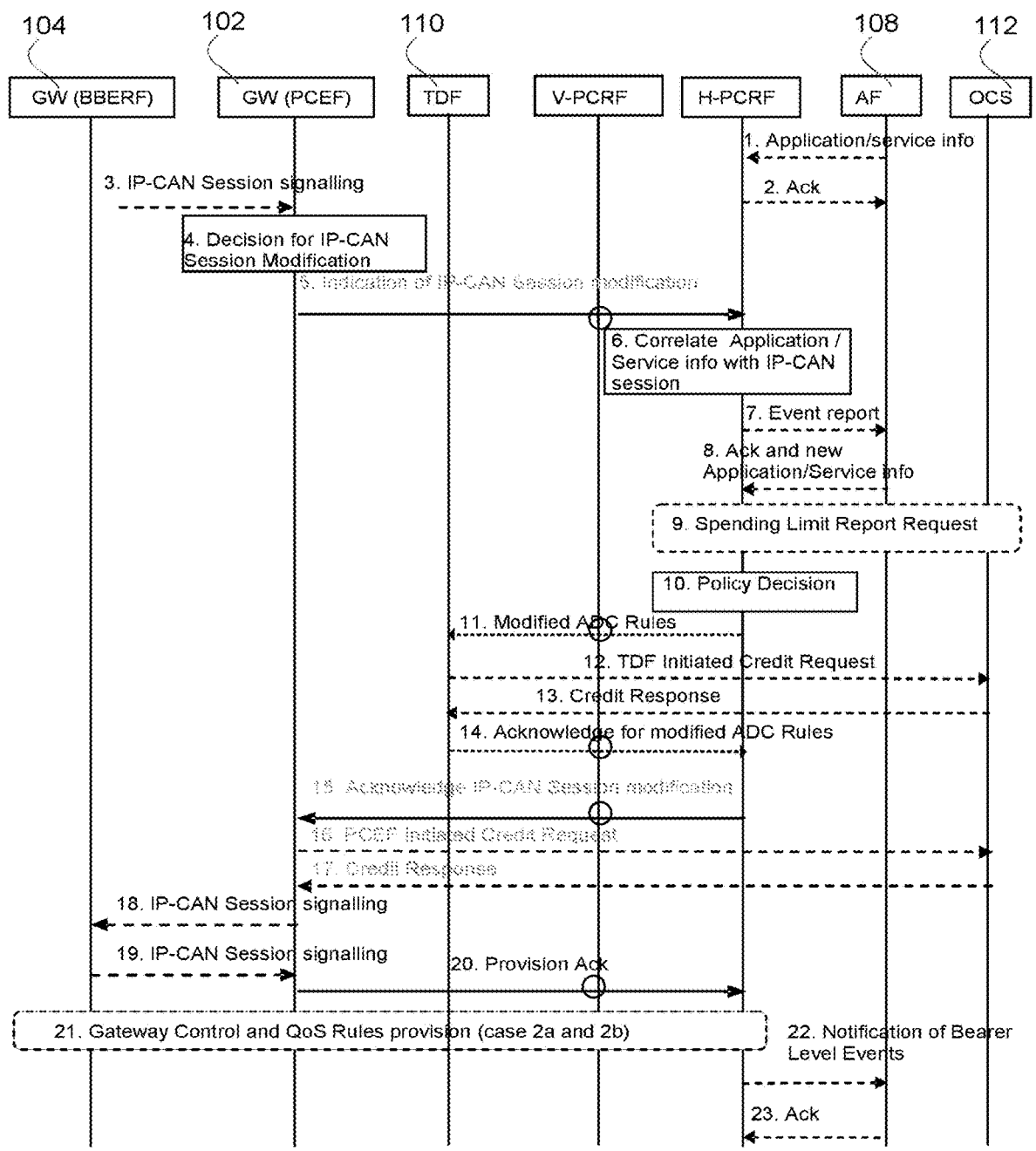
FIG. 13 is a diagram that illustrates PCEF initiated IP-CAN session modification.

FIG. 13 is a diagram that illustrates PCEF initiated IP-CAN session modification. This procedure is shown in FIG. 13. This figure was copied from section 7.4.1 of "Policy and charging control architecture".

In step 5, the PCEF 102 sends the PCRF 118 an indication that the RAT that is in used by the bearer, or flow, has changed and the PCEF 102 indicates if the UE 716 or 720 or the ISW-GW 702 initiated the RAT change. This message is send via the Diameter based Gx reference point.

In step 15 of FIG. 13, the PCRF 118 acknowledged the indication from the PCEF 102.

In steps 16 and 17 of FIG. 13, the PCEF 102 sends a notification to the OCS 112 to inform it of the bearer (or flow) RAT change and the cause of the RAT change.

Note that steps 5, 15, 16, and 17 of FIG. 13 are not new. Rather, they are caused by a new event. The new event is the PCEF 102's reception of a session management message that indicates that the ISW-GW 702 moved a bearer, or flow, from one RAT to another. Also, the SM message indicates whether the change was due to an ISW-GW 702 decision or a UE request.

It is understood that the entities performing the steps illustrated in FIG. 13 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIG. 13 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIG. 13. It is also understood that any transmitting and receiving steps illustrated in FIG. 13 may be performed by communication circuitry of the node under control of the processor of the node and the computer-executable instructions (e.g., software) that it executes.

ISW-GW Based Solution

As described above, the PCEF 102 may be deployed in the PDN GW to be the main functional entity responsible for enforcing and recording the charging policies for both WLAN and LTE accesses. Such a solution requires minimum modifications to the EPC and current 3GPP-WLAN inter-networking architecture. However, the PDN GW may not always be perfectly synchronized with the ISW-GW 702, in terms of knowing which air interfaces is being utilized. For example, when the ISW-GW 702 moves a flow from LTE to WLAN, the PDN GW/PCEF 102 will continue counting the bytes and charge the subscriber according to the LTE charging rules until it receives the "Bearer Resource Command" notifying it that the flow has moved. Thus, the PCEF 102 will count some "WLAN bytes" as "LTE bytes". Thus, the subscriber will not be properly charged (assuming the operator desires different charging models for LTE and WiFi traffic).

The following describes a second solution which overcomes the synchronization issue between ISW-GW 702 and PCEF 102. A PCEF logical entity 1402 may be added in the ISW-GW 702. The ISWN-PCEF 1402 may be used to perform volume based online charging when the PCEF 102 in the P-GW 120 does not have real time knowledge of what RAT (WLAN or Cellular) is being used to send data to the UE.

The ISW-GW 702 may also perform offline charging. Offline CDRs will be created via an Rf interface to the OCFS. In order for the ISW-GW 702 to perform offline charging, enforce charging rules, and perform online charging, the ISW-GW 702 PCEF 1402 will communicate with the PCRF 118 via a Gx interface.

Figure 14:
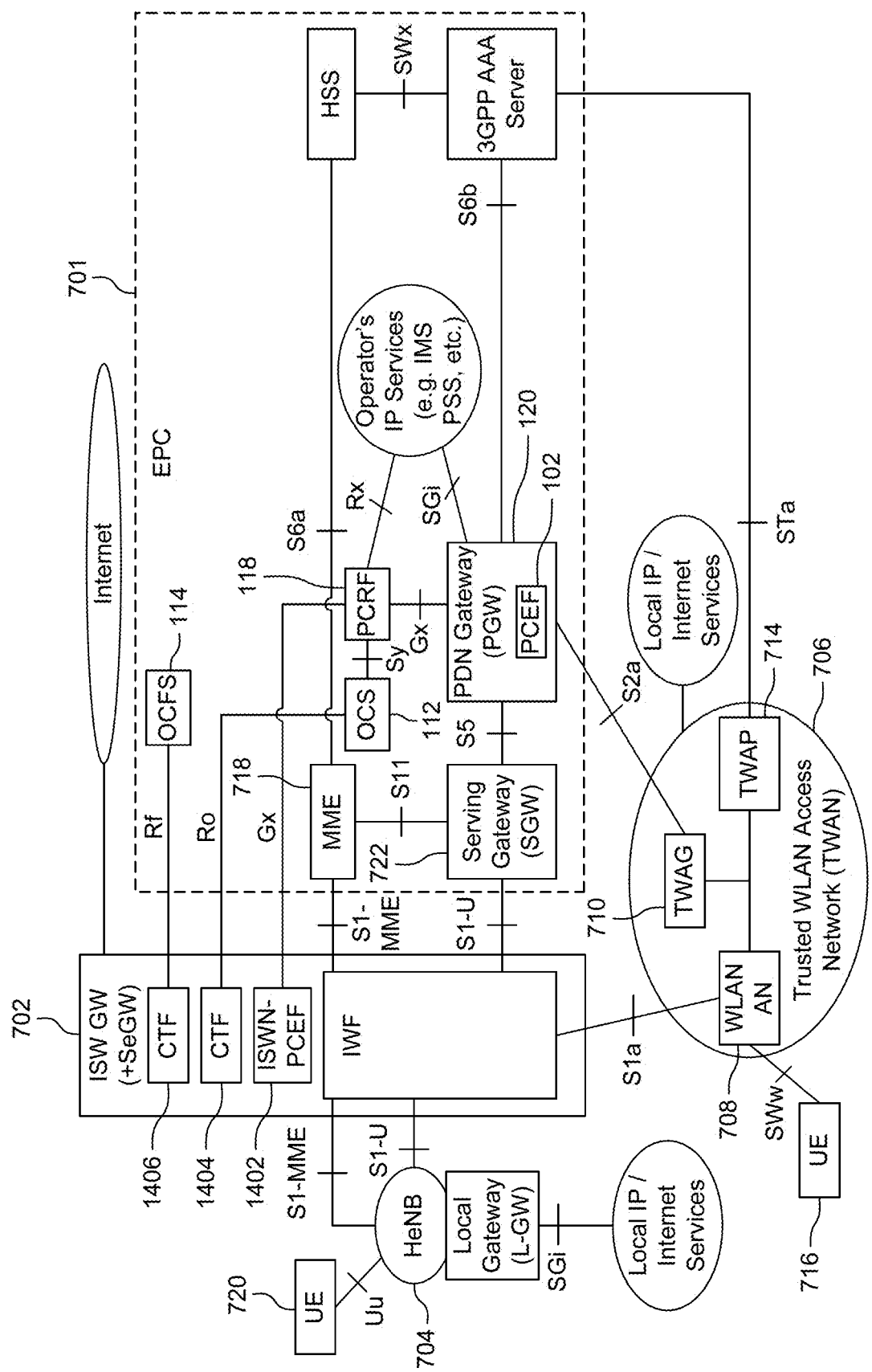
FIG. 14 is a diagram that illustrates a network architecture for performing volume based online charging in the ISWN.

FIG. 14 is a diagram that illustrates a network architecture for performing volume based online charging in the ISWN. This architecture introduces three interfaces inside of the ISWN (Rf, Ro, and Gx) as well as modified session establishment messaging with the P-GW 120.

It is understood that the functionality illustrated in FIG. 14, may be implemented in the form of software (i.e., computer-executable instructions) stored in a memory of, and executing on a processor of, a node of an M2M network (e.g., a server, gateway, device, or other computer system), such as one of those illustrated in FIG. 22C or 22D described below.

Ro—As shown in FIG. 14, a CTF function 1404 of the ISW GW is connected to the OCS 112 (particularly, the OCF) via the Ro reference point. The Ro reference point is defined in TS 32.299.

Rf—As shown in FIG. 14, a CTF function 1406 of the ISW GW is connected to the OFCS 114 via the Rf reference point. The Rf reference point is defined in TS 32.299. The Rf reference point will be used to generate charging events for UE- and Network-initiated handover events that occur within the ISWN and to generate offline charging records that give the breakdown of how much data was sent over the Wi-Fi and cellular RATs.

Gx—As shown in FIG. 14, a new Gx connection is established between an ISWN-PCEF 1402 and the PCRF 118 in the EPC. The Gx reference point contains modified messages compared to the Gx reference point that is defined in TS 29.212. This enhanced connection will be used by the ISWN-PCEF 1402 to obtain charging rules that have been enhanced to differentiate between Wi-Fi and Cellular data and UE 716 or 720 and Network initiated connections.

Session Management Modifications—The session management messaging on the S1-MME, S11; and S5 interfaces will be enhanced to enable coordination between the ISWN-PCEF 1402 and the PCEF 102 in the EPC.

As described in the following sections, the ISWN-PCEF 1402 and P-GW 120 may interact during the UE's initial attachment to the ISWN, during Intra ISWN Handover, and during Inter ISWN Handover.

In a charging interaction during initial attachment to the ISWN procedure, the UE 716 or 720 establishes a connection with the PDN via the ISW-GW 702. New functionality is defined to allow the ISW-GW 702 to request that it be permitted to perform volume based online charging, the PCEF 102 is able to answer the request, and indicate to the OCS 112 if the ISW-PCEF 1402 is permitted to perform volume based online charging.

Figure 15:
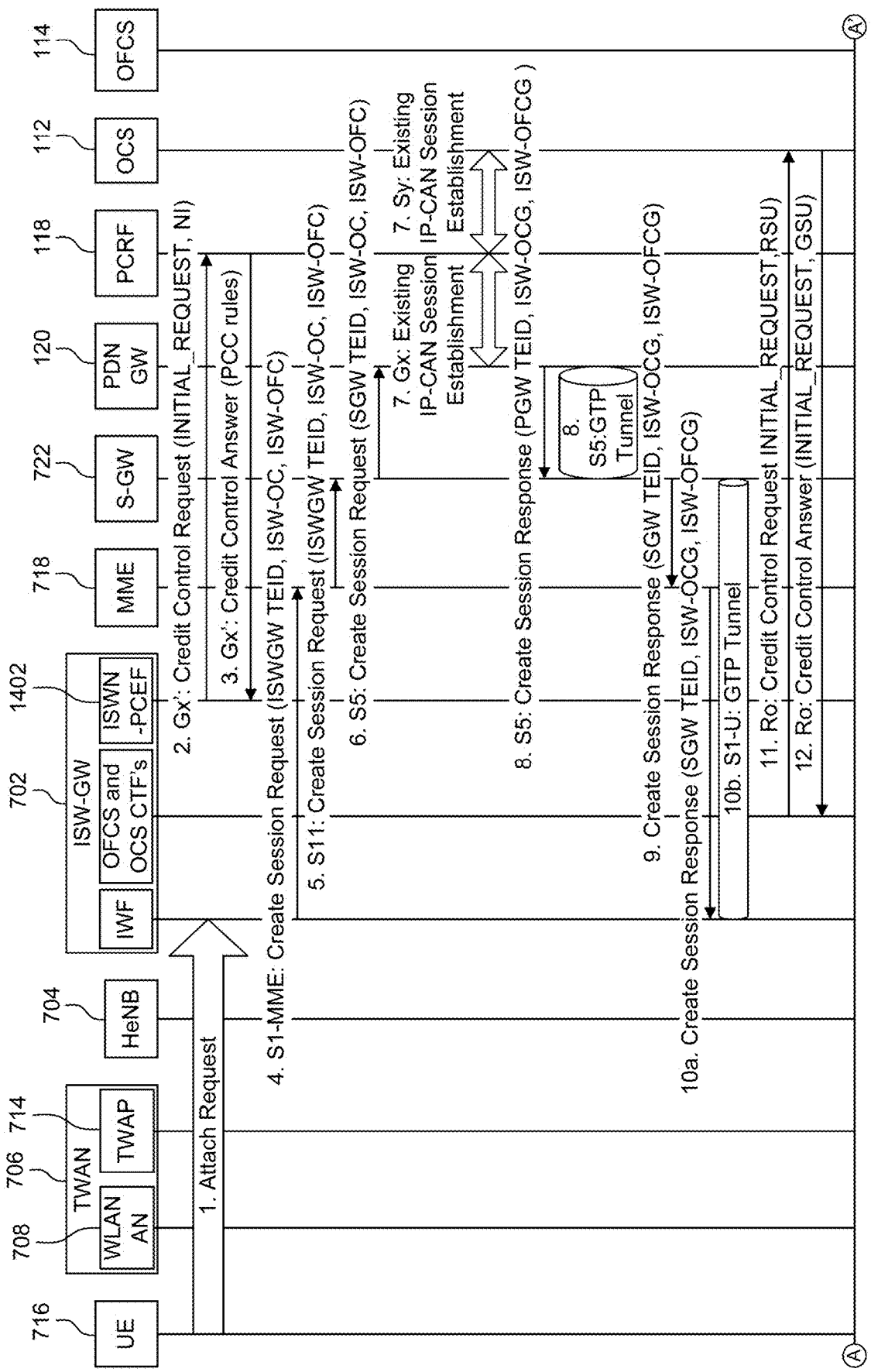
FIG. 15 is a diagram that illustrates a procedure of having UE 716 or 720 attach to the ISWN via WLAN or a Small Cell.
Figure 15:
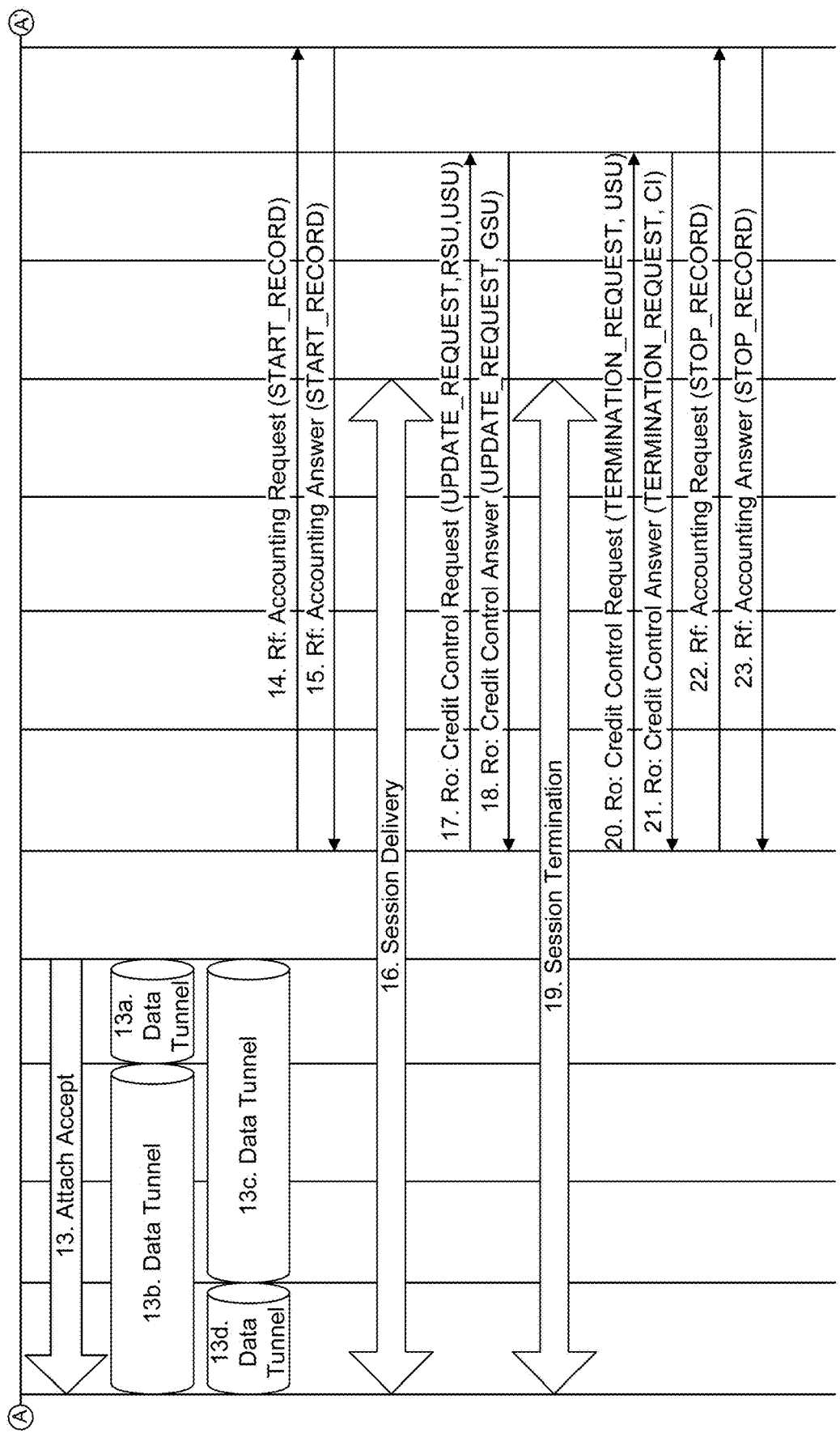

FIG. 15 is a diagram that illustrates a procedure of having UE 716 or 720 attach to the ISWN via WLAN or a Small Cell. In this case, the ISW-GW 702 will indicate to the P-GW 120 that volume based online charging can be performed inside the ISWN. As indicated earlier, it is more efficient to perform volume based online charging inside of the ISWN because the P-GW 120 may not have real-time knowledge of what RAT is being used to send data to the UE 716 or 720.

The procedure in FIG. 15 can be described as follows.

In step 1 of FIG. 15, the UE 716 or 720 initiates an attachment towards the ISW-GW 702, either through the WLAN AN or the small cell. In the WLAN case, the UE 716 or 720 uses the WLCP protocol as defined in clause 16.10.2.1 of 3GPP TS 23.402, "Architecture enhancements for non-3GPP accesses," V12.4.0, March 2014 hereafter TS 23.402, while in the HeNB 704 it uses the RRC protocols as defined in clause 5.3.2.1 of TS 23.401.

In step 2 of FIG. 15, the ISWN-PCEF requests the charging rules from the PCRF 118 so that it can perform volume based online charging. Particularly, the PCEF 1402 in the ISW-GW 702 contacts the PCRF 118 over the reference point Gx by sending a modified version of Credit Control Request message with the CC-Request-Type AVP set to "INITIAL_REQUEST". The ISWN-PCEF 1402 will need to acquire two sets of PCC rules for each RAT that it may use. One set of PCC rules will apply to the case where the UE 716 or 720 selected the RAT and the second set of rules will apply to the case where the ISWN selected the RAT. In total, 4 sets of charging rules will be fetched. The CCR command, as defined in TS 29.212, may be modified so that 4 multiple instances of the following AVPs may be included in the command. By allowing multiple instances of these AVPs to be included in the command, the ISWN-PCEF 1402 may indicate what RAT's it supports and what charging rules are needed. As will be summarized in Section 5.2.4.1, the added AVPs are

[RAT-Type] AVP indicating both WLAN and EUTRAN
[Network-Initiated] (NI) AVP, which will be set to 0 or 1 to indicate that the handover can be initiated by the UE 716 or 720 or the network entity (ISW-GW 702)

In step 3 of FIG. 15, the PCRF 118 responds to the PCEF over the reference point Gx with the 4 PPC rules using the Credit Control Answer message, as defined in clause 4.5.2 of TS 29.212. This message will install the 4 PCC rules using the Charging-Rule-Install as indicated in 5.2.4.2. Each Rule will be defined using the Charging-Rule-Definition AVP. The Charging-Rule-Definition AVP is a grouped AVP that will include the enhanced RAT-Type AVP and the new Network-Initiated AVP, as will be summarized in FIG. 18.

In step 4 of FIG. 15, once the PCC rules are available in the PCEF of the ISW-GW 702, the ISW-GW 702 starts creating the needed session by sending a Create Session Request message to the MME 718 over the S1-MME reference point. The Create Session Request message and related information elements are defined in detail in Table 7.2.1-1 of TS 29.274. It has been used in clause 16.2.1 of TS 23.402 for the TWAN case and in clause 5.3.2.1 of TS 23.401 for the E-UTRAN case. For example in the TWAN case, the message will include (IMSI, APN, RAT type, initial attach indication, TWAN TEID of control plane, TWAN TEID and address for user plane, charging characteristics). As shown in Table 7.2.1-1 of TS 29.274, partially the Create Session Request message contains Indication Flags (e.g. Handover Indication). Two new indication flags are added, namely ISW-GW 702 Online Charging (ISW-OC) and ISW-GW Offline Charging (ISW-OFC) which will inform the EPC that the ISW-GW 702 includes a PCEF and is capable of performing volume based online charging and offline charging, respectively. These 2 flags are summarized in Table 5 7.

In step 5 of FIG. 15, the MME 718 forwards the Create Session Request message from the ISW-GW 702 to the S-GW 722 via the S11 reference point.

In step 6 of FIG. 15, the S-GW 722 forwards the Create Session Request message to the P-GW 120 via the S5 reference point adding the S-GW 722 related information such as S-GW TEID and address for user plane and S-GW TEID for control plane.

In step 7 of FIG. 15, the PCEF in the P-GW 120 initiates an IP-CAN Session establishment, which takes place between the PCEF, PCRF 118, and OCS 112 as described in clause 4.1 of 3GPP TS 29.213, "Policy and Charging Control signaling flows and Quality of Service (QoS) parameter mapping," V12.3.0, March 2014 hereafter TS 29.213 (also clause 7.2 of "Policy and charging control architecture"). The Gx reference point is used between the PCEF and PCRF 118, while the Sy reference point is used between the PCRF 118 and OCS 112. Given the received ISW-OC Indication, the PCEF indicates to the PCRF 118 and OCS 112 that the ISW-GW 702 will be the network entity performing volume based online charging. This new indication will tell the OCS 112 that the ISW-PCEF should be allowed to reserve and debit credits for the user.

In step 8 of FIG. 15, once the IP-CAN session is established, the PDN GW sends Create Session Response message to the S-GW 722 over the S5 reference point. It includes the following IEs (PDN GW address and TEID of the user plane, P-GW 120 of the control plane, PDN address, IP address allocated to the UE) as defined in clause 16.2.1 of TS 23.402 for the TWAN case or in clause 5.3.2.1 of TS 23.401 for the E-UTRAN case. This message will include new indication flags, namely ISW-OCG (ISW-GW Online Charging Granted) and ISW-OFCG (ISW-GW Offline Charging Granted) that will be used to indicate to the ISW-GW 702 that it can perform volume based online charging and offline charging as requested. These 2 flags are indicated in Table 5 8. The first sub-tunnel, between the PDN GW and Serving GW, is now established.

In step 9 of FIG. 15, the S-GW 722 returns Create Session Response to the MME 718 via the S11 reference point indicating S-GW TEID and address for user plane and S-GW TEID for control plane in addition to online and offline charging approvals.

In step 10 of FIG. 15, the MME 718 forwards the Create Session Response to the ISW-GW 702 via the S1-MME 718 reference point carrying all the IEs including the new ISW-OCG and ISW-OFCG indication flags. The second sub-tunnel, between the S-GW 722 and the ISW-GW 702, is now established.

In step 11 of FIG. 15, once the ISW-GW 702 receives the response from the MME 718, it determines the number of non-monetary units needed for the initial session transmission. Furthermore, the ISW-GW 702 converts such non-monetary units into monetary units in its rating control function using the provisioned PCC rules. Finally, the CTF 1404 of the ISW-GW 702 sends a request to the OCS 112 over the Ro reference point to reserve reserved service units (RSU) using the message Credit Control Request (INITIAL_ REQUEST,RSU), as described in clause 6.3.5 of TS 32.299.

In this case, the Session Charging with Unit Reservation (SCUR) case is used as described in Clause 6.3.5 of TS 32.299. Furthermore in this case, the ISW-GW 702 is in charge of determining the required units (unit determination) in addition to converting these resource units into monetary units (Rating Control). This case corresponds to the Decentralized Unit Determination and Decentralized Rating case, presented in clause 5.2.2.3.3 of TS 32.299.

In step 12 of FIG. 15, provided that the OCS 112 was told in step 7 that the ISW-PCEF was going to perform volume based online charging, the OCS 112 reserves the required RSU in the subscriber's credit and responds back to the ISW-GW 702 (particularly its CTF 1404) by sending the Credit Control Answer (INITIAL_REQUEST,GSU) message over the Ro reference point indicating the granted service units (GSU).

In step 13 of FIG. 15, once the charging related messages are completed and there is enough reserved credit for the user, the ISW-GW 702 accepts the attachment of the UE 716 or 720 via the HeNB 704 or WLAN AN. The third sub-tunnel is established between the ISW-GW 702 and the HeNB 704 (or WLAN AN). Finally, data can be sent over the LTE and/or the WiFi air interfaces between the UE 716 or 720 and the HeNB 704 or the WLAN AN, respectively.

In step 14 of FIG. 15, before starting the session delivery, the CTF 1406 of the ISW-GW 702 communicates with the OFCS 114 (particularly its CDF 304) to start accounting by sending the Accounting Request (START_RECORD) message over the Rf reference point as defined in Clause 6.1.2 of TS 32.299.

In step 15 of FIG. 15, in response, the OFCS 114 opens CDR and sends the Accounting Answer (START_RECORD) message over the Rf reference point as defined in clause 6.1.2 of TS 32.299.

In step 16 of FIG. 15, the Session Continues.

In step 17 of FIG. 15, the data session starts between the UE 716 or 720 and the P-GW 120 passing through the ISW-GW 702. The ISW-GW PCEF is performing the volume counting. Once the reserved subscriber's credit is fulfilled, the ISW GW communicates with the OCS 112 requesting additional RSU using the credit control request (UPDATE_REQUEST, RSU) message.

In step 18 of FIG. 15, in response, the OCS 112 sends credit control answer (UPDATE_REQUEST, GSU) message indicating the granted service units, if any. The procedure in steps 14 and 15 continues as long as the subscriber has the data demand and available credit to satisfy such demand.

In step 19 of FIG. 15, the session is terminated.

In step 20 of FIG. 15, once the session is terminated, the ISW-GW 702 sends credit control request (TERMINATION_REQUEST, USU) to the OCS 112 indicating the termination of the service in addition to the used service units (USU).

In step 21 of FIG. 15, the OCS 112 deducts the money used from the subscribers account. Any unused reserved units will be released. The OCS 112 acknowledges by sending credit control answer (TERMINATION_REQUEST, CI) to the ISW GW indicating the cost information (CI) including the cumulative cost of the service in addition to any remaining balance.

In step 22 of FIG. 15, regarding the offline charging system and for billing information, the ISW GW will send Accounting Request (STOP_RECORD) to the OFCS 114 (particularly its CDF 304) over the Rf reference point.

In step 23 of FIG. 15, the CDF 304 of the OFCS 114 will update the CDR indicating the breakdown of bits of over WLAN and bits over 3GPP and close it. Finally, it acknowledges the ISW GW by sending Accounting Answer (STOP_RECORD) over the Rf reference point.

It is understood that the entities performing the steps illustrated in FIG. 15 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIG. 15 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIG. 15. It is also understood that any transmitting and receiving steps illustrated in FIG. 15 may be performed by communication circuitry of the node under control of the processor of the node and the computer-executable instructions (e.g., software) that it executes.

This section discusses the case Charging Interaction during Intra ISW-GW 702 Handover from Small Cell to WLAN, where the ISW-GW 702 decides to move a data flow from a cellular RAT (Small Cell) to the WiFi RAT (WLAN). The ISW-GW 702 may make this decision based on a request from the UE 716 or 720 or based on some measurements that were made by the UE, small cell, or a WiFi AP. Once a handover is complete, the ISW-GW 702 communicates with the OCS 112 to reserve the needed resources according to the utilized air interface and available user's credit.

Note that the call flow is similar when Intra ISW-GW Handover from the WLAN to Small Cell occurs.

Figure 16:
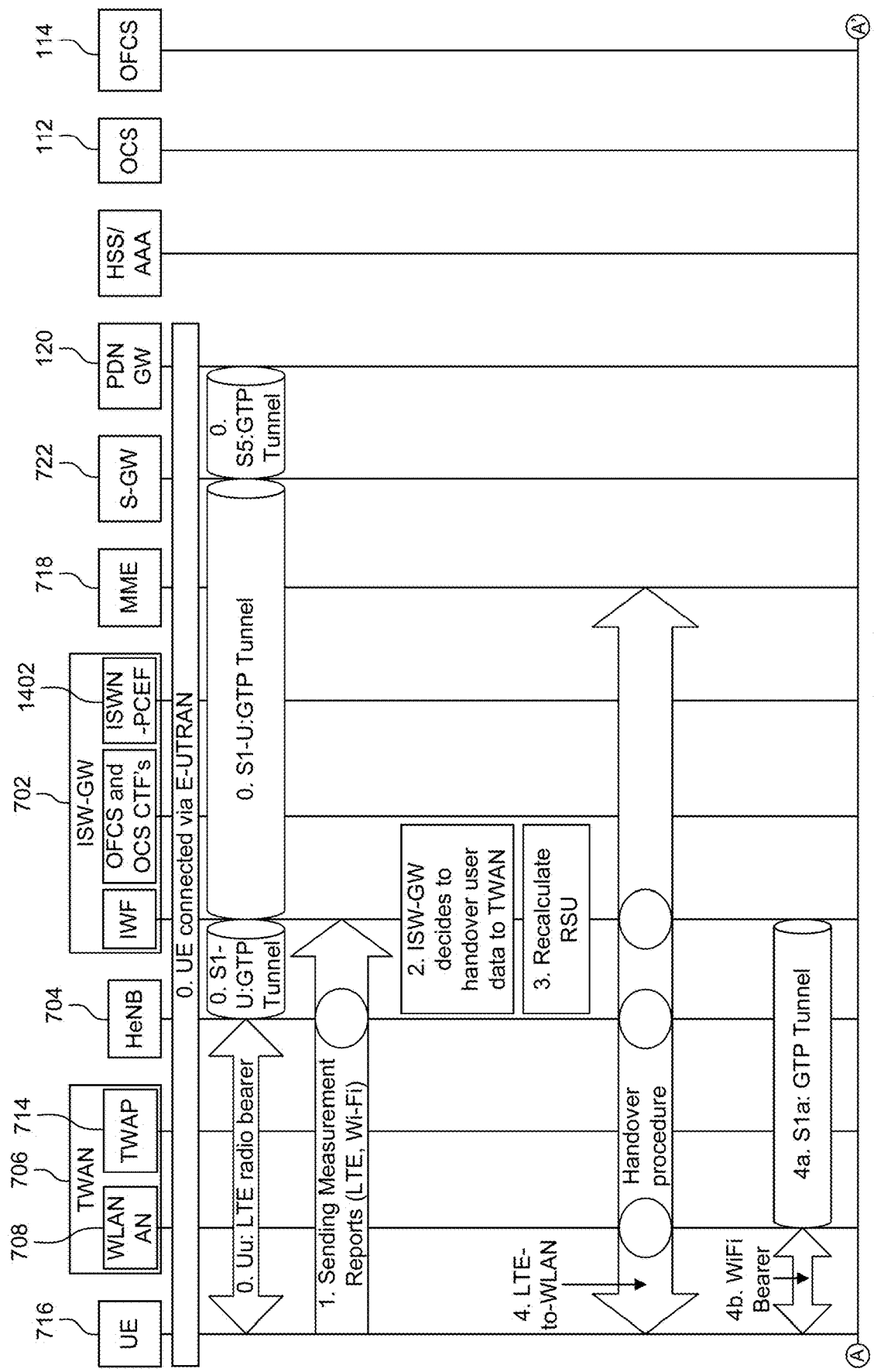
FIG. 16 is a diagram that illustrates the message flow for the handover from LTE to WiFi for the ISW-GW 702 case.
Figure 16:
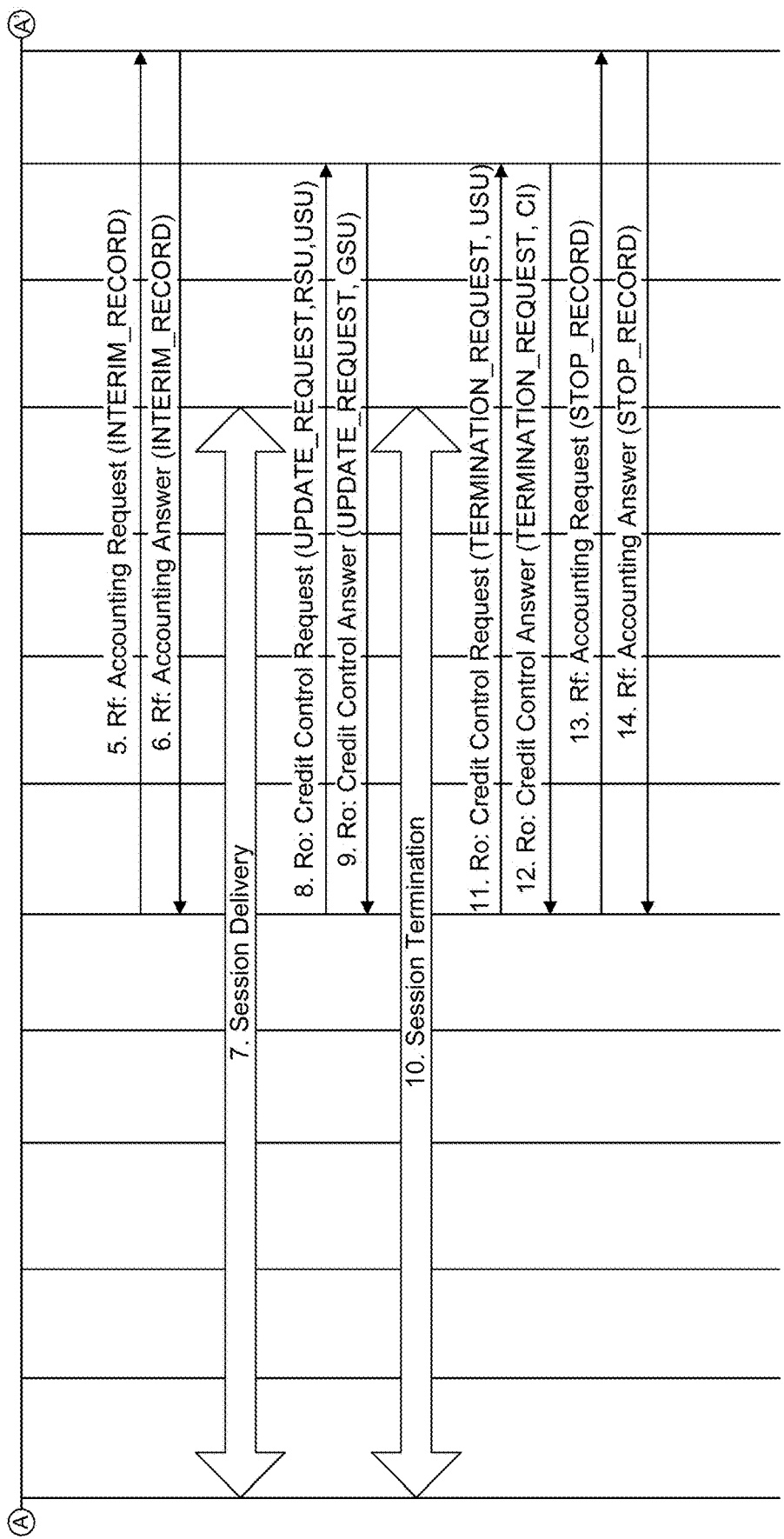

FIG. 16 is a diagram that illustrates the message flow for the handover from LTE to WiFi for the ISW-GW 702 case, which can be described as follows.

In step 0 of FIG. 16, an ongoing session has been established over EPS/E-UTRAN access. It is assumed that an LTE data radio bearer already exists between the UE 716 or 720 and the HeNB 704. Moreover, three GTP-U user data tunnel exist, namely, HeNB 704 to/from ISW-GW 702, ISW-GW 702 to/from S-GW 722, and S-GW 722 to/from PDN GW 120.

In step 1 of FIG. 16, the UE 716 or 720 send the Inter-system Measurement Reports including the measurements of both LTE and WLAN air interfaces, which are forwarded by the HeNB 704 to the ISW-GW 702.

In step 2 of FIG. 16, based on the inter-system measurement reports, the ISW-GW 702 decides either to handover to WiFi or to continue using the LTE air interface. In this Section, ISW-GW 702 decides to have handover to WLAN. Alternatively, the ISW-GW 702 could make this decision based on a request from the UE.

In step 3 of FIG. 16, the ISW-GW 702 recalculates the available RSU based on the PCC rules, communicated previously from the PCRF 118, as was shown in Step 3 of Section 5.2.1.

In step 4 of FIG. 16, if enough RSUs are available, the ISW-GW 702 executes the handover mechanism which includes 1) notification request to WLAN AN to create the new GTP-U tunnel between the WLAN AN and the ISW GW, 2) handover command to the UE 716 or 720 (via the HeNB 704) to switch from LTE to Wi-Fi, and 3) notification request to the MME 718 to be informed of the handover decision. The S1a GTP-U sub-tunnel is now established between the ISW-GW 702 and WLAN AN.

In step 5 of FIG. 16, given that there has been an open CDR for the LTE service, the ISW-GW 702 will need to update it and change the utilized air interface. Particularly, the CTF 1406 of the ISW-GW 702 sends the Accounting Request (INTERIM_RECORD) to the OFCS 114 (particularly its CDF 304) over the Rf reference to update the CDR With the WLAN air interface (clause 6.1.2 of TS 32.299). Alternatively, the CTF 1406 can close the current CDR and open a new CDR.

In step 6 of FIG. 16, in response, the OFCS 114 updates CDR and sends the Accounting Answer (INTERIM_RECORD) message over the newly defined Rf reference point as defined in clause 6.1.2 of TS 32.299.

Steps 7-14 of FIG. 16 are similar to steps 16-23 of FIG. 15.

If is understood that the entities performing the steps illustrated in FIG. 16 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIG. 16 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIG. 16. It is also understood that any transmitting and receiving steps illustrated in FIG. 16 may be performed by communication circuitry of the node under control of the processor of the node and the computer-executable instructions (e.g., software) that it executes.

Figure 17:
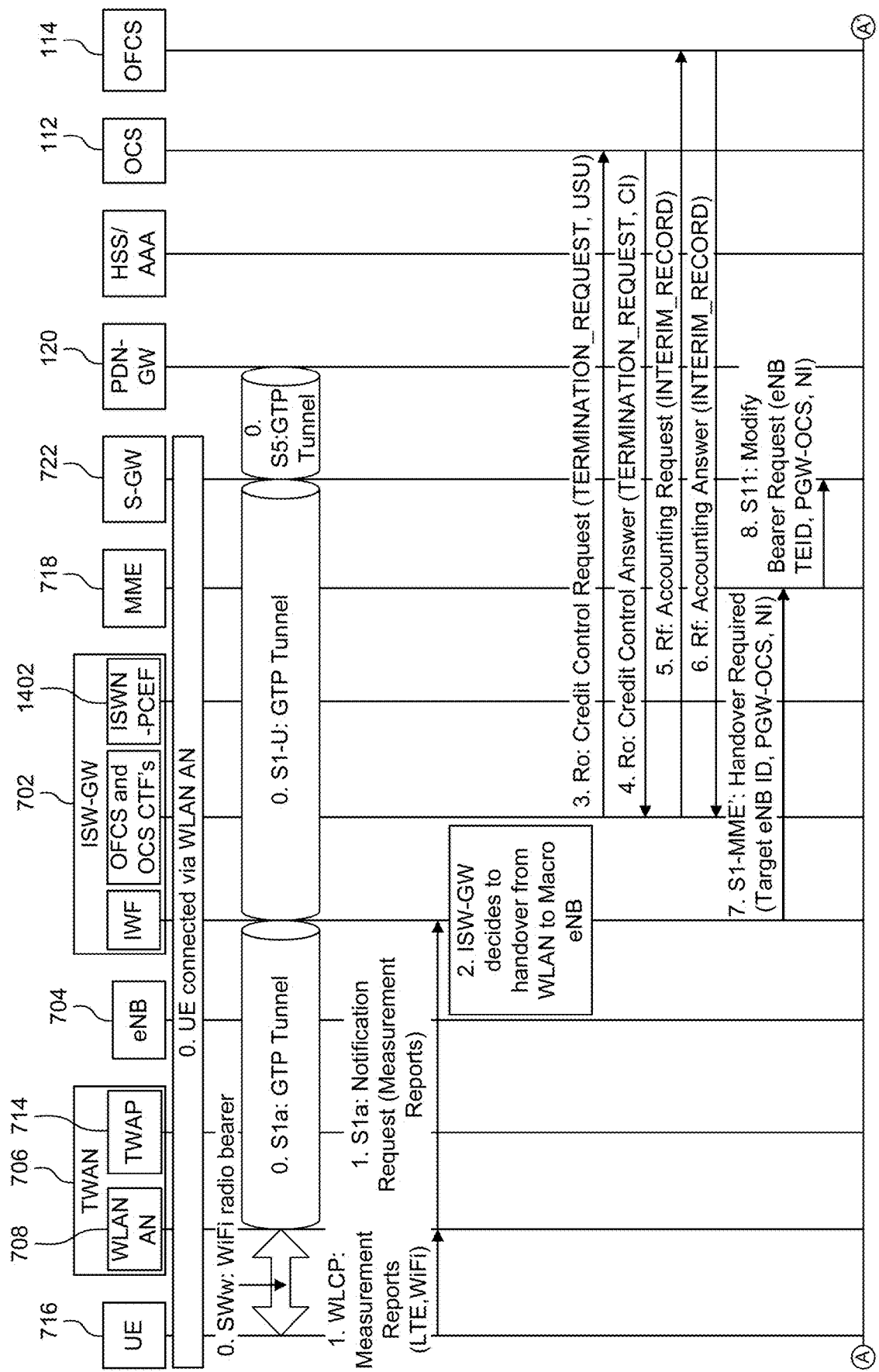
FIG. 17 is a diagram that illustrates charging interaction during Inter ISW-GW Handover from WLAN to LTE Macro eNB
Figure 17:
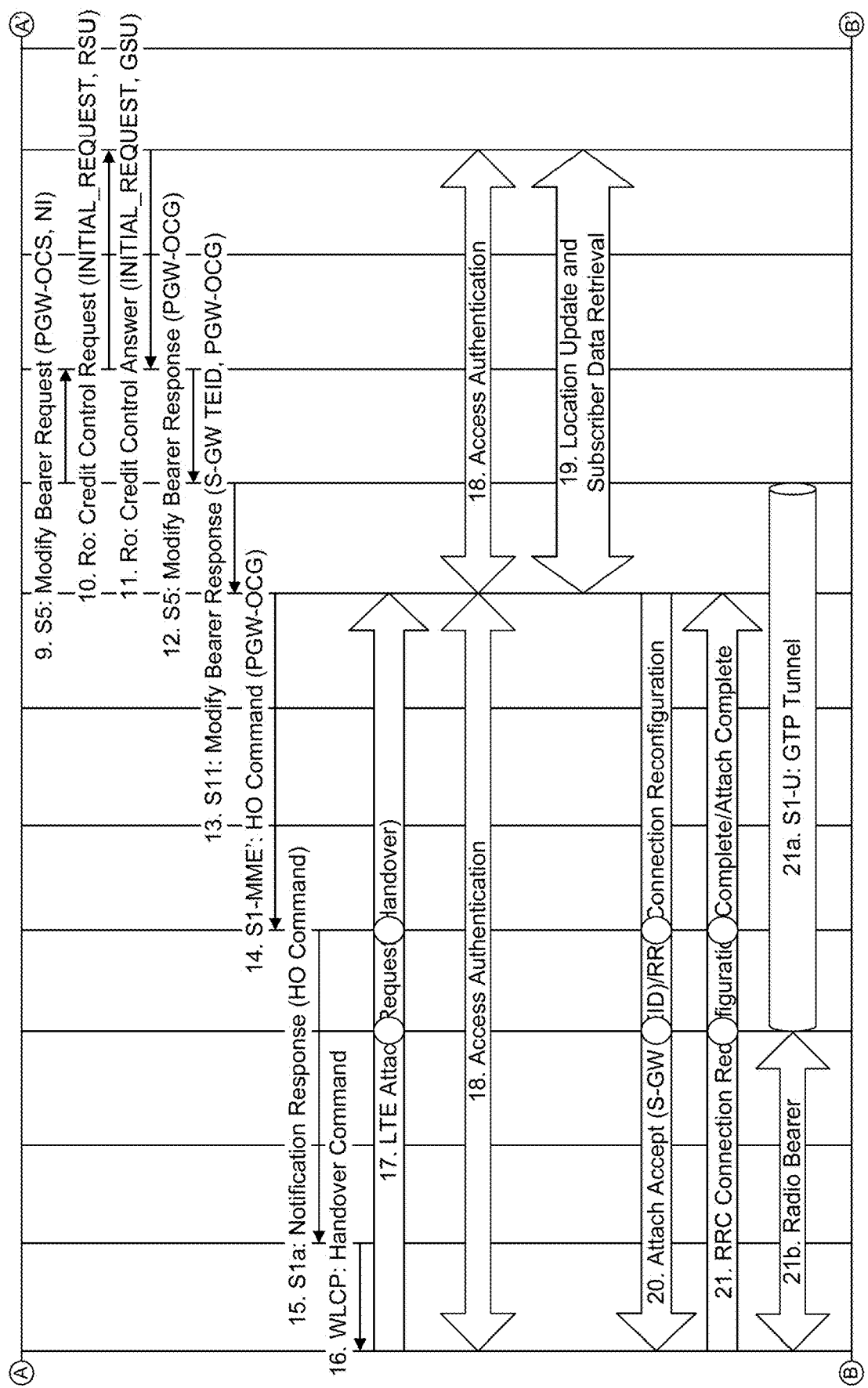
Figure 17:
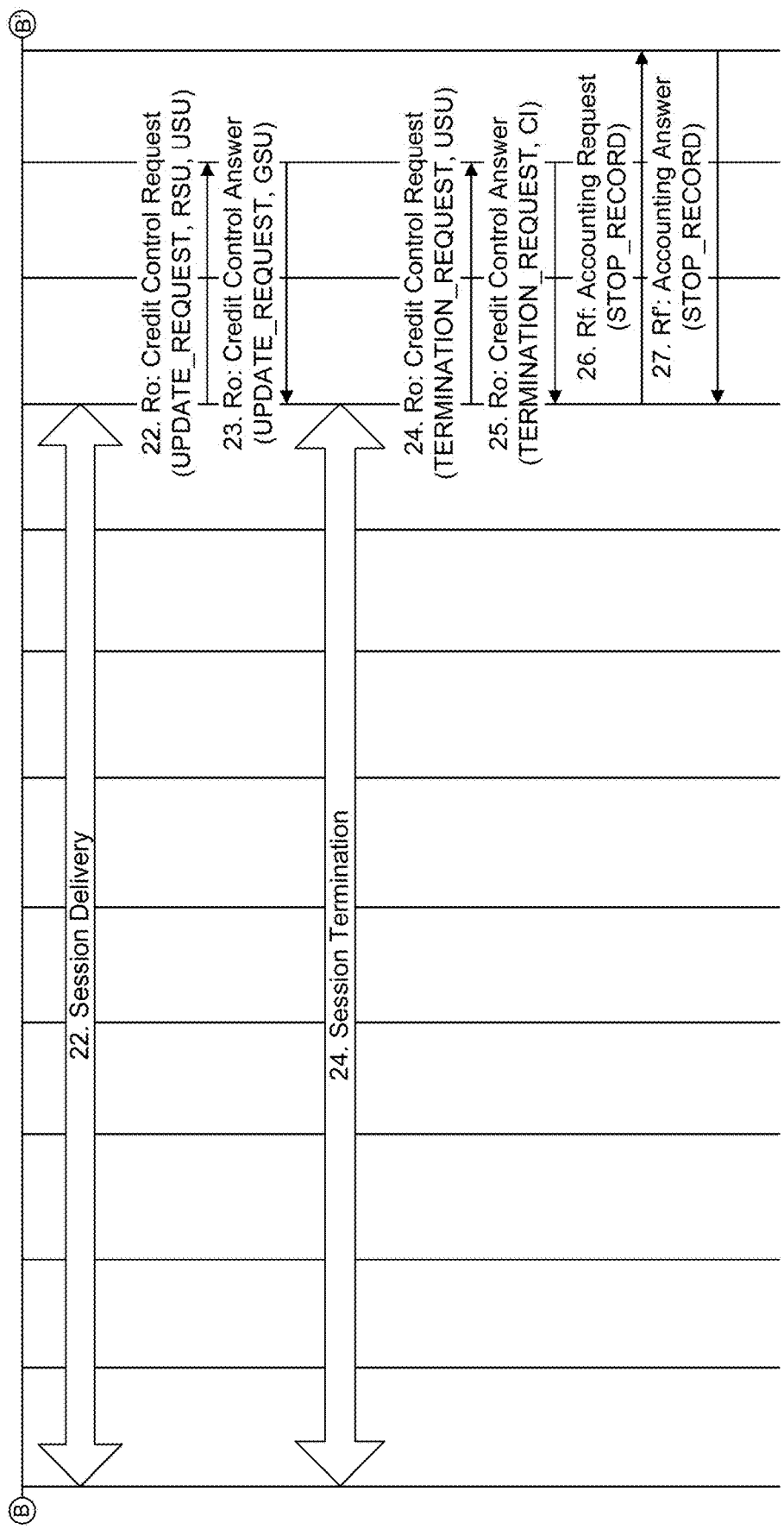

FIG. 17 is a diagram that illustrates charging interaction during Inter ISW-GW Handover from WLAN to LTE Macro eNB, where the ISW-GW 702 decides to move a data flow from the ISWN to the macro network. The ISW-GW 702 may make this decision based on a request from the UE 716 or 720 or based on some measurements that were made by the UE 716 or 720, small cell, or a WiFi AP. In this case, the ISW-GW 702 will inform the PDN GW 120 to take charge of the online charging using the Modify Bearer Request message using the new "PGW Online Charging" (PGW-OC) Indication flag. Furthermore, the ISW-GW 702 will indicate the initiator of the handover using a new "Network-Initiated" (NI) Indication flag.

Note that the call flow is similar when Inter ISW-GW 702 Handover from the LTE Macro eNB to the ISWN Small Cell or WLAN occurs. The call flow is also similar when Inter ISW-GW Handover from the ISWN small cell to the LTE Macro eNB occurs. The call flow is also similar when a UE 716 or 720 hands over from one ISW-GW to another ISW-GW.

FIG. 17 depicts the message flow, and it can be described as follows.

In step 0 of FIG. 17, an ongoing session has been established over the ISWN's Wi-Fi access. It is assumed that a Wi-Fi over the air transmission already exists between the UE 716 or 720 and the WLAN AN. Moreover, three GTP-U user data tunnel exist, namely, WLAN AN to/from ISW-GW 702, ISW-GW 702 to/from S-GW 722 and SGW to/from P-GW 120.

In step 1 of FIG. 17, the UE 716 or 720 sends the Wi-Fi measurements along with the LTE neighbor list measurements to the WLAN AN. This message can be a part of the WLCP protocol (3GPP TS 24.244, "Wireless LAN control plane protocol for trusted WLAN access to EPC; Stage 3," V1.1.0, April 2014 hereafter TS 24.244). Then, the WLAN AN forwards the measurement reports to the ISW-GW 702 using the "Notification Request" message over the Sla reference point.

In step 2 of FIG. 17, based on the measurement reports collected from the Wi-Fi and LTE sides, the ISW-GW 702 decides either to handover to the Macro eNB or to continue using the WLAN. In this Section, the ISW-GW 702 decides to make a handover to the Macro eNB.

In step 3 of FIG. 17, given that the ISW-GW 702 need to handover from WLAN, the Wi-Fi air interface may not be reliable enough at this point. Hence, it can be safely assumed that the ISW-GW 702 will stop all the Wi-Fi transmissions at this point. Then the ISW-GW 702 will update the OCS 112 with the consumed monetary units. Particularly, it sends credit control request (TERMINATION_REQUEST, USU) message to the OCS 112 indicating the termination of the service over the WLAN. In this step, the ISW-GW 702 will refund all the unused credit back to the user's credit at the OCS 112. In Step 10, the PCEF in the P-GW 120 will reserve credit again to continue the transmission. By having the ISW-GW 702 refund the reserved credit, it will be ensured that there will be enough credit for the P-GW 120 to reserve.

In step 4 of FIG. 17, the OCS 112 deducts the money used from the subscribers account. Any unused reserved units will be released. The OCS 112 acknowledges by sending credit control answer (TERMINATION_REQUEST, CI) to the ISW GW.

In step 5 of FIG. 17, as for the offline CDR, the ISW-GW 702 communicates with the OFCS 114 to update the CDR that it will be using LTE instead of Wi-Fi. More specifically, the CTF 1406 of the ISW-GW 702 sends the Accounting Request (INTERIM_RECORD) to the OFCS 114 (particularly its CDF 304) over the Rf reference. Alternatively, the ISW-GW 702 can stop the CDR and the P-GW 120 will open a new CDR.

In step 6 of FIG. 17, in response, the OFCS 114 updates CDR and sends the Accounting Answer (INTERIM_RECORD) message over the Rf reference point as defined in clause 6.1.2 of TS 32.299.

In step 7 of FIG. 17, once the charging modifications have been completed, the ISW-GW 702 initiates the actual bearer handover procedure. First, it sends a Handover Required (Target eNB identity, PGW-OC, NI) message to the MME 718 over the S1-MME' reference point. The Handover Required (Target eNB identity) message was used previously in a different context. Particularly, in the Intra-LTE handover (clause 5.5.1.2.2 of TS 23.401), where the source eNB sends the Handover Required message to the Source MME 718 to initiate handover. In this step, the Handover Required message is used to initiate bearer handover as well as to the transfer the charging procedure back to the P-GW 120. The PGW Online Charging Indication will be included in the set of IEs of Handover Required message, as will be shown in Table 13. It can be either 1 or 0 to indicate if the P-GW 120 should take charge of the online charging or not, respectively. Furthermore, the new Network-Initiated Indication flag (shown in Table 13) will be either 1 or 0 to differentiate between the network-initiated and UE-initiated handover cases, respectively.

In step 8 of FIG. 17, the MME 718 sends Modify Bearer Request (eNB address and TEID, PGW-OC, NI) message to the S-GW 722 over the S11 reference point. The new indication flags will be included in the set of Indication Flags of the Modify Bearer Request message (Table 7.2.7-1 of TS 29.274) (e.g. PDN Pause On/Off Indications). They are presented in Table 11.

In step 9 of FIG. 17, the S-GW 722 forwards the Modify Bearer Request (PGW-OC, NI) message to the P-GW 120 indicating the change of the charging responsibility to the P-GW 120.

In step 10 of FIG. 17, because of the new indication, the PCEF of the P-GW 120 sends a request to the OCS 112 over the Ro reference point to reserve RSU using the message Credit Control Request (INITIAL_REQUEST,RSU), as described in Section 6.3.5 of TS 32.299.

In step 11 of FIG. 17, the OCS 112 reserves the required RSU in the subscriber's credit and responds back to the P-GW 120 by sending the Credit Control Answer (INITIAL_ REQUEST, GSU) message over the Ro reference point indicating the GSU.

In step 12 of FIG. 17, the P-GW 120 returns a Modify Bearer Response (PGW-OCG) message to the S-GW 722 carrying the new P-GW 120 Online Charging Granted (PGW-OCG) Indication flag as will be summarized in Table 5 10, to indicate that the P-GW 120 will take charge of the online charging. The existing GTP-U sub-tunnel between the S-GW 722 and P-GW 120 is still established.

In step 13 of FIG. 17, the S-GW 722 shall return a Modify Bearer Response (S-GW TEID, PGW-OCG) message to the MME 718 indicating the new S-GW TEID that will be used for the transmission with the eNB.

In step 14 of FIG. 17, once done, the MME 718 will send Handover Command (PGW-OCG) towards the ISW-GW 702. This informs the ISW-GW 702 that its request to have the P-GW 120 taking charge of the online charging has been accepted. The modification to Handover Command message is shown in Table 5 12.

In step 15 of FIG. 17, the ISW-GW 702 sends Notification Response (Handover Command) message to the WLAN AN.

In step 16 of FIG. 17, the WLAN AN forwards a Handover Command message to the UE, which can be a part of the WLCP protocol to inform the UE 716 or 720 to start the attachment procedure with the HeNB 704.

In step 17 of FIG. 17, accordingly, the UE 716 or 720 starts the standard attach request procedure (clause 5.3.2.1 of TS 23.401) by sending the "RRC: Attach Request" message to the HeNB 704 with Handover Indication, which is forwarded to the ISW-GW 702 and MME 718.

In step 18 of FIG. 17, the MME 718 may contact the HSS and authenticate the UE 716 or 720 as described in TS 23.401.

In step 19 of FIG. 17, after successful authentication, the MME 718 may perform location update procedure and subscriber data retrieval from the HSS as specified in TS 23.401.

In step 20 of FIG. 17, consequently, the MME 718 accepts the attach request and sends "Attach Accept" message to the ISW-GW 702, which is contained in the S1-MME "Initial Context Setup Request" message (clause 5.3.2.1 of TS 23.401). In this message, the MME 718 includes the TEID and address of the S-GW 722, which was obtained in Step 13. This message is forwarded to the eNB afterwards, which initiates the "RRC Connection Reconfiguration" message towards the UE 716 or 720 (clause 5.3.2.1 of TS 23.401)

In step 21 of FIG. 17, in response, the UE 716 or 720 sends "RRC Connection Reconfiguration Complete" to the HeNB 704, and completes the attachment towards the MME 718. The GTP-U data sub-tunnel between the S-GW 722 and the eNB is now established and data can be carried over the LTE link.

Steps 22-27 of FIG. 17 are similar to steps 16-21 of FIG. 15, except that the P-GW 120 is the network entity responsible for charging instead of the ISW-GW 702 in the steps of FIG. 15.

It is understood that the entities performing the steps illustrated in FIG. 17 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIG. 17 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIG. 17. It is also understood that any transmitting and receiving steps illustrated in FIG. 17 may be performed by communication circuitry of the node under control of the processor of the node and the computer-executable instructions (e.g., software) that it executes.

This Section introduces the new or modified AVPs for the Diameter based Gx interface.

The RAT-Type AVP within the Credit Control Request (CCR) message may be updated and a new Network-Initiated AVP be created in the CCR message.

In order for the PCEF to request one PCC rule for each RAT-Type (LTE and WLAN), the current format of the CCR message requires that the message be sent twice; once for each rule/RAT. However, the CCA response message is able to carry multiple Charging-Rule-Install AVPs, Each PCC rule will be distinguished using its Charging-Rule-Name or Service-Identifier.

It would be more efficient to allow one CCR message to request more than one PCC rule; each rule corresponding to a RAT and a handover initiator entity. Accordingly, the CCR message may be updated so that it can include multiple RAT-Type AVP's and multiple instances of a new Network-Initiated AVPs. These updates will allow the CCR to request four different PCC rules that map to the 4 combinations of RAT-Type (EUTRAN or WLAN) and Network-Initiated (0 or 1).

The RAT-Type AVP within the Credit Control Answer (CCA) message can be updated and a new Network-Initiated AVP can be created in the CCA message.

In order to be able to distinguish between the required four PCC rules, two new AVPs (RAT-Type and Network-Initiated) will need to be added to the Charging-Rule-Definition AVP of the CCA (PCRF 118 to PCEF). This is how the PCEF will be able to know which PCC Rule should be applied.

Figure 18:
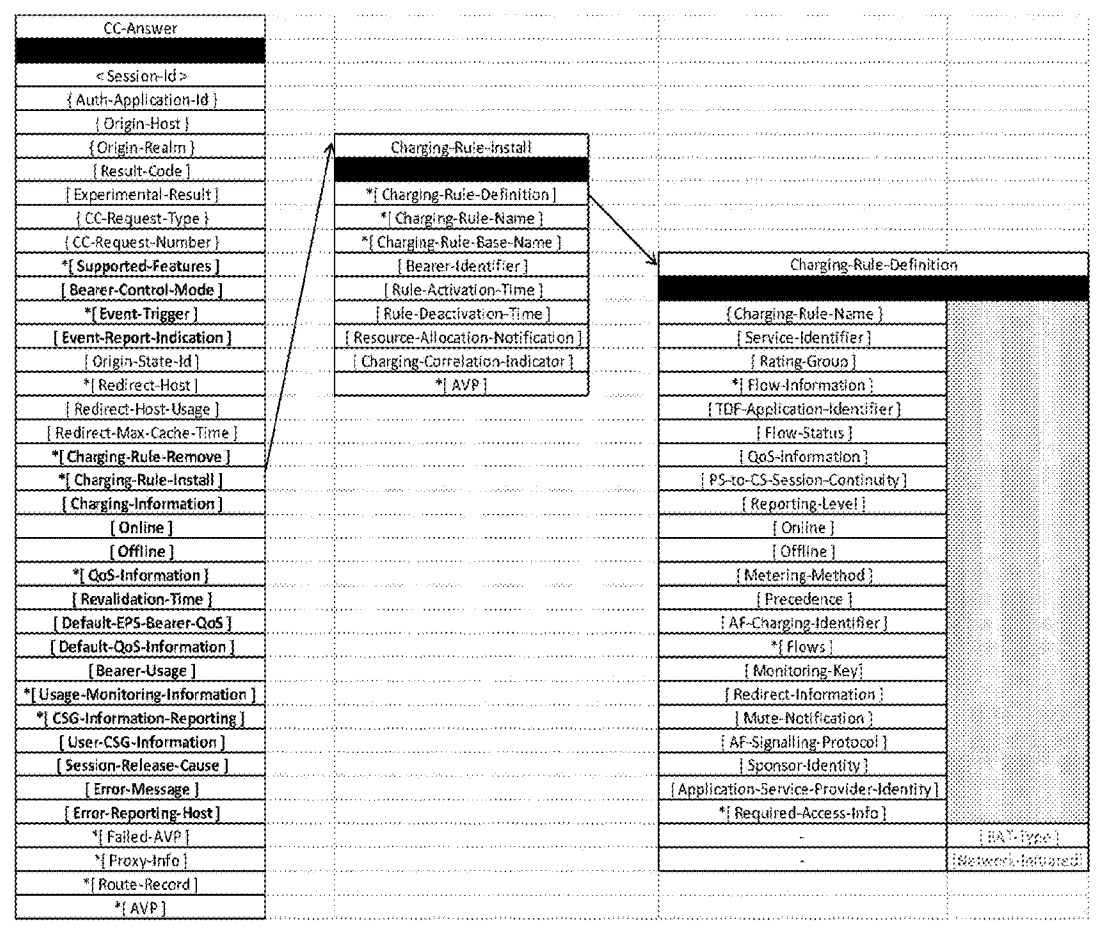

FIG. 18 is a diagram that illustrates the Attribute Valve Pairs (AVPs) of the Credit Control Answer (CCA). The Charging-Rule-Definition may be updated with the RAT-Type AVP and a new Network-Initiated AVP.

In this Section, the new or modified information elements in existing session management messages are described. The session management messages that are discussed in this section are detailed in TS 29.274.

The Create Session Request message is a GTPv2-C message that is sent on the S1 and S5 interfaces.

In order for the ISW-GW 702 to request taking charging of online and offline charging enforcement from the P-GW 120, new indication flags in the Create Session Request message can be added. The Create Session Request message and related information elements are defined in detail in Table 7.2.1-1 of TS 29.274. The two new flags are ISW-GW 702 Online Charging (ISW-OC) and ISW-GW 702 Offline Charging (ISW-OFC), for online and offline charging, respectively. Table 9 shows the original and new Indication Flags of the Create Session Request message.

TABLE 9

Create Session Request - New Indication Flags (Updates In Bold)

| Information elements | P | Condition/Comment | IE Type | Ins. |
|---|---|---|---|---|
| Indication Flags | C | This IE shall be included if any one of the applicable flags is set to 1.<br>Applicable flags are:<br>    S5/S8 Protocol Type: This flag shall be set to 1 on the S11/S4 interfaces according to the protocol chosen to be used on the S5/S8 interfaces.<br>    Dual Address Bearer Flag: This flag shall be set to 1 on the S2b, S11/S4 and S5/S8 interfaces when the PDN Type, determined based on UE request and subscription record, is set to IPv4v6 and all SGSNs which the UE may be handed over to support dual addressing. This shall be determined based on node pre-configuration by the operator, (see also NOTE 5).<br>    The TWAN shall set this flag to 1 on the S2a interface if it supports IPv4 and IPv6 and the PDN Type determined from the UE request if single-connection mode or multi-connection mode is used (see 3GPP TS 23.402 [45]) and the user subscription data is set to IPv4v6.<br>    Handover Indication: This flag shall be set to 1 on the S11/S4 and S5/S8 interface during an E-UTRAN Initial Attach or a UE Requested PDN Connectivity or aPDP Context Activation procedure if the PDN connection/PDF Context is handed-over from non-3GPP access.<br>    This flag shall be set to 1 on the S2b interface during a Handover to Untrusted Non-3GPP IP Access with GTP on S2b and IP address preservation is requested by the UE.<br>    This flag shall be set to 1 on the S2a interface during a Handover to TWAN with GTP on S2a and IP address preservation is requested by the UE.<br>    Operation Indication: This flag shall be set to 1 on the S4/S11 interface for a TAU/RAU procedure with SGW relocation, Enhanced SRNS Relocation with SGW relocation and X2-based handovers with SGW relocation.<br>    Direct Tunnel Flag: This flag shall be set to 1 on the S4 interface if Direct Tunnel is used.<br>    Piggybacking Supported: This flag shall be set to 1 on the S11 interface only if the MME supports the piggybacking feature as described in Annex F of 3GPP TS 23.401. This flag shall be set to 1 on S5/S8 only if both the MME and the SGW support piggybacking.<br>    Change Reporting support Indication: shall be set to 1 on S4/S11 and S5/S8 interfaces if the SGSN/MME supports location Info Change Reporting and if the SGSN/MME's operator policy permits reporting of location change to the operator of the PGW with which the session is being established. See NOTE2.<br>    CSG Change Reporting Support Indication: shall be set to 1 on S4/S11 and S5/S8 interfaces if the SGSN/MME supports CSG Information Change Reporting and if the SGSN/MME's operator policy permits reporting of CSG Information change to the operator of the PGW with which the session is being established. See NOTE 2. | Indication | 0 |

TABLE 9-continued

Create Session Request - New Indication Flags (Updates In Bold)

| Information elements | P | Condition/Comment | IE Type | Ins. |
|---|---|---|---|---|
| | | Unauthenticated IMSI: This flag shall be set to 1 on the S4/S11 and S5/S8 interfaces if the IMSI present in the message is not authenticated and is for an emergency attached UE. PDN Pause Support Indication: this flag shall be set to 1 on the S5/S8 interface if the SGW supports the PGW Pause of Charging procedure. ISW-GW Online Charging (ISW-OC) Indication: this flag shall be set to 1 on the S1-MME, S4/S11, and S5/S8 if the ISW-GW needs to take control of online charging enforcement. ISW-GW Offline Charging (ISW-OFC) Indication: this flag shall be set to 1 on the S1-MME, S4/S11, and S5/S8 if the ISW-GW needs to take control of offline charging enforcement. | | |

The Create Session Response message is a GTPv2-C message that is sent on the S1 and S5 interfaces.

In order for the P-GW 120 to approve the capabilities of the ISW-GW 702 to take charge of online and offline charging enforcement procedures, two new Indication flags may be added to the Create Session Response message. The Create Session Response message and related information elements are defined in detail in Table 7.2.2-1 of TS 29.274. The new indication flags are ISW-OCG (ISW-GW Online Charging Granted) and ISW-OFCG (ISW-GW Offline Charging Granted). Table 10 shows the original and new Indication Flags of the Create Session Response message.

The Modify Bearer Request message is a GTPv2-C message that is sent on the S1 and S5 interfaces.

In order for the ISW-GW 702 to inform the P-GW 120 to take charge of the online charging, the Modify Bearer Request message is used. The Modify Bearer Request message and related information elements are defined in detail in Table 7.2.7-1 of TS 29.274. A new PGW Online Charging (PGW-OC) Indication flag may be added. Furthermore, the ISW-GW 702 may indicate the initiator of the handover using a new Network-Initiated Indication flag. Table 11 shows the original and new Indication Flags of the Modify Bearer Request message.

TABLE 10

Create Session Response - New Indication Flags (Updates In Bold)

| Information elements | P | Condition/Comment | IE Type | Ins. |
|---|---|---|---|---|
| Indication Flags | CO | This IE shall be included if any one of the applicable flags is set to 1. Applicable flags are: PDN Pause Support Indication: this flag shall be set to 1 on the S5/S8 interface if the PGW supports the PGW Pause of Charging procedure. PDN Pause Enable Indication: this flag shall be set to 1 on the S5/S8 interface if the PGW enables the SGW to use the PGW Pause of Charging procedure for this PDN connection. ISW-GW Online Charging Granted (ISW-OCG) Indication: this flag shall be set to 1 on the S1-MME, S4/S11, and S5/S8 to indicate that the ISW-GW can take control of online charging enforcement. ISW-GW Offline Charging Granted (ISW-OFCG) Indication: this flag shall be set to 1 on the S1-MME, S4/S11, and S5/S8 to indicate that the ISW-GW can take control of offline charging enforcement. | Indication | 0 |

TABLE 11

| Modify Bearer Request - New Indication Flags (Updates In Bold) | | | | |
|---|---|---|---|---|
| Information elements | P | Condition/Comment | IE Type | Ins. |
| Indication Flags | C | This IE shall be included if any one of the applicable flags is set to 1.<br>Applicable flags are:<br>Idle mode Signalling Reduction Activation Indication: This flag shall be set to 1 on S4/S11 interface, if the ISR is established between the MME and the S4 SGSN.<br>Handover Indication: This flag shall be set to 1 on the S4/S11 and S5/S8 interfaces during an E-UTRAN Initial Attach or for a UE Requested PDN Connectivity or a PDP Context Activation procedure, if the PDN connection/PDP context is handed-over from non-3GPP access.<br>Direct Tunnel Flag: This flag shall be set to 1 on the S4 interface, if Direct Tunnel is used.<br>Change Reporting Support Indication: shall be set to 1 on S4/S11, S5/S8 interfaces, if the SGSN/MME supports location Info Change Reporting and if the SGSN/MME's operator policy permits reporting of location change to the operator of the PGW with which the session is established. This flag should be ignored by SGW if no message is sent on S5/S8. See NOTE 4.<br>CSG Change Reporting Support Indication: shall be set to 1 on S4/S11, S5/S8, if the SGSN/MME supports CSG Information Change Reporting and if the SGSN/MME's operator policy permits reporting of the CSG Information change to the operator of the PGW with which the session is established. This flag shall be ignored by SGW if no message is sent on S5/S8. See NOTE 4.<br>Change F-TEID support Indication: This flag shall be set to 1 on S4/S11 for an IDLE state UE initiated TAU/RAU procedure to allow the SGW changing the GTP-U F-TEID.<br>Propagate BBAI Information Change: The MME/SGSN shall set this flag to 1 on S11/S4 in procedures without MME/SGSN change if the PGW has requested H(e)NB information reporting and the H(e)NB local IP address or UDP port number information from H(e)NB in UE associated S1/Iu signalling has changed.<br>(NOTE 8)<br>The MME/SGSN shall set this flag to 1 on S11/S4 during TAU/RAU/Handover with MME/SGSN change procedures if the PGW has requested H(e)NB information reporting.<br>See 3GPP TS 23.139 [51].<br>CS to PS SRVCC indication: This flag shall be set to 1 on S4/S11 and on S5/S8 during UTRAN/GERAN to E-UTRAN/UTRAN (HSPA) SRVCC procedure as specified in 3GPP TS 23.216 [43].<br>Change of Location Information Indication (CLII): This flag shall be set to 1 on S4/S11 interface only when the ISR is active for the UE. This flag shall be set to 1 by the MME/S4-SGSN if the ULI IE is included in the Modify Bearer Request message and the location information has changed since last reported by the MME/S4-SGSN. See NOTE 9.. | Indication | 0 |

TABLE 11-continued

Modify Bearer Request - New Indication Flags (Updates In Bold)

| Information elements | P | Condition/Comment | IE Type | Ins. |
|---|---|---|---|---|
| | | PDN Pause Support Indication: this flag shall be set to 1 on the S5/S8 interface during the TAU/RAU/handover with SGW relocation procedures if the new SGW supports the PGW Pause of Charging procedure.<br>PDN Pause On Indication: this flag shall be set to 1 on the S5/S8 interface if the SGW requests the PGW to pause the charging for the PDN connection as specified in 3GPP TS 23.401. (NOTE 13)<br>PDN Pause Off Indication: this flag shall be set to 1 on the S5/S8 interface if the SGW requests the PGW to unpause the charging for the PDN connection as specified in 3GPP TS 23.401. (NOTE 13)<br>PGW Online Charging (PGW-OC) Indication: this flag shall be set to 1 on the S4/S11, and S5/S8 to indicate that the ISW-GW is requesting the P-GW to take charge of the online charging enforcement.<br>Network-Initiated Indication: this flag shall be set to 1 on the S4/S11, and S5/S8 to indicate that the handover is initiated by the ISW-GW. | | |

The Modify Bearer Request message is a GTPv2-C message that is sent on the S1 and S5 interfaces.

In order for the P-GW 120 to inform the ISW-GW 702 that it will take charge of the online charging enforcement, a new indication flag may be added to the Modify Bearer Response message, namely, P-GW Online Charging Granted (PGW-OCG). The Modify Bearer Request message and related information elements are defined in detail in Table 7.2.8-1 of TS 29.274. Table 12 shows the original and new Indication Flags of the Modify Bearer Response message.

TABLE 12

Modify Bearer Response - New Indication Flags (Updates In Bold)

| Information elements | P | Condition/Comment | IE Type | Ins. |
|---|---|---|---|---|
| Indication Flags | CO | This IE shall be included if any one of the applicable flags is set to 1.<br>Applicable flags are:<br>Static IPv4 Address Flag: This flag shall be set to 1 on the S5/S8 interface in the TAU/RAU/Handover with SGW change procedure if the PDP/PDN IPv4 address is static as specified in 3GPP TS 32.251. See NOTE 3.<br>Static IPv6 Address Flag: This flag shall be set to 1 on the S5/S8 interface in the TAU/RAU/Handover with SGW change procedure if the PDP/PDN IPv6 address is static as specified in 3GPP TS 32.251. See NOTE 3.<br>PDN Pause Support Indication: this flag shall be set to 1 on the S5/S8 interface during the TAU/RAU/handover with SGW relocation procedures if the PGW supports the PGW Pause of Charging procedure.<br>PDN Pause Enable Indication: this flag shall be set to 1 on the S5/S8 interface during the TAU/RAU/handover with SGW relocation procedures if the PGW enables the new SGW to use the PGW Pause of Charging procedure for this PDN connection. | Indication | 0 |

TABLE 12-continued

Modify Bearer Response - New Indication Flags (Updates In Bold)

| Information elements | P | Condition/Comment | IE Type | Ins. |
|---|---|---|---|---|
| | | P-GW Online Charging Granted (PGW-OCG) Indication: this flag shall be set to 1 to indicate that the P-GW will take charge of the online charging enforcement. | | |

This section discusses the case where the communication protocol between the ISW-GW 702 and the MME 718 is S1-AP and it is carried over the S1-MME reference point.

New IEs may be added to the Handover Required Message. The standard IEs of this message is presented in clauses 9.1.5.1 of 3GPP TS 36.413, "Evolved Universal Terrestrial Radio Access Network (E-UTRAN); S1 Application Protocol (S1AP)," V12.1.0, March 2014 hereafter "TS 36.413".

The complete IEs of the S1-AP Handover Required message are introduced in Table 13. The two new IEs are:

PGW Online Charging (PGW-OC) Indication: this flag shall be set to 1 on the S4/S11, and S5/S8 to indicate that the ISW-GW 702 is requesting the P-GW 120 to take charge of the online charging enforcement.

Network-Initiated Indication: this flag shall be set to 1 on the S4/S11 and S5/S8 to indicate that the handover is initiated by the ISW-GW 702.

TABLE 13

Handover Required - New Indication Flags (Updates In Bold)

| IE/Group Name | Presence |
|---|---|
| Message Type | M |
| MME UE S1AP ID | M |
| eNB UE S1AP ID | M |
| Handover Type | M |
| Cause | M |
| Target ID | M |
| Direct Forwarding Path Availability | O |
| SRVCC HO Indication | O |
| Source to Target Transparent Container | M |
| Source to Target Transparent Container Secondary | O |
| MS Classmark 2 | C-ifSRVCCto GERAN |
| MS Classmark 3 | C-ifSRVCCto GERAN |
| CSG Id | O |
| Cell Access Mode | O |
| PS Service Not Available | O |
| PGW Online Charging (PGW-OC) Indication | O |
| Network-Initiated Indication | O |

This section discusses the case where the communication protocol between the ISW-GW 702 and the MME 718 is S1-AP and it is carried over the S1-MME reference point.

A new IE may be added to the Handover Command Message. The standard IEs of this message is in clause 9.1.5.2 of TS 36.413.

The complete IEs of the S1-AP Handover Command message are introduced in Table 14. The two new IE are:

P-GW Online Charging Granted (PGW-OCG) Indication: this flag shall be set to 1 to indicate that the P-GW 120 will take charge of the online charging enforcement.

TABLE 14

Handover Command - New Indication Flags (Updates In Bold)

| IE/Group Name | Presence |
|---|---|
| Message Type | M |
| MME UE S1AP ID | M |
| eNB UE S1AP ID | M |
| Handover Type | M |
| NAS Security Parameters from E-UTRAN | C-iftoUT RANG ERAN |
| E-RABs Subject to Forwarding List | |
|   E-RABs Subject to Forwarding Item IEs | |
|     E-RAB ID | M |
|     DL Transport Layer Address | O |
|     DL GTP-TEID | O |
|     UL Transport Layer Address | O |
|     UL GTP-TEID | O |
| E-RABs to Release List | O |
| Target to Source Transparent Container | M |
| Target to Source Transparent Container Secondary | O |
| Criticality Diagnostics | O |
| P-GW Online Charging Granted (PGW-OCG) Indication | O |

The above section focused on the ISWN deployment scenario where an ISW-GW 702 is used as the central entity in the ISWN that makes hand over decisions. In other words, the ISW-GW 702 is tasked with making decisions about moving a bearer, or flow, from one RAT to another.

It should be appreciated that these same concepts can be applied to any network node that makes handover decisions for the ISWN. For example, if the MME 718 or S-GW 722 is able to move bearers or flows from one RAT to another, then these same procedures can be used to communicate with the P-GW 120/PCEF 102.

It should be noted that the ISW-GW 702 functionality that is described in this document could be deployed as a logical function inside of an integrated Small Cell/WiFi Access Point or a HeNB 704 with integrated WiFi functionality.

It should be noted that the ISW-GW 702 functionality that is described in this document could be deployed with a wireless LAN controller and a small cell or group of small cells.

Advice of Charge Supplementary Services

Previous sections describe charging-related changes at the core network side. Particularly, either the P-GW 120 or the ISW-GW 702 can be aware of the appropriate charging rule. Such changes can be extended to make the subscriber as well be aware of the appropriate charging rule and corresponding tariffs. This section describes the notifying of the UE 716 or 720 with any updates of the utilized charging rules. More specifically, concept of Advice of Charge (AoC) supplementary service 3GPP TS 32.280, "Charging management; Advice of Charge (AoC) service, (Release 11)," V11.1.1, July 2014 and 3GPP TS 23.086, "Advice of Charge (AoC) supplementary services; Stage 2," V11.0.0, September 2012., which was previously defined for GSM and IP Multimedia Subsystem (IMS), to the EPC network and ISWN can be generalized.

Figure 19:
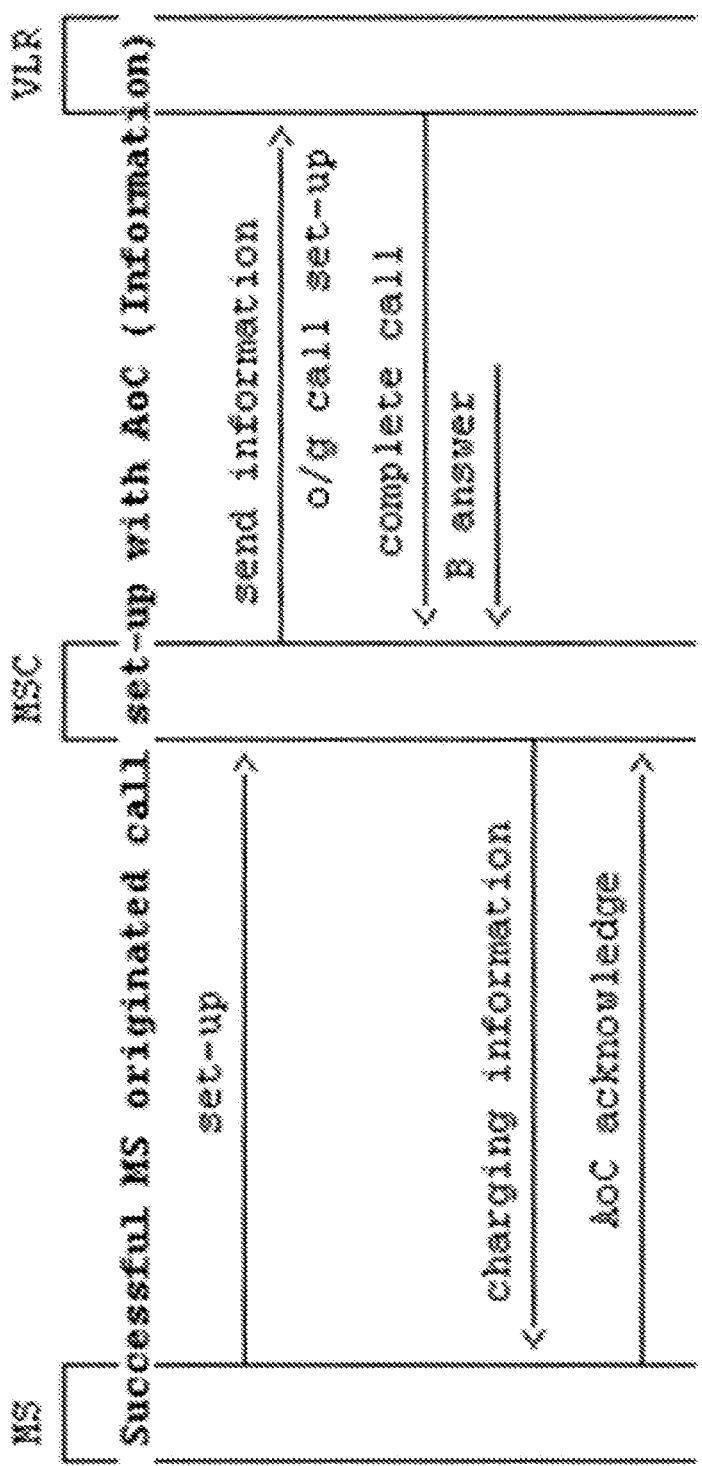
FIG. 19 is a typical AOCI information flow diagram for GSM.

In GSM networks, AoC supplementary service has been introduced to provide the user with charging information. In particular, it provides Advice of Charge (Information) (AoCI) to inform the user about the estimated service cost. Furthermore, it provides the user with Advice of Charge (Charging) (AoCC) to convey the actual charge. FIG. 19 is a typical AOCI information flow diagram for GSM (from 3GPP TS 23.086, "Advice of Charge (AoC) supplementary services; Stage 2," V11.0.0, September 2012). As shown, once the call set-up is complete, the Mobile Switching Center (MSC) sends "Charge Advice Information (CAI)" (from 3GPP TS 22.024, "Description of Charge Advice Information (CAI), Release 11," V11.0.0, September 2012) to the mobile station (MS). The MS should start the charging calculations once it receives the CAI. In return, the MS sends "AoC Acknowledge" message to the MSC. Finally, charging calculations are stopped when the call ends.

It is understood that the entities performing the steps illustrated in FIG. 19 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIG. 19 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIG. 19. It is also understood that any transmitting and receiving steps illustrated in FIG. 19 may be performed by communication circuitry of the node under control of the processor of the node and the computer-executable instructions (e.g., software) that it executes.

Information flow for Advice of Charge

The role of the gateway may be expanded to enforce the charging rules (ISW-GW 702 or P-GW 120), to send CAI to the UE 716 or 720 (in a similar fashion to the MSC in FIG. 19. As a result, the UE 716 or 720 will utilize this charging information to generate the AoC to be displayed at the MS. An example focuses on the inter ISW-GW handover scenario presented above. However the AoC procedure to be explained in this section can be applied to other scenarios considered in this paper.

Figure 20:
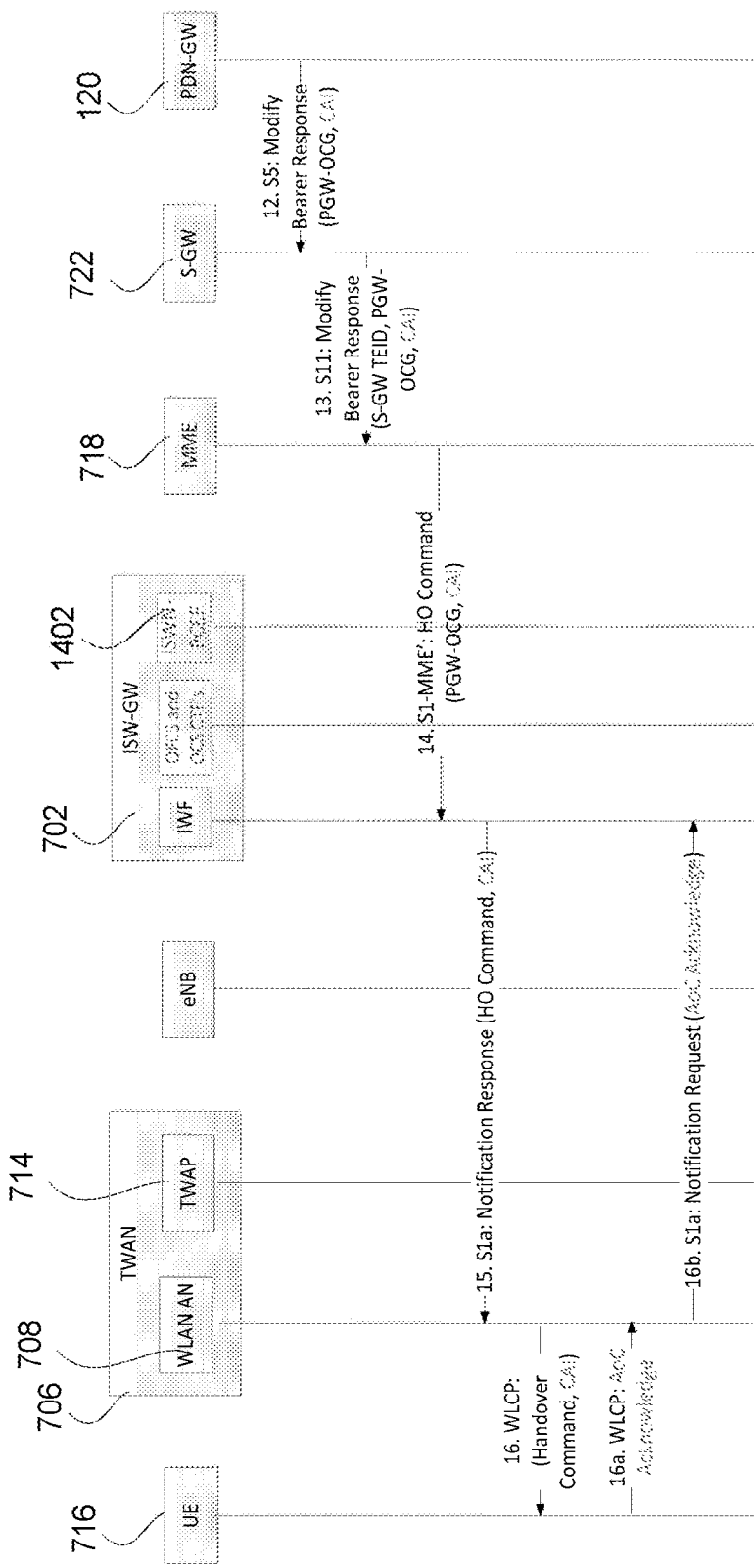
FIG. 20 is a diagram that illustrates additional information elements which can be applied to the existing messages in the call flow of FIG. 17.

The charging procedure during the inter ISW-GW handover, explained in details in Section 5.2.3., can be extended to convey the CAI to the UE. FIG. 20 is a diagram that illustrates additional information elements which can be applied to the existing messages in the call flow of FIG. 17.

In step 12 of FIG. 20, the Modify Bearer Request message will be extended to include the CAI information elements. More specifically, the P-GW 120 sends a Modify Bearer Response (PGW-OCG, CAI) message to the S-GW 722.

In step 13 of FIG. 20, similar to the update made in step 12, the S-GW 722 returns Modify Bearer Response (S-GW TEID, PGW-OCG, CAI) message to the MME 718.

In step 14 of FIG. 20, furthermore, the MME 718 forwards the CAI to the ISW-GW 702 by sending the Handover Command (PGW-OCS, CAI) message, as was discussed in step 14 of FIG. 17.

In step 15 of FIG. 20, consequently, the ISW-GW 702 sends Notification Request (Handover Command, CAI) message to the WLAN AN, as was discussed in step 15 of FIG. 17.

In step 16 of FIG. 20, finally the CAI reaches the UE 716 or 720 from the WLAN AN using the WLCP protocol. As a response, the UE 716 or 720 will be able to calculate the charging information and display the AoC.

In step 16a of FIG. 20, furthermore, the UE 716 or 720 can send AoC acknowledge message (as in FIG. 19) to the WLAN AN using the WLCP protocol.

In step 16b of FIG. 20, finally, the AoC Acknowledge can be forwarded to the ISW-GW 702 using the Notification Request message.

It is understood that the entities performing the steps illustrated in FIG. 20 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIG. 20 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIG. 20. It is also understood that any transmitting and receiving steps illustrated in FIG. 20 may be performed by communication circuitry of the node under control of the processor of the node and the computer-executable instructions (e.g., software) that it executes.

Interfaces, such as Graphical User Interfaces (GUIs), can be used to assist user to control and/or configure functionalities related to the service layer charging correlation. In one embodiment, the system can send "Advice of Charge (AoC) Supplementary Services" to the UE, to display AoC to the user. FIG. 21A is a diagram that illustrates an interface 2102 that allows a user to set user preferences with respect to a connection through WIFI or cellular network as discussed above. FIG. 21B is a diagram that illustrates an interface 2104 to set network preferences. FIGS. 21C-D are diagrams that illustrate interfaces 2106 and 2108 that indicate whether cellular data rates will be charged. It is to be understood that interfaces 2102, 2104, 2106 and 2108 can be produced using displays such as those shown in FIGS. 22C-D described below.

Example M2M/IoT/WoT Communication System

FIG. 22A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as ISW GW 702, IWF PCEF 102, ISWN-PCEF 1402, OFCS 114, MME 718, OCS 112, PCRF 118, PGW 120, SGW 722, WLAN AN 708, TWAG 710, TWAP 714, TWAN 706, H(e)NB 704, CTFs 1404 AND 1406, logical entities at UE 720 and 716 and logical entities to produce interfaces 2102.

As shown in FIG. 22A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 22B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as ISW GW 702, IWF PCEF 102, ISWN-PCEF 1402, OFCS 114, MME 718, OCS 112, PCRF 118, PGW 120, SGW 722, WLAN AN 708, TWAG 710, TWAP 714, TWAN 706, H(e)NB 704, CTFs 1404 AND 1406, logical entities at UE 720 and 716 and logical entities to produce interfaces 2102. The M2M service layer 22 may be implemented by one or more servers, computers, devices, virtual machines (e.g. cloud/storage farms, etc.) or the like, including for example the devices illustrated in FIGS. 22C and 22D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 22B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as ISW GW 702, IWF PCEF 102, ISWN-PCEF 1402, OFCS 114, MME 718, OCS 112, PCRF 118, PGW 120, SGW 722, WLAN AN 708, TWAG 710, TWAP 714, TWAN 706, H(e)NB 704, CTFs 1404 AND 1406, logical entities at UE 720 and 716 and logical entities to produce interfaces 2102 may be hosted within a M2M service layer instance hosted by an M2M node, such as an M2M server, M2M gateway, or M2M device, as shown in FIG. 22B. For example, the logical entities such as ISW GW 702, IWF PCEF 102, ISWN-PCEF 1402, OFCS 114, MME 718, OCS 112, PCRF 118, PGW 120, SGW 722, WLAN AN 708, TWAG 710, TWAP 714, TWAN 706, H(e)NB 704, CTFs 1404 AND 1406, logical entities at UE 720 and 716 and logical entities to produce interfaces 2102 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 22C or FIG. 22D described below.

Further, logical entities such as ISW GW 702, IWF PCEF 102, ISWN-PCEF 1402, OFCS 114, MME 718, OCS 112, PCRF 118, PGW 120, SGW 722, WLAN AN 708, TWAG 710, TWAP 714, TWAN 706, H(e)NB 704, CTFs 1404 AND 1406, logical entities at UE 720 and 716 and logical entities to produce interfaces 2102 can implemented as part of an M2M network that uses a Service Oriented Architecture (SOA) and/or a Resource-Oriented Architecture (ROA) to access services of the present application.

FIG. 22C is a block diagram of an example hardware/software architecture of a M2M network node 30, such as an M2M device 18, an M2M gateway 14, an M2M server, or the like. The node 30 can execute or include logical entities such as ISW GW 702, IWF PCEF 102, ISWN-PCEF 1402, OFCS 114, MME 718, OCS 112, PCRF 118, PGW 120, SGW 722, WLAN AN 708, TWAG 710, TWAP 714, TWAN 706, H(e)NB 704, CTFs 1404 AND 1406, logical entities at UE 720 and 716 and logical entities to produce interfaces 2102. The device 30 can be part of an M2M network as shown in FIG. 22A-B or part of a non-M2M network. As shown in FIG. 22C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 22C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 22C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 22C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 22D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as ISW GW 702, IWF PCEF 102, ISWN-PCEF 1402, OFCS 114, MME 718, OCS 112, PCRF 118, PGW 120, SGW 722, WLAN AN 708, TWAG 710, TWAP 714, TWAN 706, H(e)NB 704, CTFs 1404 AND 1406, logical entities at UE 720 and 716 and logical entities to produce interfaces 2102. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 22A and FIG. 22B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 22 A-B of the device 30 of FIG. 22 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as ISW GW 702, IWF PCEF 102, ISWN-PCEF 1402, OFCS 114, MME 718, OCS 112, PCRF 118, PGW 120, SGW 722, WLAN AN 708, TWAG 710, TWAP 714, TWAN 706, H(e)NB 704, CTFs 1404 AND 1406, logical entities at UE 720 and 716 and logical entities to produce interfaces 2102 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method for use by a PDN Gateway (PGW) node connected to an integrated small cell and Wi-Fi network (ISWN), wherein the PGW node comprises a processor and memory, and wherein the PGW node further includes computer-executable instructions stored in the memory which, when executed by the PGW node, perform the method comprising:

receiving, at the PGW node, a Bearer Resource Command (BRC) message indicating whether a flow is associated with an unlicensed spectrum access point or is associated with a licensed spectrum access point, the flow passing through a gateway that connects both the unlicensed spectrum access point and the licensed spectrum access point with the ISWN, the BRC message also indicating that the flow is associated with User Equipment (UE) or some other device, and indicating whether the ISWN or the UE initiated a handover of spectrum type; and performing an operation at the PGW node based on the BRC message, wherein the operation is fetching a charging rule associated with the flow, where content of the charging rule is dependent on whether the ISWN or the UE initiated handover, and the charging rule differentiating how data associated with a WiFi or cellular connection is charged, and wherein the operation is volume-based charging.

2. The method of claim 1, wherein the licensed spectrum access point is a cellular network.

3. The method of claim 1, wherein the unlicensed spectrum access point is a WiFi access point.

4. The method of claim 1, wherein the charging rule is fetched from a Policy and Charging Rules Function (PCRF).

5. The method of claim 1, wherein the operation is an updating charging operation.

6. The method of claim 1, wherein the received BRC message by the PGW node is sent by a Serving Gateway (SGW).

7. The method of claim 1, wherein the gateway is an Integrated Small cell Wi-Fi Gateway (ISW-GW).

8. The method of claim 1, wherein the message indicates that a flow is moving from the unlicensed spectrum access point to the licensed spectrum access point, or from the licensed spectrum access point to the unlicensed spectrum access point.

9. A method for use by an Integrated Small cell Wi-Fi Gateway (ISW-GW) node connected to an integrated small cell and Wi-Fi network (ISWN), wherein the ISW-GW node comprises a processor and memory, and wherein the ISW-GW node further includes computer-executable instructions stored in the memory which, when executed by the ISW-GW node, performs the method comprising:

initiating a bearer resource modification procedure;

determining, via the ISW-GW node, whether a flow from a User Equipment (UE) comes from an unlicensed spectrum or a licensed spectrum, and whether the ISW-GW node or the UE initiated a handover of spectrum type;

fetching a charging rule associated with the flow, where content of the charging rule is dependent on whether the ISW-GW node or the UE initiated handover, and the charging rule differentiating how data associated with a WiFi or cellular connection is charged; and using the determination and the charging rule to update charging operations at the ISW-GW node in the ISWN or to obtain policies that are associated with the UE.

10. The method of claim 9, wherein a message is sent from the ISW-GW node if the ISW-GW node wants to take control of charging operations or if the ISW-GW node wants to transfer control of charging operations to another ISW-GW node.

11. The method of claim 10, wherein the ISW-GW node is operably connected to an unlicensed spectrum access point and a licensed spectrum access point, and the ISW-GW node connects flows to a core network of the ISWN.

12. The method of claim 11, wherein the ISW-GW includes a Policy and Charging Enforcement Function (PCEF).

13. The method of claim 11, wherein the ISW-GW further includes a first Charging Trigger Function (CTF) associated with an online charging system (OCS) and a second CTF associated with an offline charging system (OFCS).

14. A method for use by a PDN Gateway (PGW) node connected to an integrated small cell and Wi-Fi network (ISWN), wherein the PGW node comprises a processor and memory, and wherein the PGW node further includes computer-executable instructions stored in the memory which, when executed by the PGW node, perform the method comprising:

receiving, when User Equipment (UE) is connected to the PGW node through a licensed spectrum access point, a Bearer Resource Command (BRC) message indicating whether the UE will be charged for connecting through the licensed spectrum access point or charged out at a rate used for a connection through an unlicensed spectrum access point, and an indication whether the ISWN or the UE initiated a handover of spectrum type;

fetching a charging rule associated with the BRC message, where content of the charging rule is dependent on whether the ISWN or the UE initiated handover, and the charging rule differentiating how data associated with a WiFi or cellular connection is charged; and using the BRC message to produce a display at the UE.

15. The method of claim 14, wherein the BRC message is sent from a P-GW.

16. The method of claim 14, wherein the BRC message is sent from an Integrated Small cell Wi-Fi Gateway (ISW-GW).

17. A PDN Gateway (PGW) node comprising a processor, a memory, and communication circuitry, the PGW node being connected to an integrated small cell and Wi-Fi network (ISWN) via its communication circuitry, the PGW node further including computer-executable instructions stored in the memory of the PGW node which, when executed by the processor of the PGW node, cause the PGW node to:

receive, at the PGW node, a Bearer Resource Command (BRC) message indicating whether a flow is associated with an unlicensed spectrum access point or is associated with a licensed spectrum access point, the flow passing through a gateway that connects both the unlicensed spectrum access point and the licensed spectrum access point with the ISWN, the BRC message also indicating whether User Equipment (UE) or some other device selected if the unlicensed spectrum access point or licensed spectrum access point is used by the flow;

fetching a charging rule associated with the flow, where content of the charging rule is dependent on whether the UE or some other device initiated handover, and the charging rule differentiating how data associated with a WiFi or cellular connection is charged; and updating a charging operation at the ISWN based on the BRC message.

18. An Integrated Small cell Wi-Fi Gateway (ISW-GW) node comprising a processor, a memory, and communication circuitry, the ISW-GW node being connected to an integrated small cell and Wi-Fi network (ISWN) via its communication circuitry, the ISW-GW node further including computer-executable instructions stored in the memory of the ISW-GW node which, when executed by the processor of the ISW-GW node, cause the ISW-GW node to:

initiating a bearer resource modification procedure;

determine, via the ISW-GW node, whether a flow from User Equipment (UE) comes from an unlicensed spectrum access point or a licensed spectrum access point, and an indication whether the ISW-GW node or the UE initiated a handover of spectrum type;

fetching a charging rule associated with the flow, where content of the charging rule is dependent on whether the ISW-GW node or the UE initiated handover, and the charging rule differentiating how data associated with a WiFi or cellular connection is charged; and use the determination to update charging operations at the ISW-GW node for the ISWN.

19. The method of claim 9, further comprising:
performing volume-based charging after updating the charging operations.

\* \* \* \* \*